INVENTORS
FRED H. ALLEN   MILTON C. NEUMAN
ARTHUR G. BLOMQUIST   HARRISON RANDOLPH
ROBERT E. CARLBERG   JOHN S. SCHEURICH
ARTHUR J. DOHM   FERDINAND J. SCHIAVI
GAROLD A. KANE   PALMER G. WERMAGER
BY
ATTORNEY

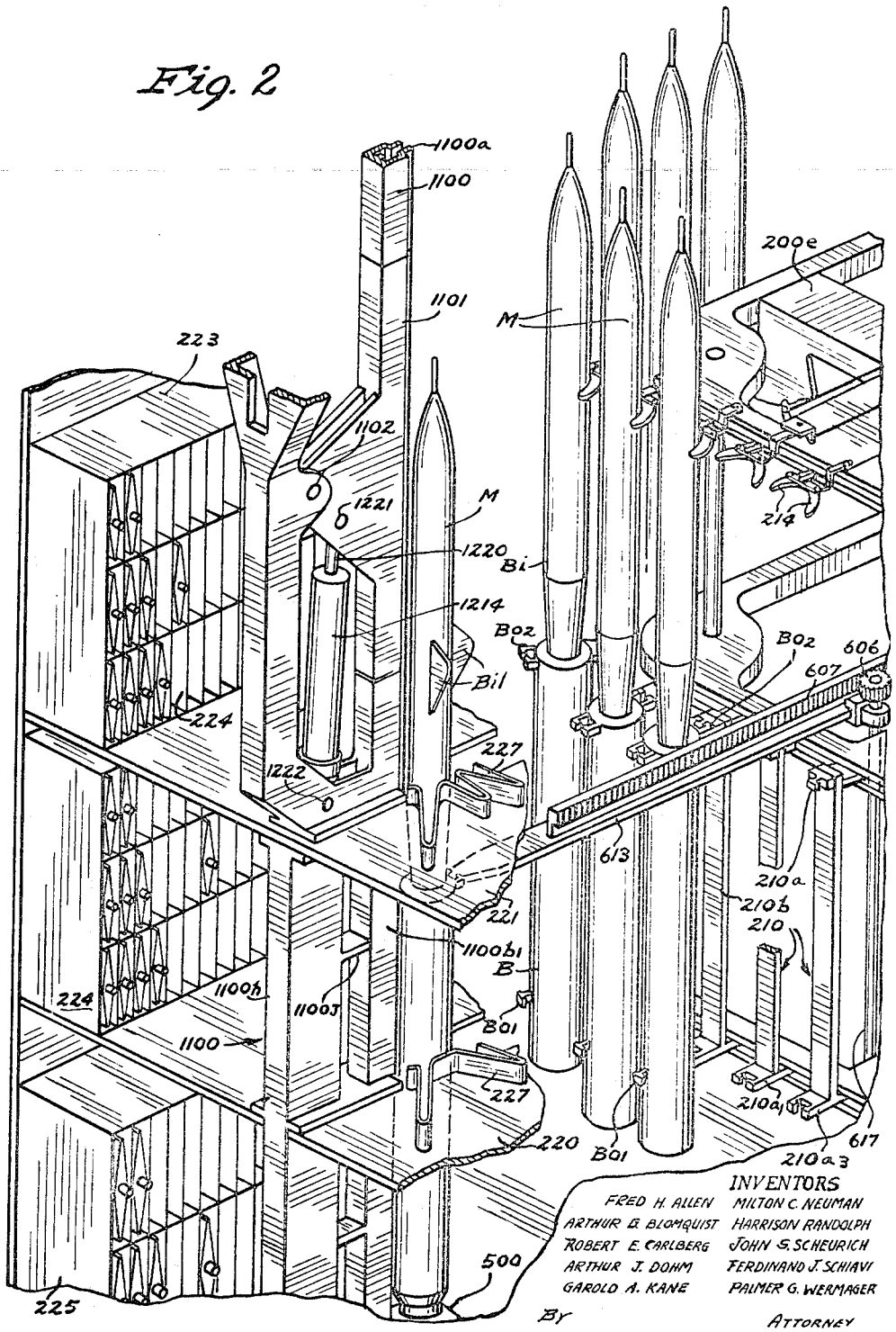

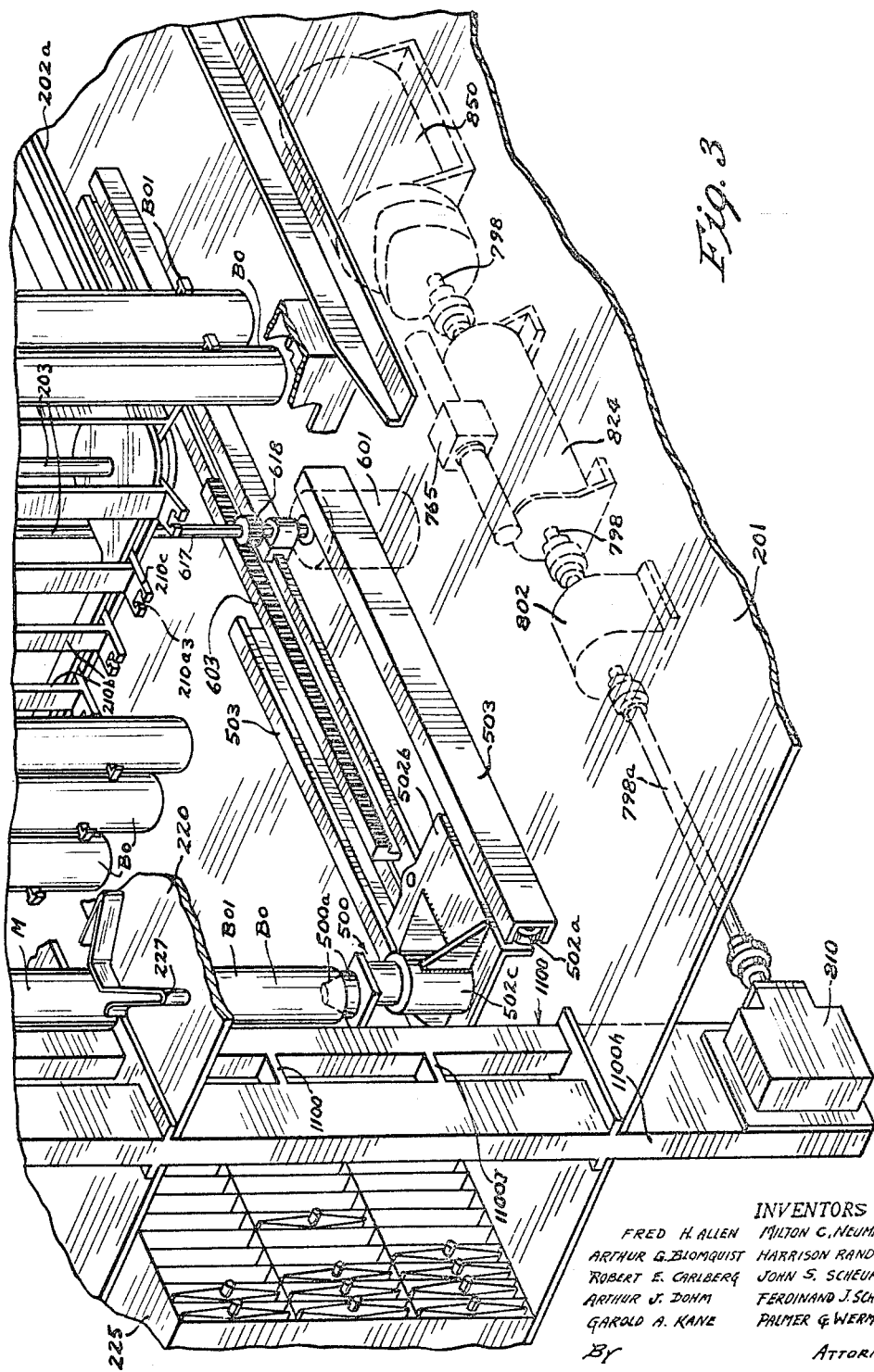

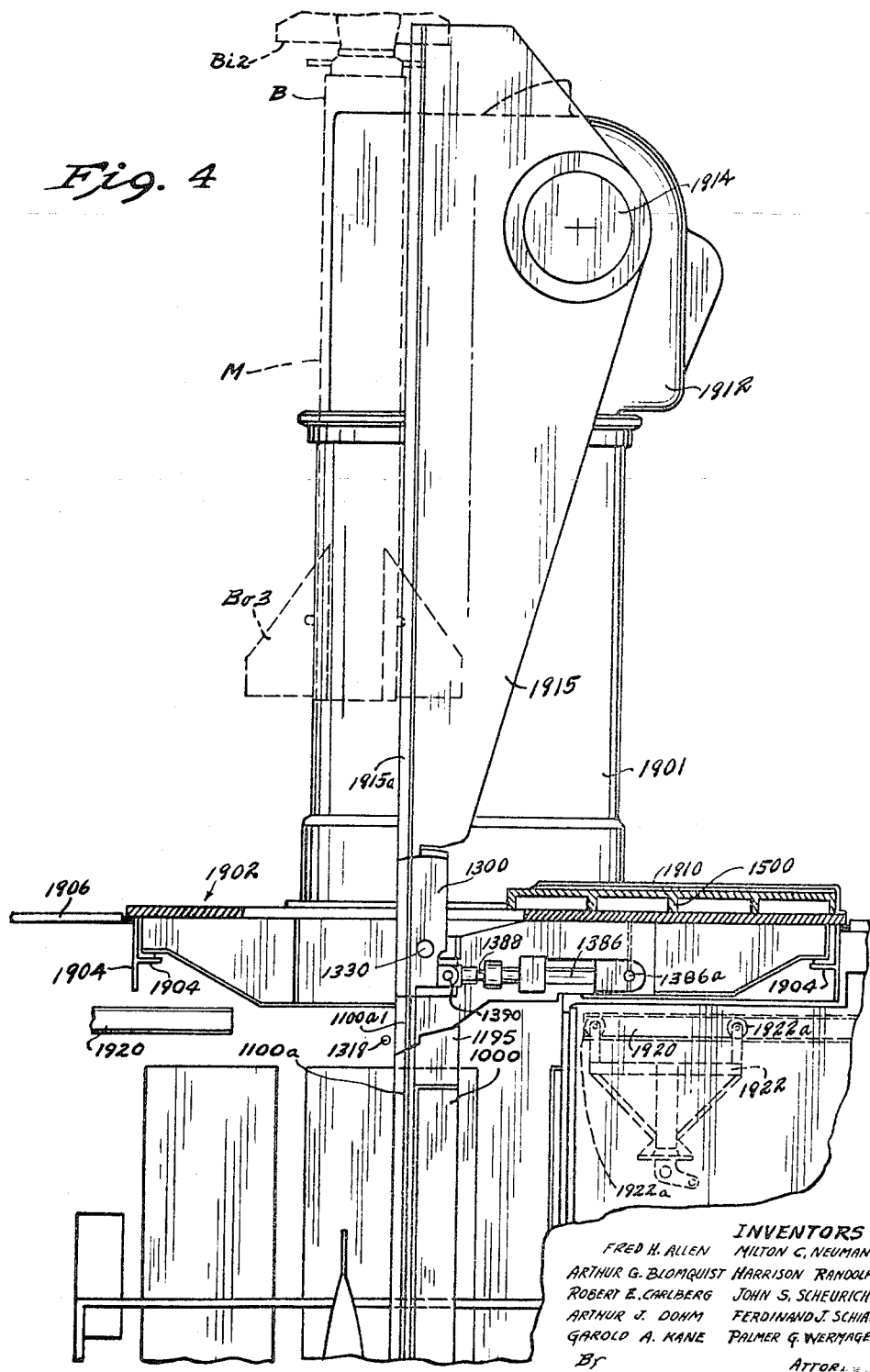

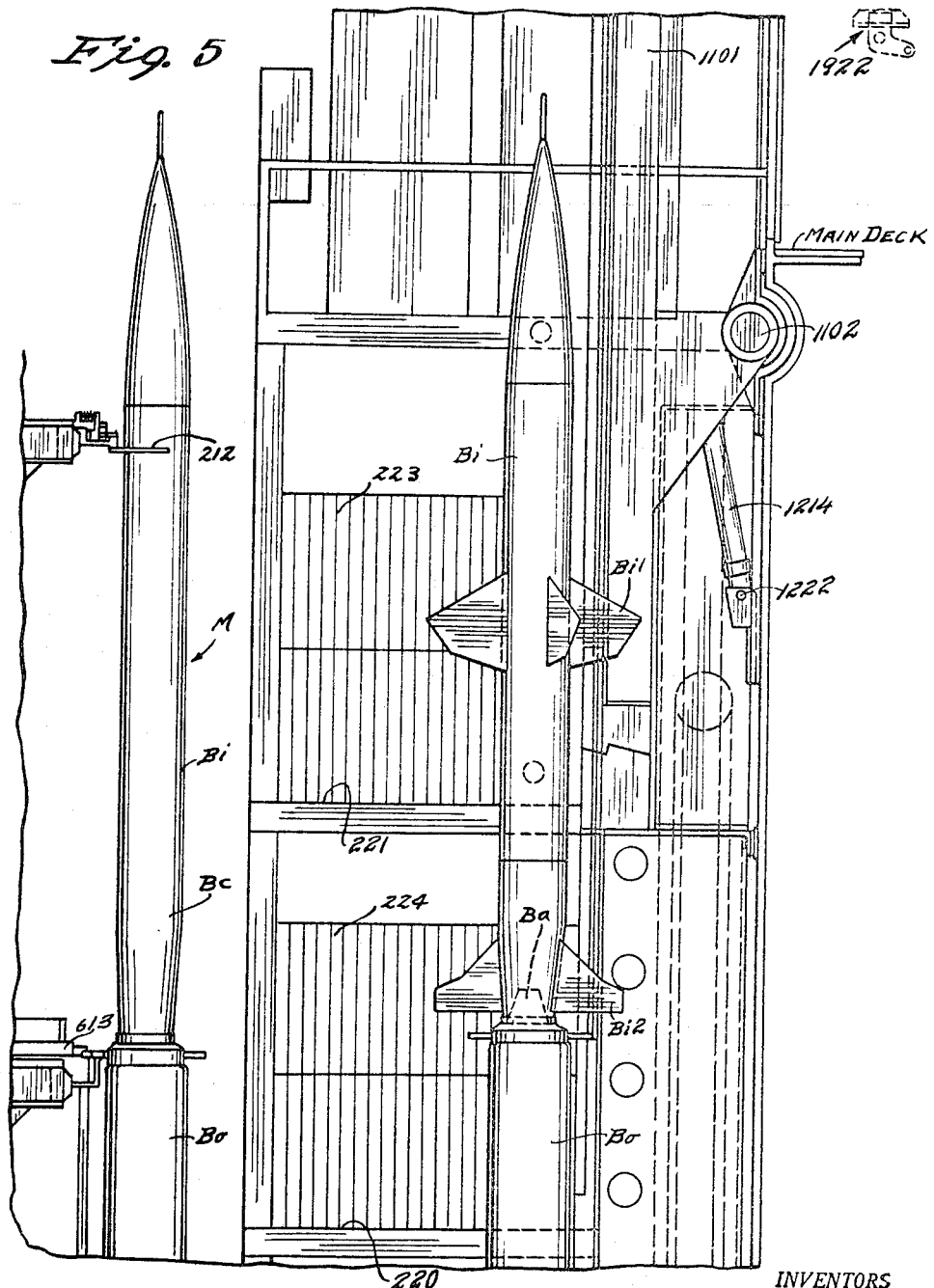

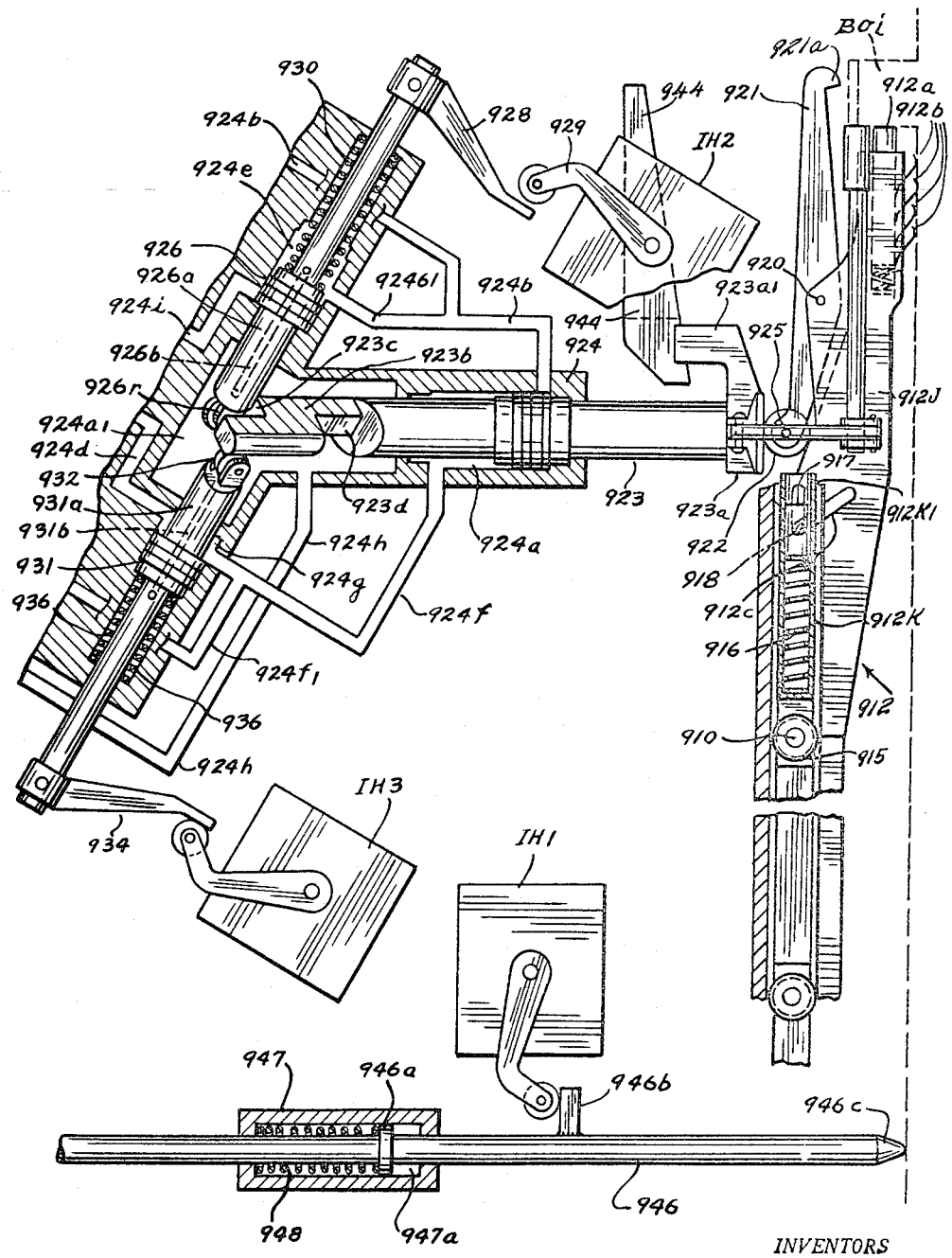

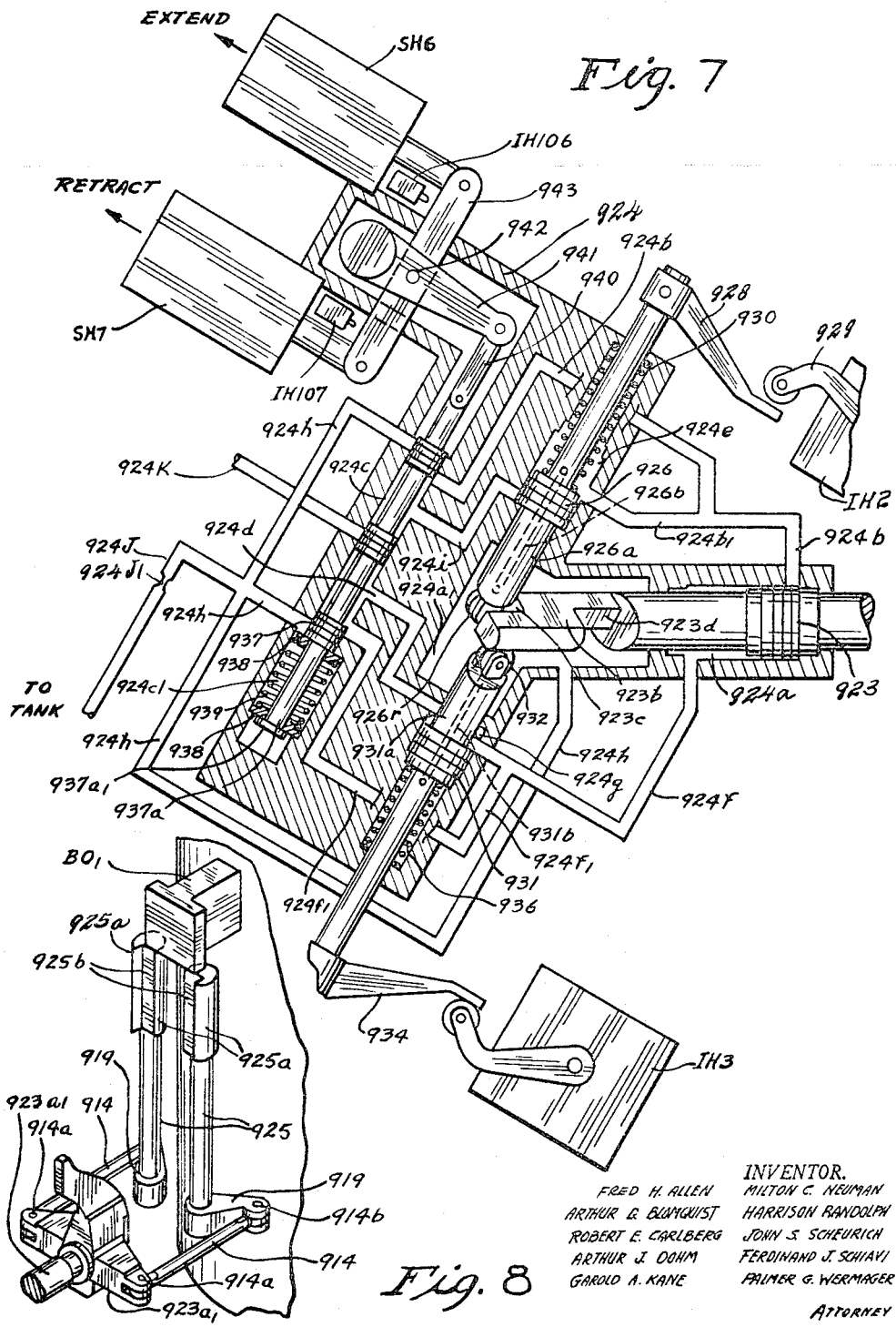

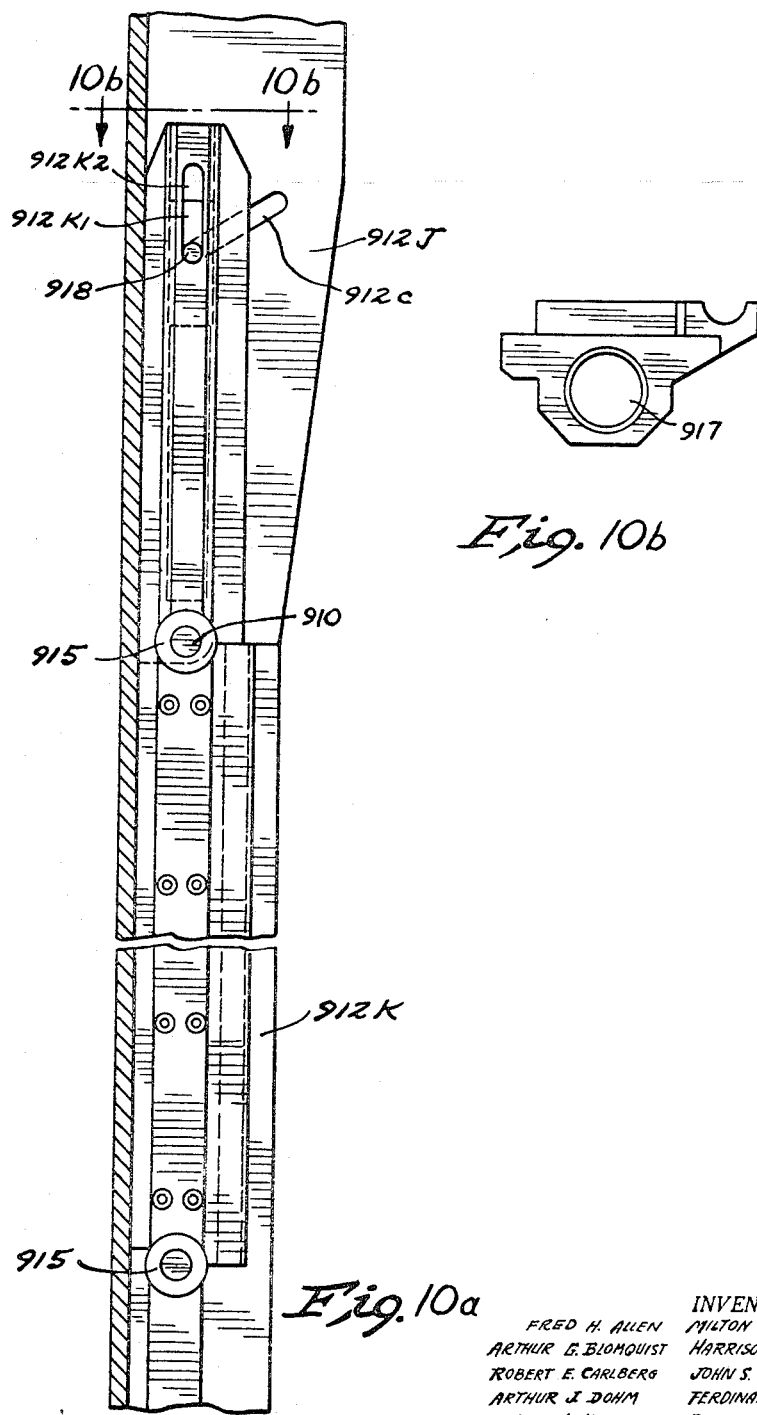

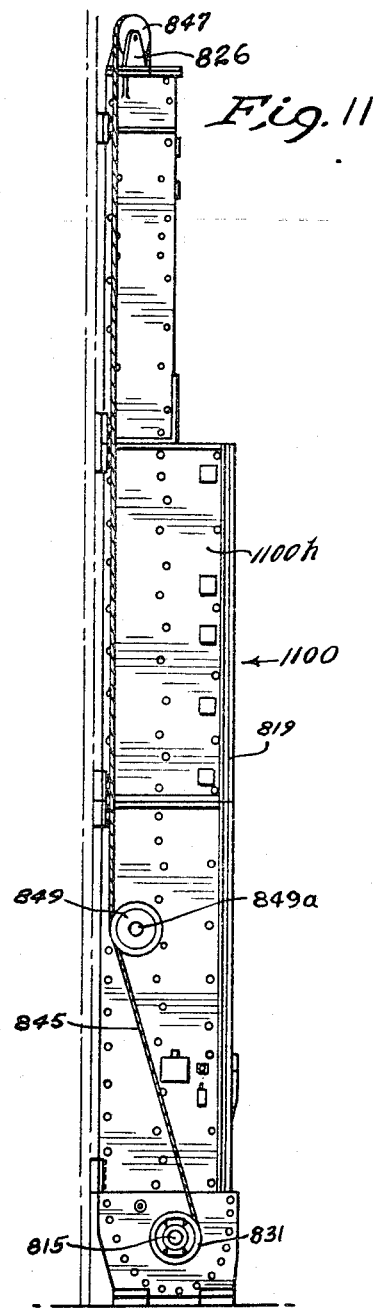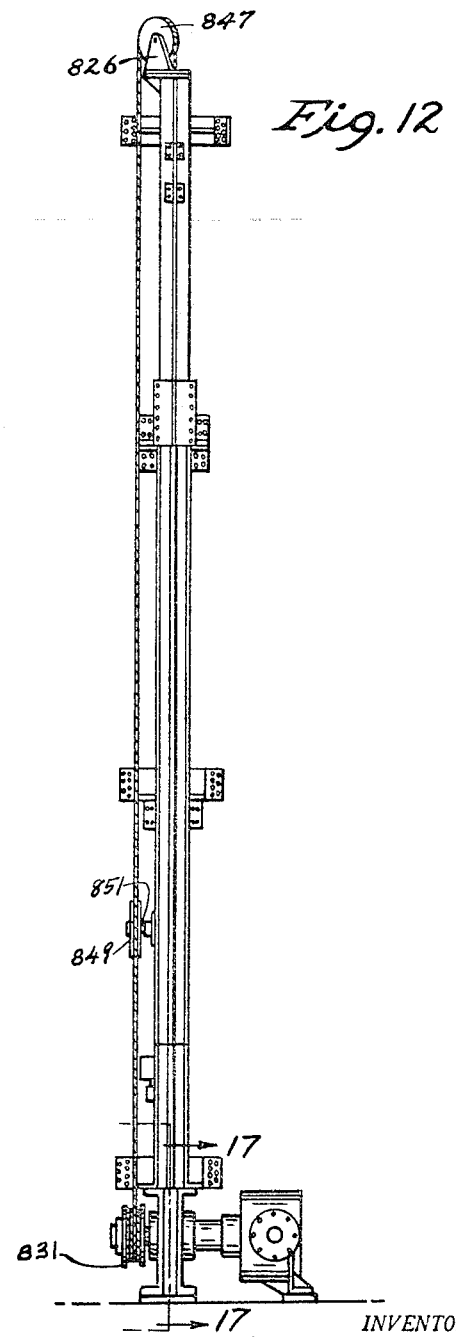

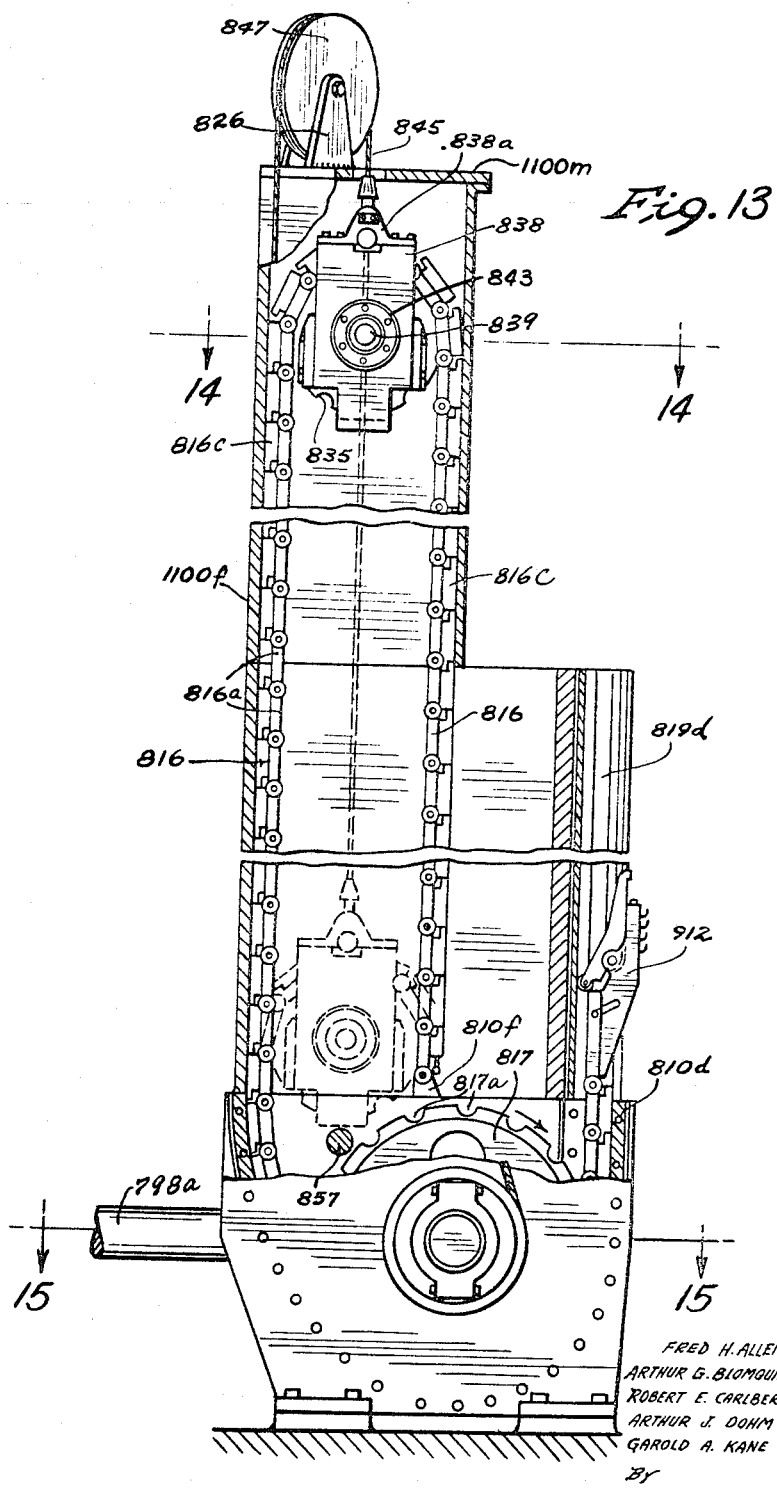

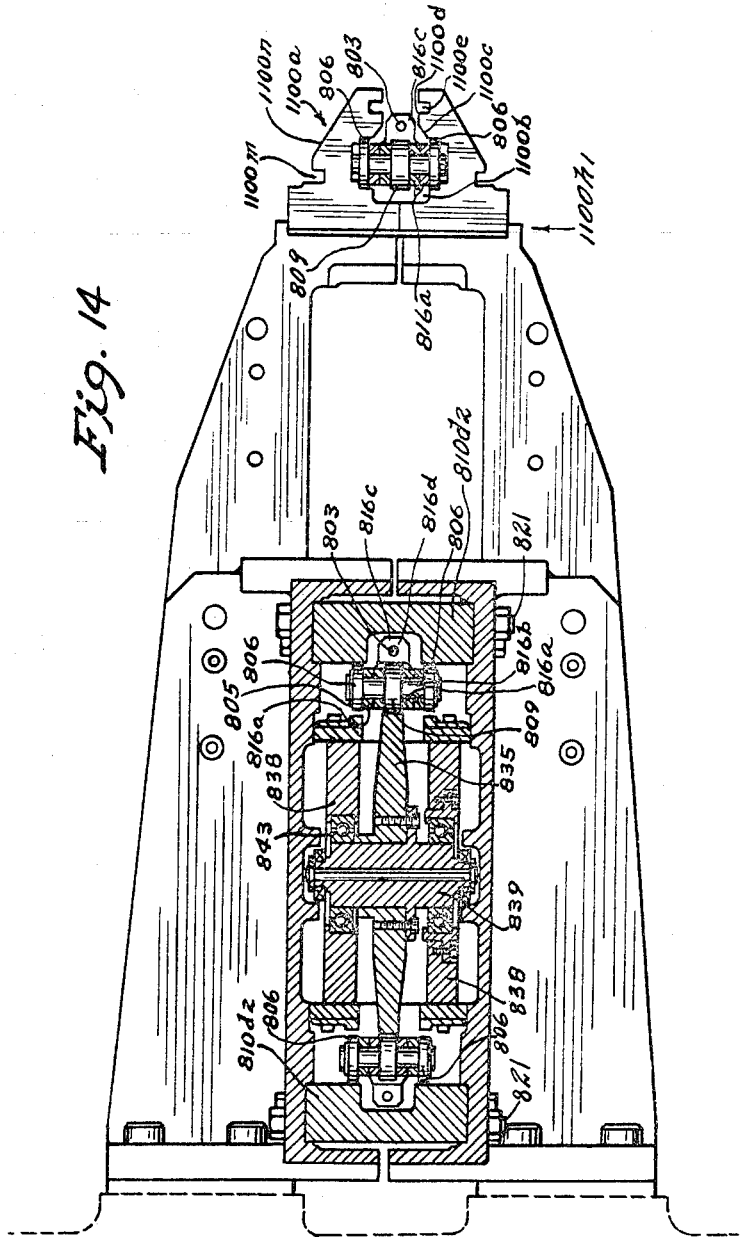

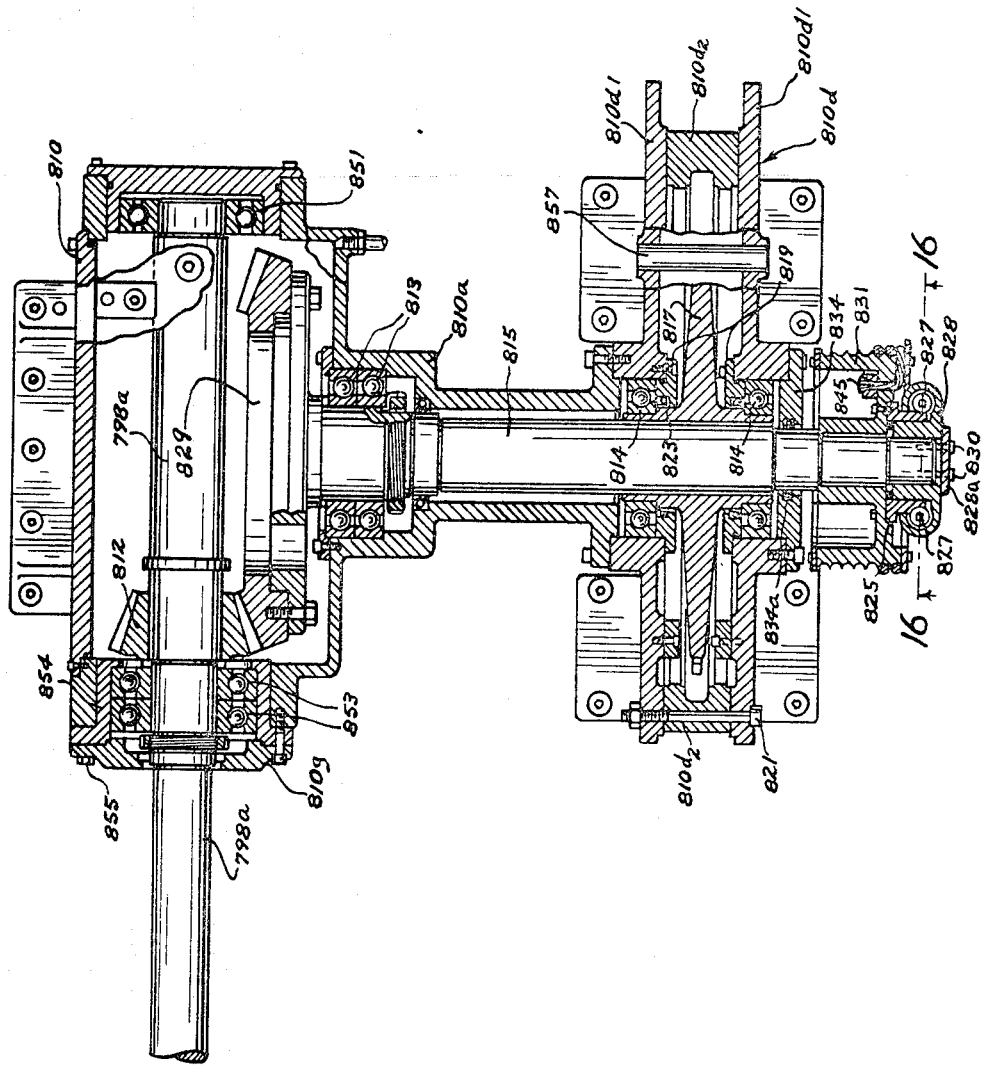

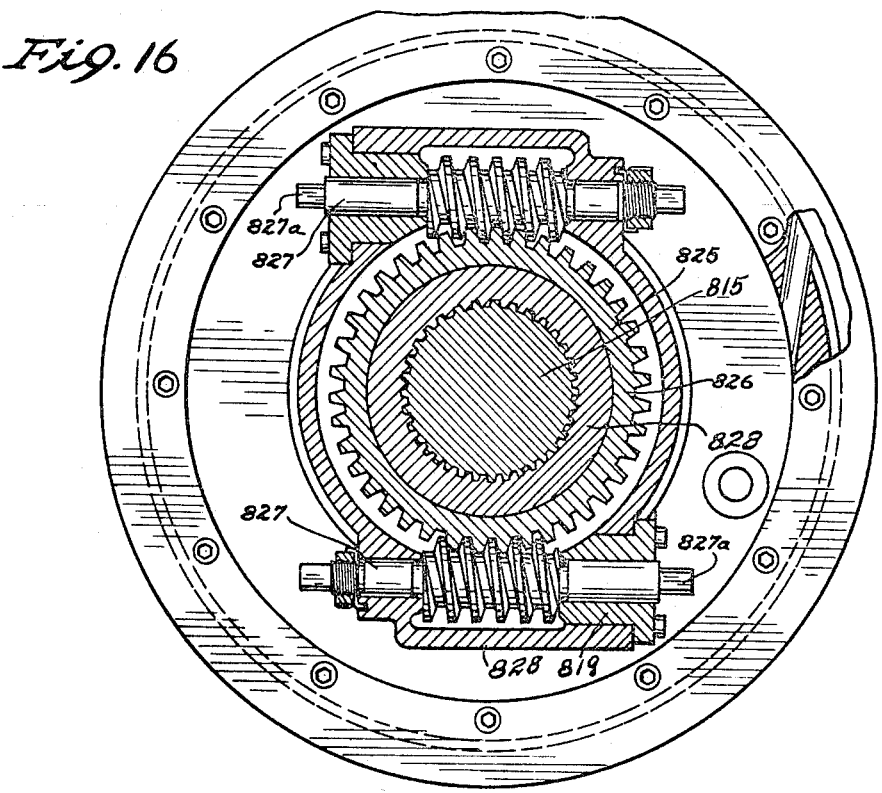
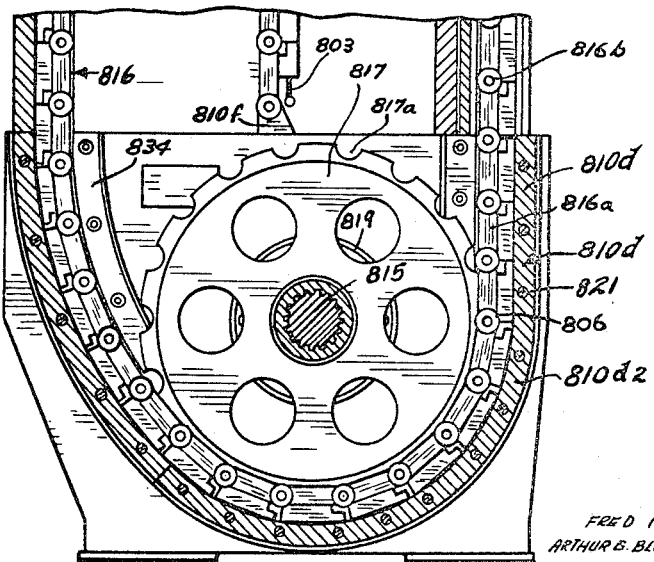

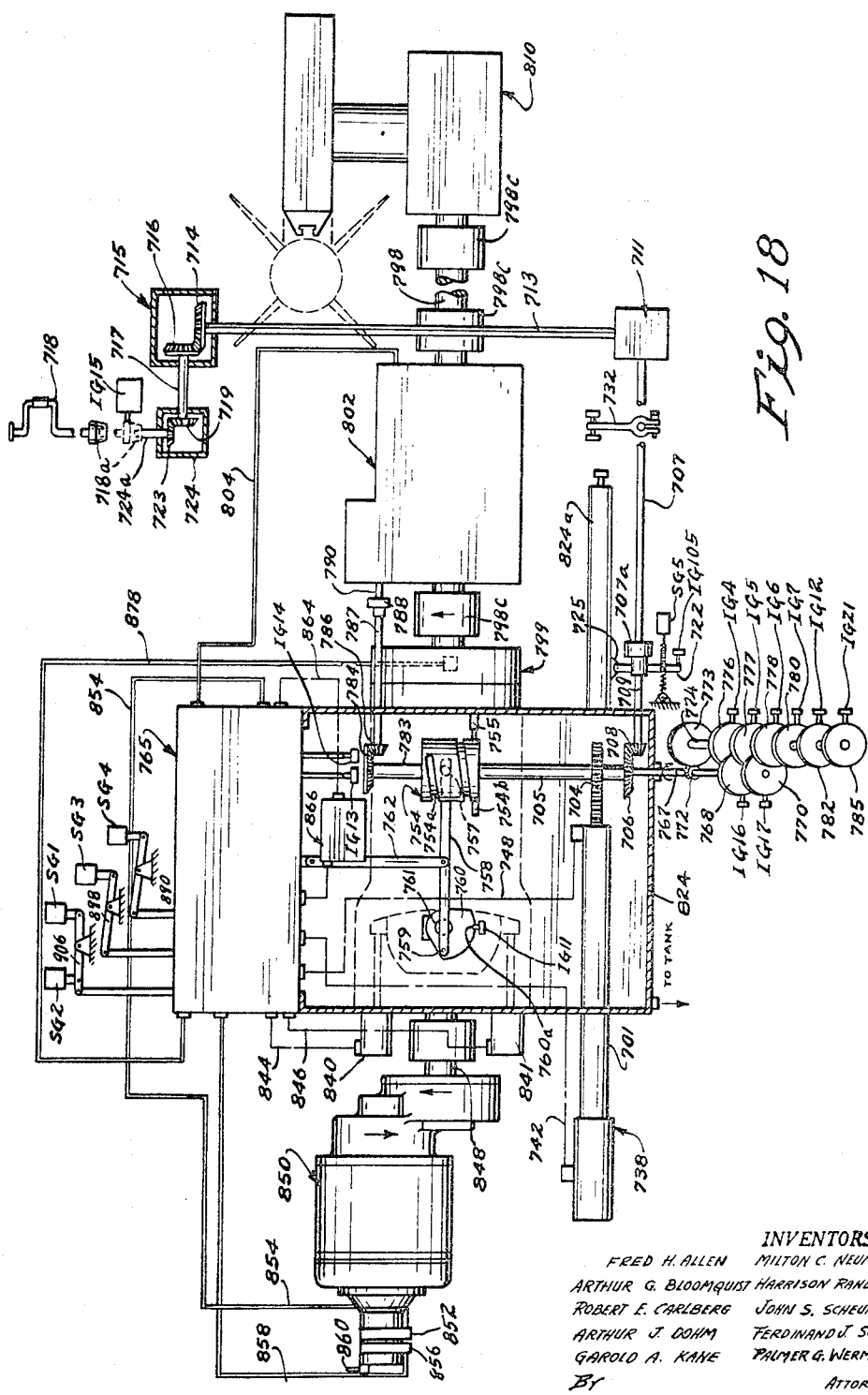

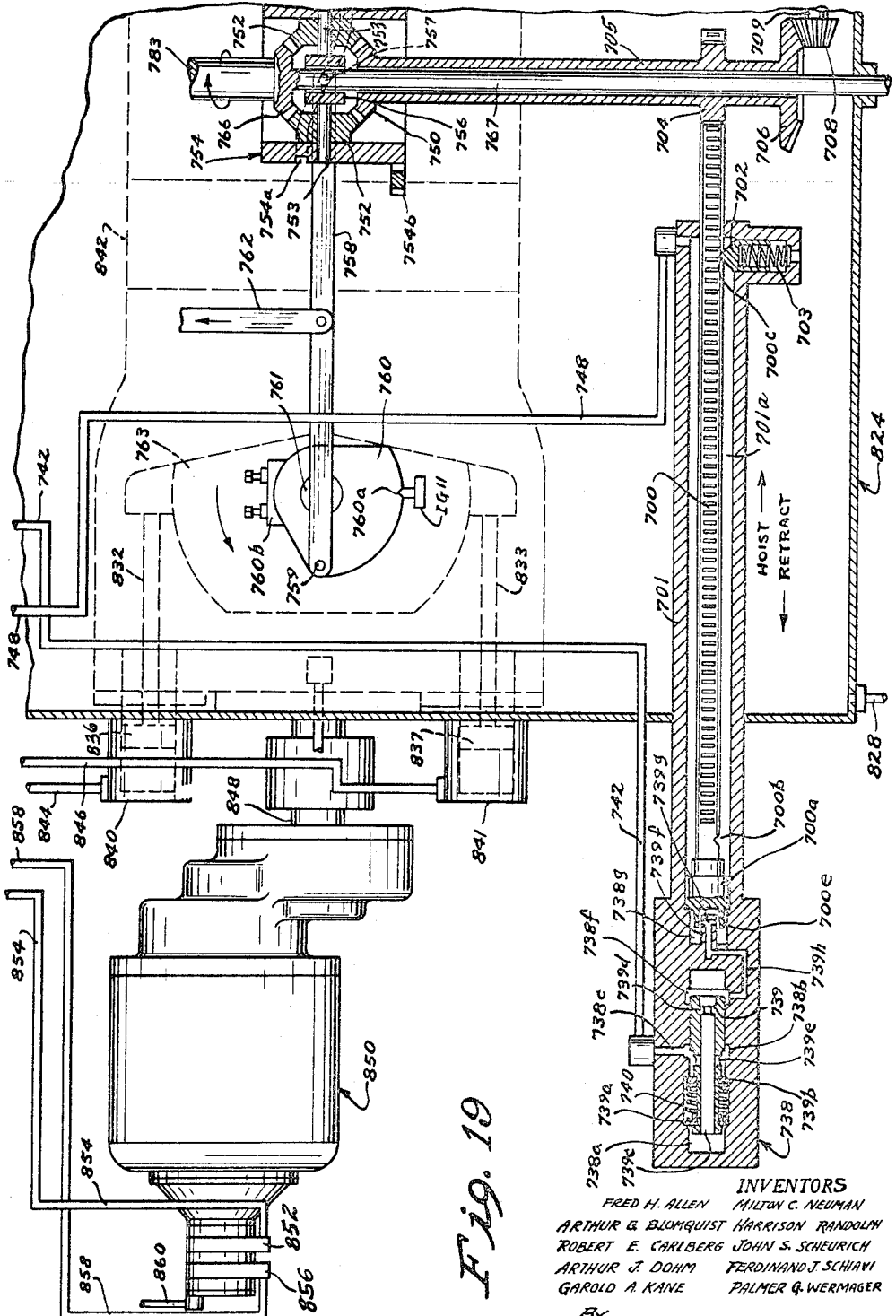

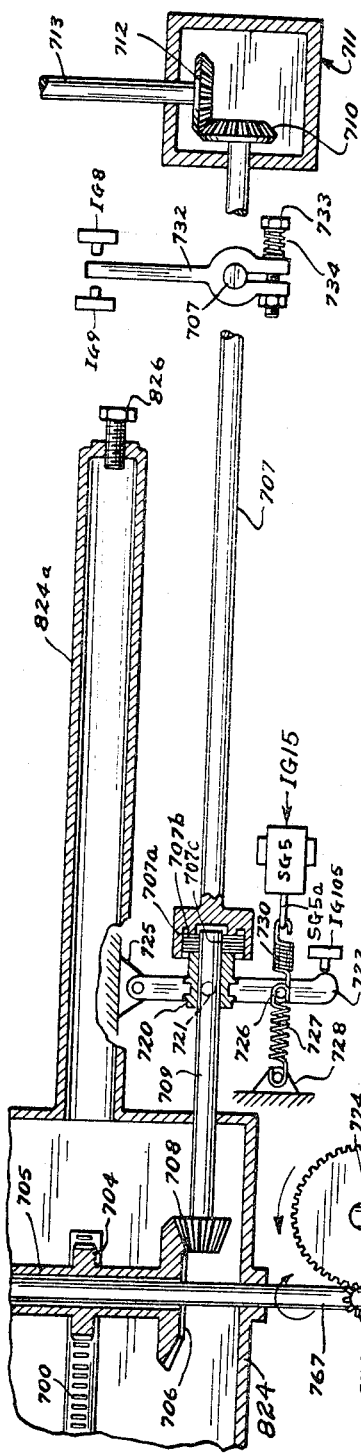

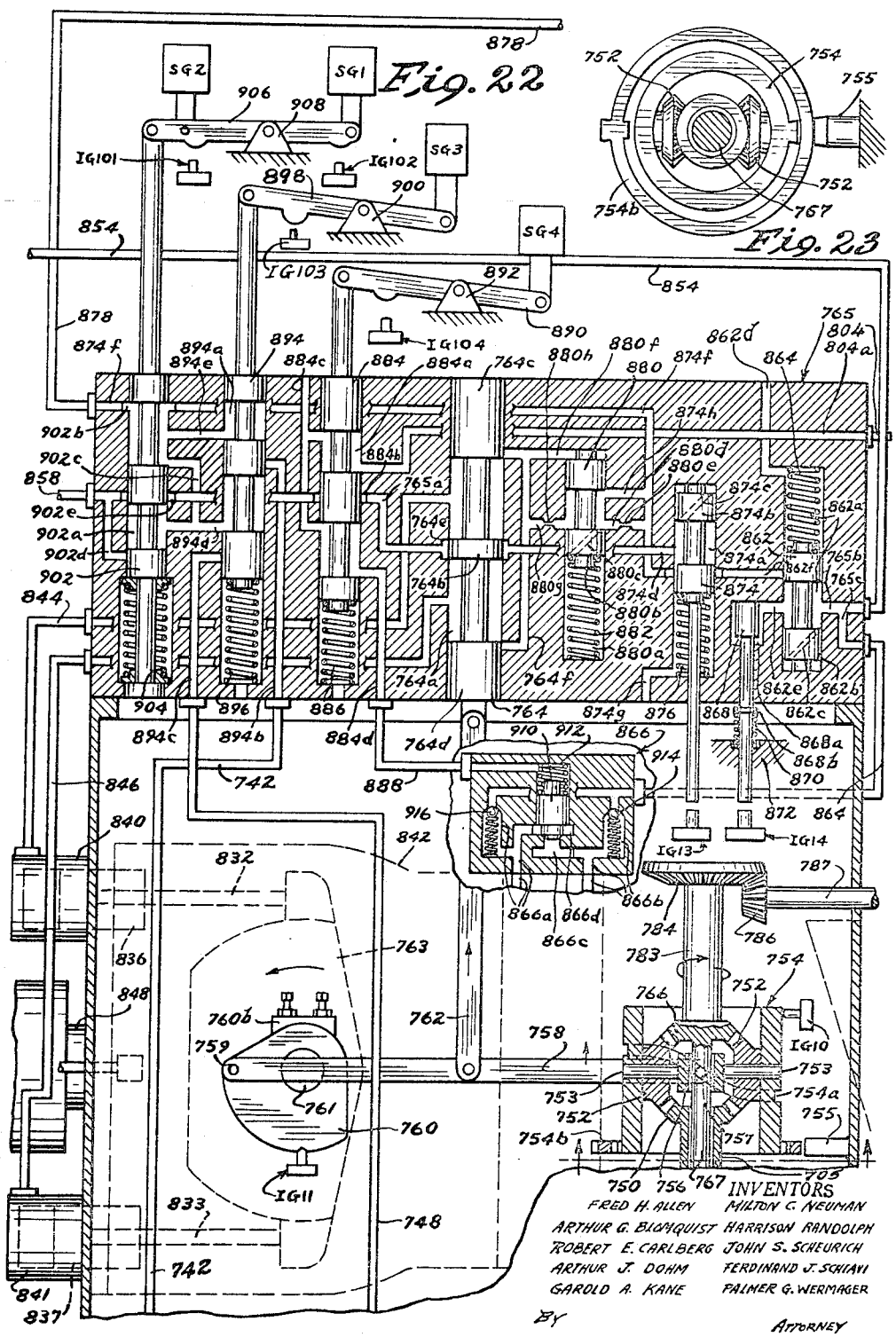

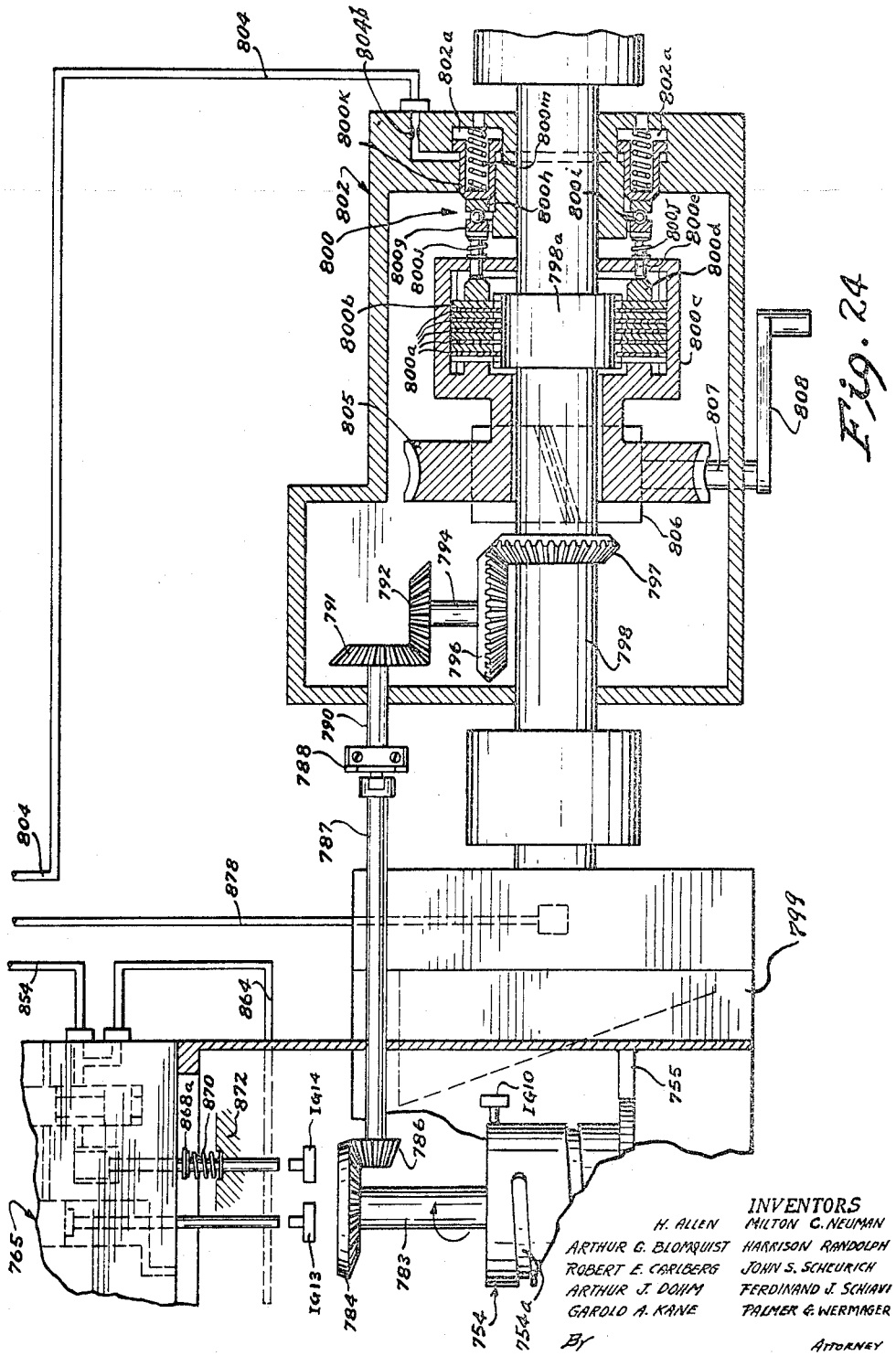

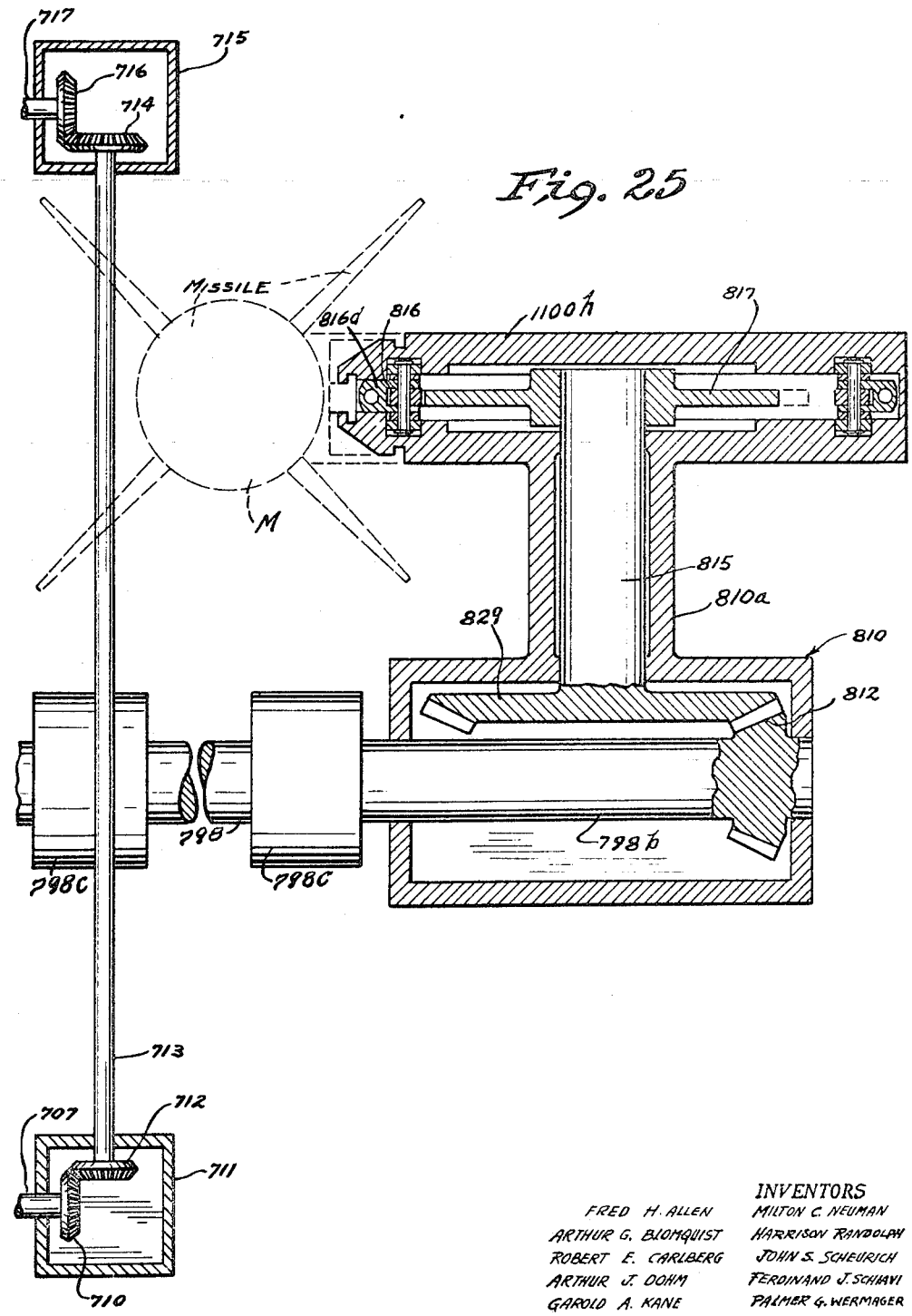

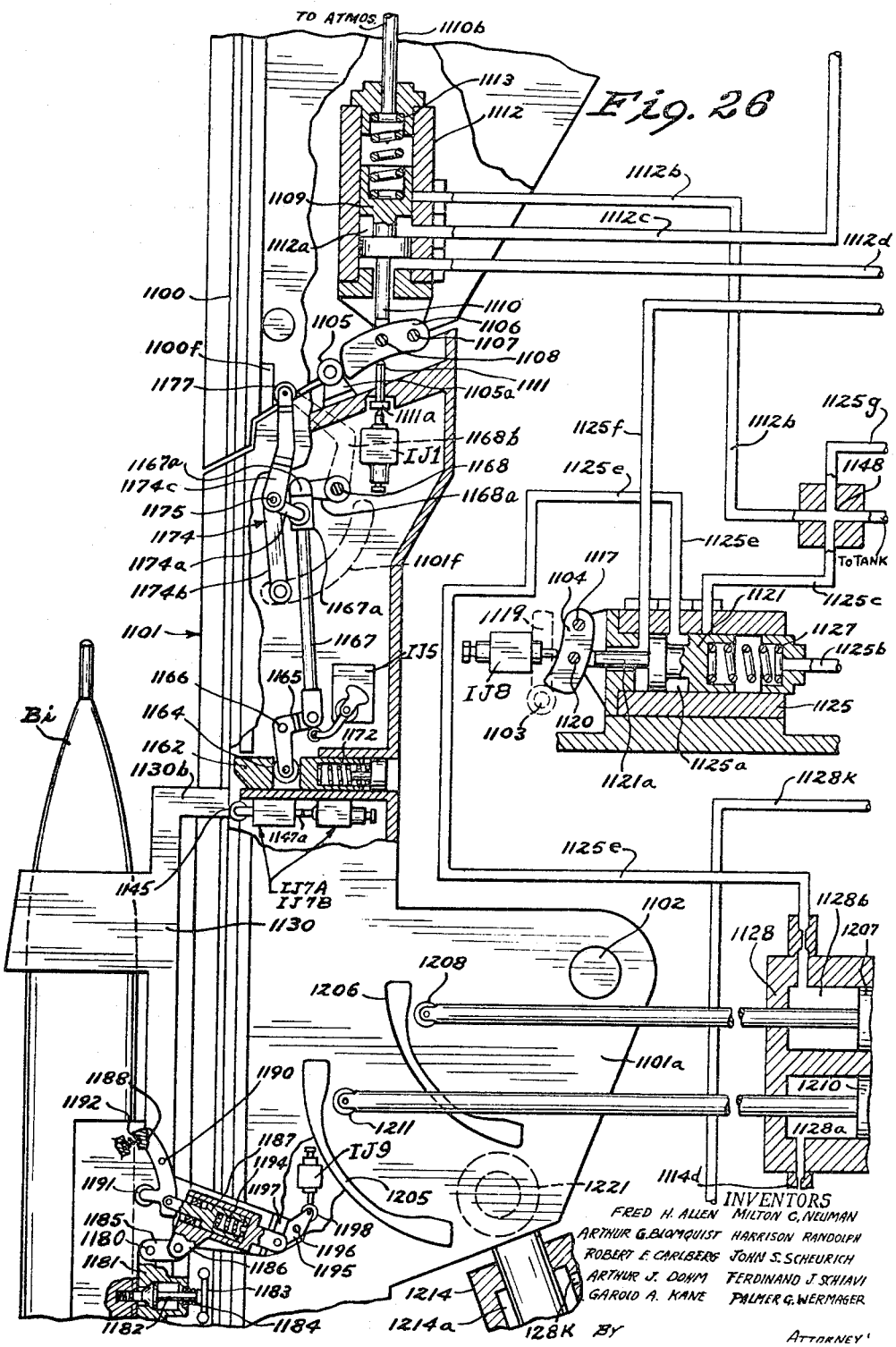

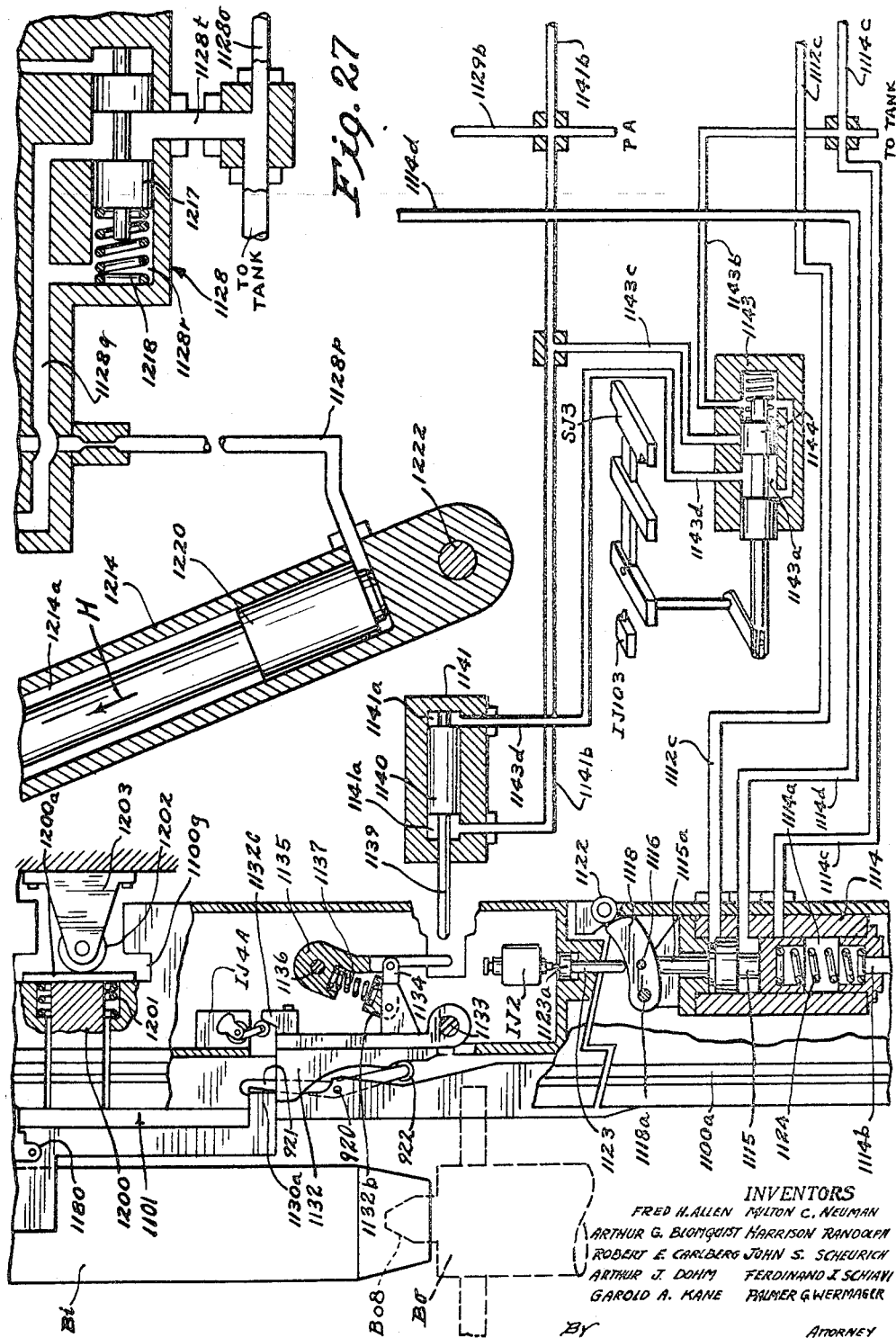

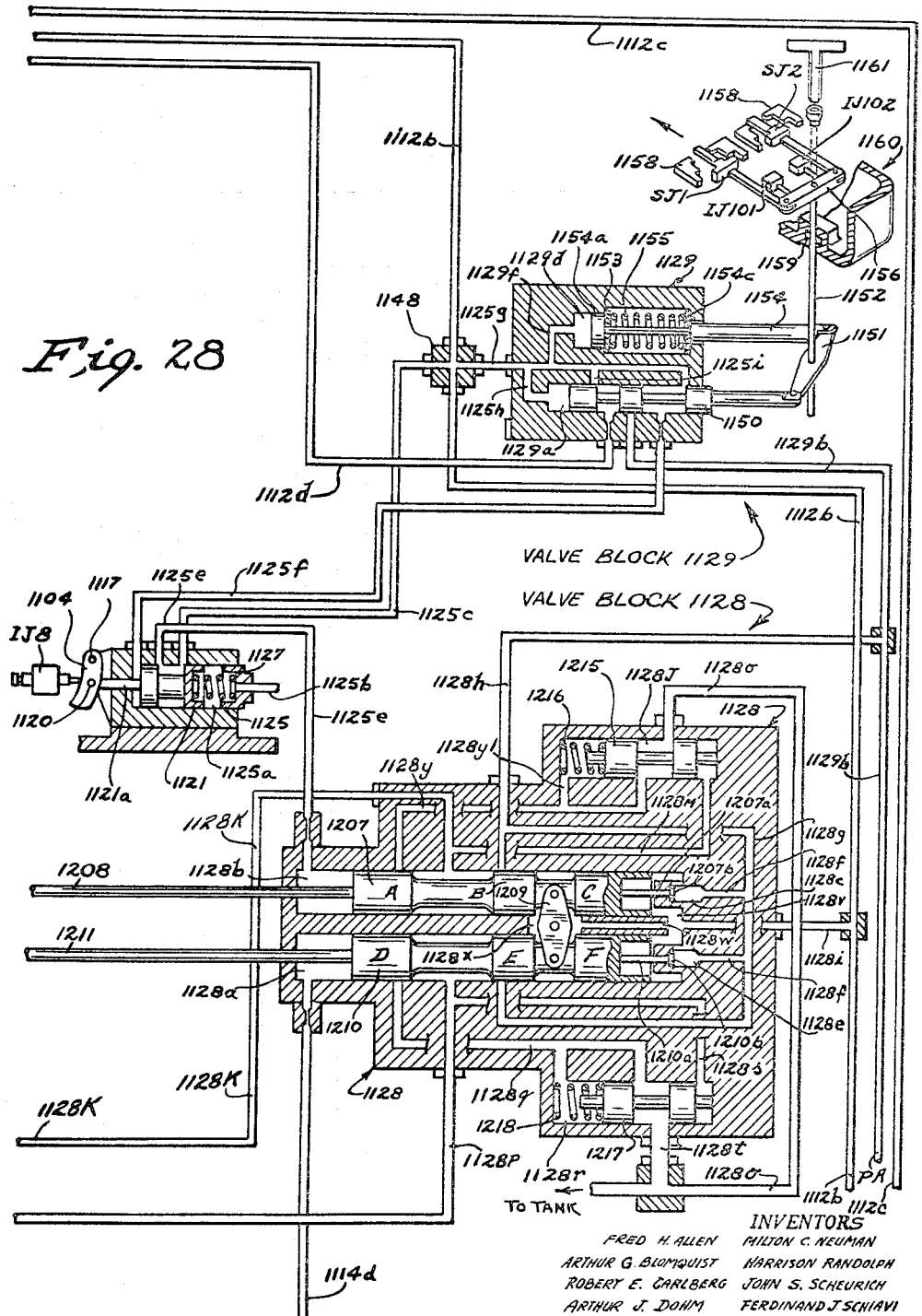

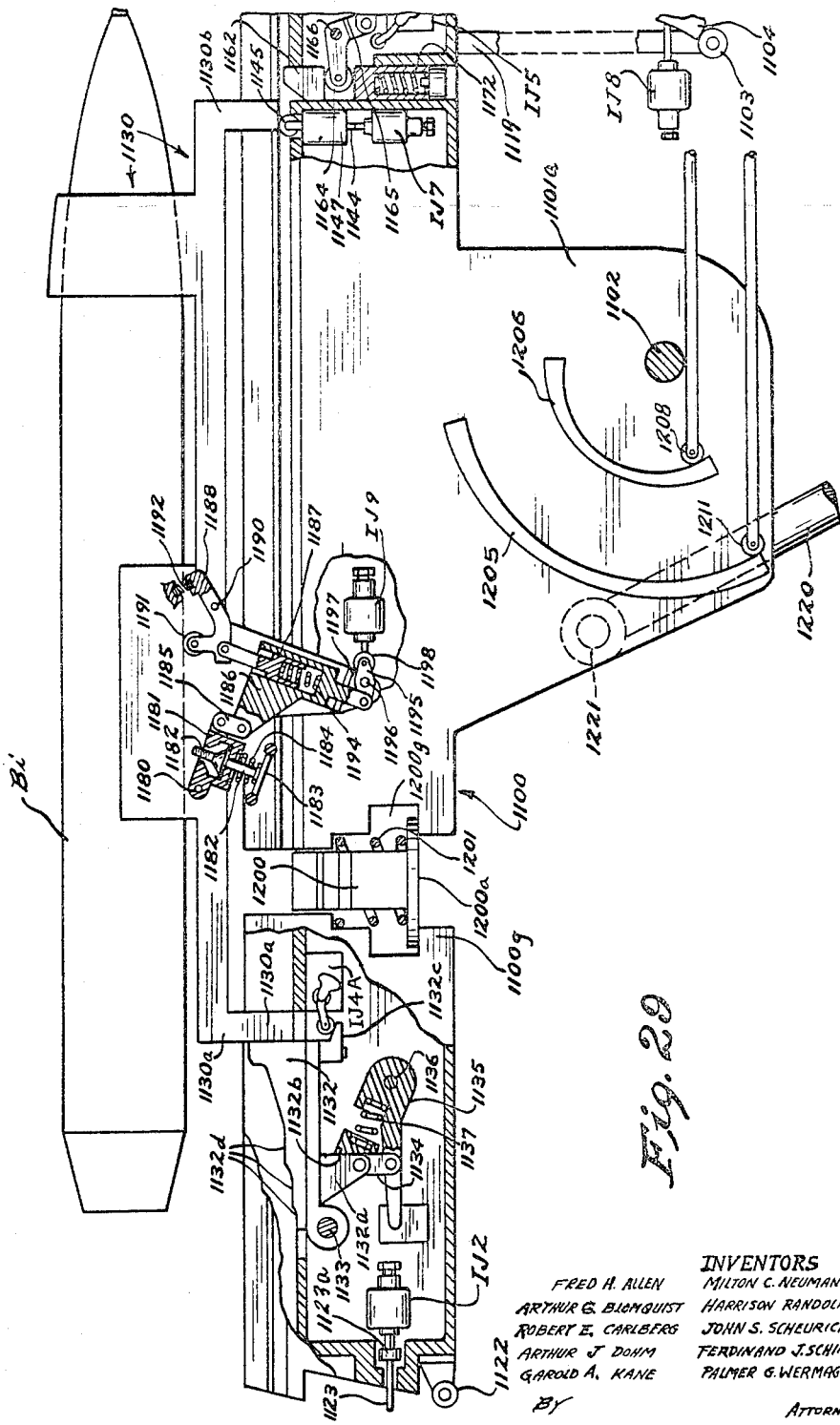

Oct. 4, 1966 G. A. KANE ETAL 3,276,321
APPARATUS FOR HANDLING MISSILE
Original Filed May 5, 1955 35 Sheets-Sheet 25

CRADLE IN HORIZONTAL POSITION

INVENTORS
FRED H. ALLEN  MILTON C. NEUMAN
ARTHUR G. BLOMQUIST  HARRISON RANDOLPH
ROBERT E. CARLBERG  JOHN S. SCHEURICH
ARTHUR J. DOHM  FERDINAND J. SCHIAVI
GAROLD A. KANE  PALMER O. WERMAGER
By
Attorney Oct. 4, 1966 G. A. KANE ETAL 3,276,321
APPARATUS FOR HANDLING MISSILE
Original Filed May 5, 1955 35 Sheets-Sheet 26

INVENTORS
FRED H. ALLEN   MILTON C. NEUMAN
ARTHUR E. BLOMQUIST   HARRISON RANDOLPH
ROBERT E. CARLBERG   JOHN S. SCHEURICH
ARTHUR J. DOHM   FERDINAND J. SCHIAVI
GAROLD A. KANE   PALMER G. WERMAGER

BY
ATTORNEY

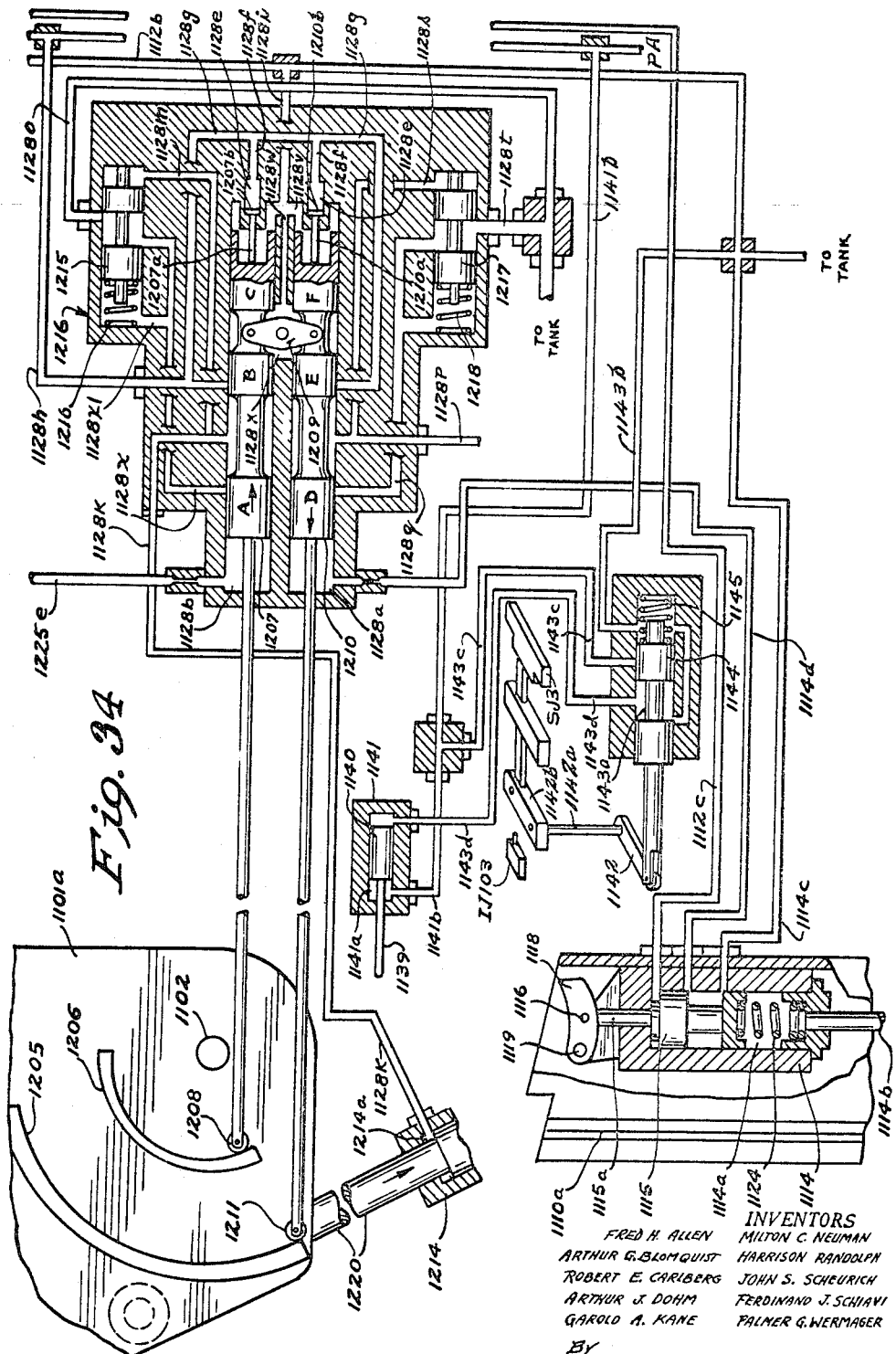

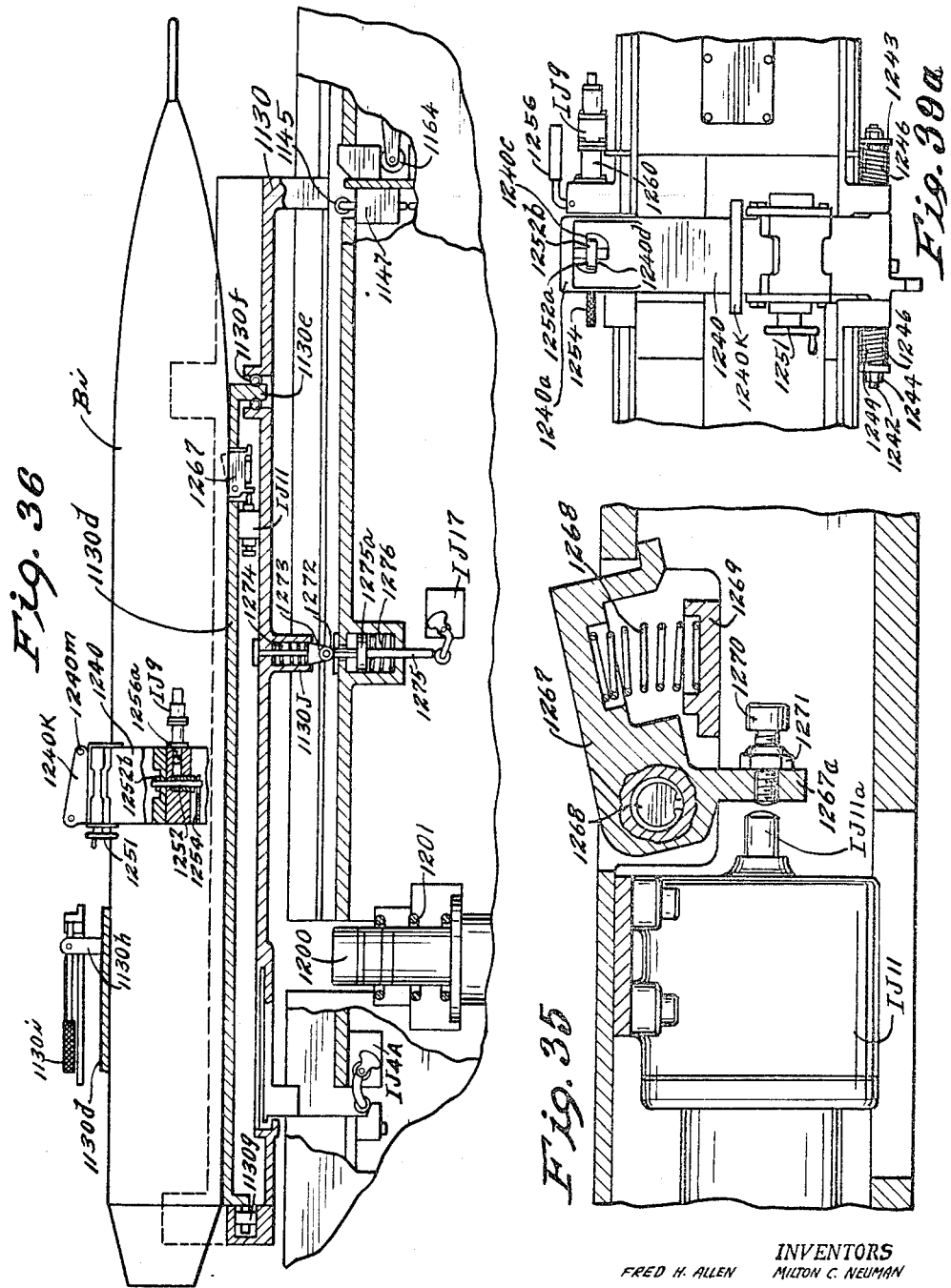

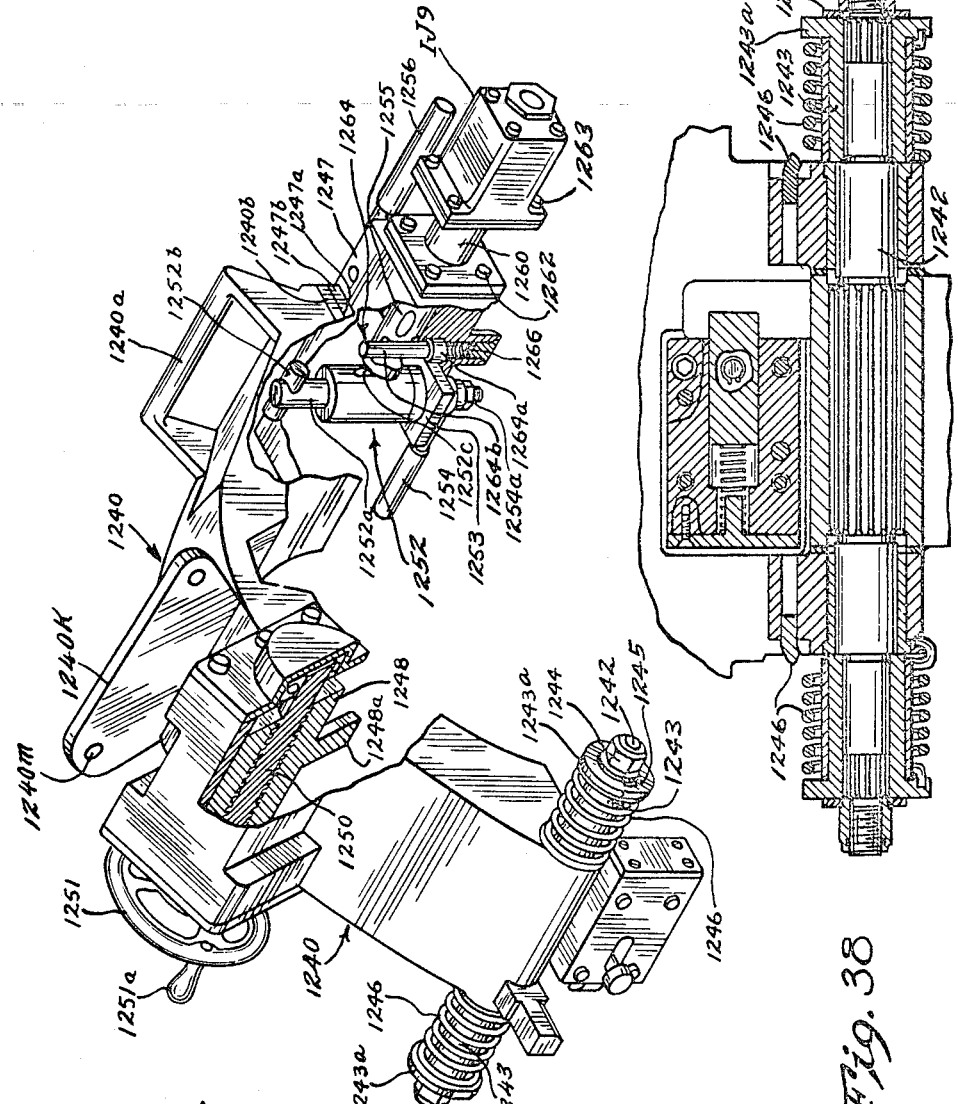

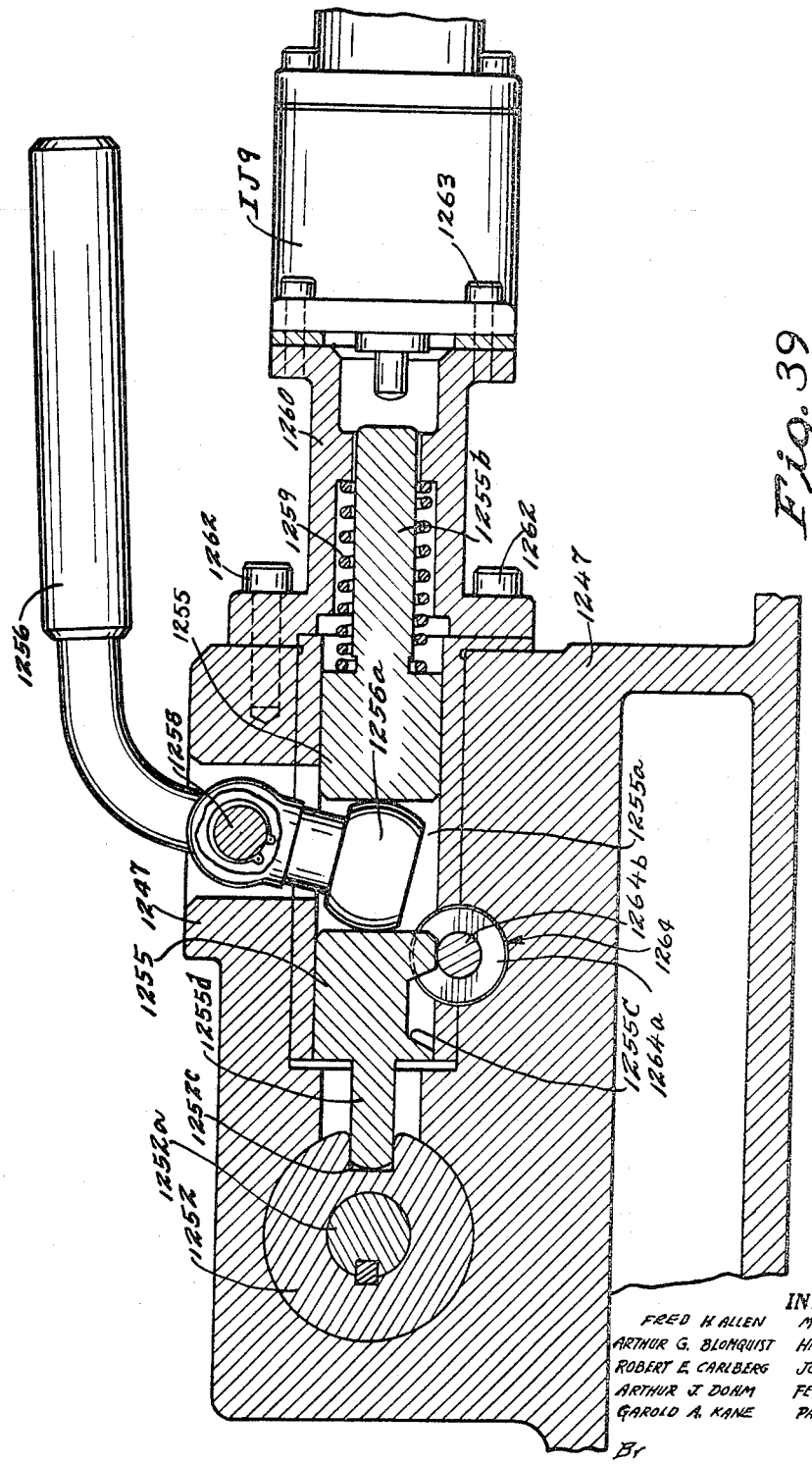

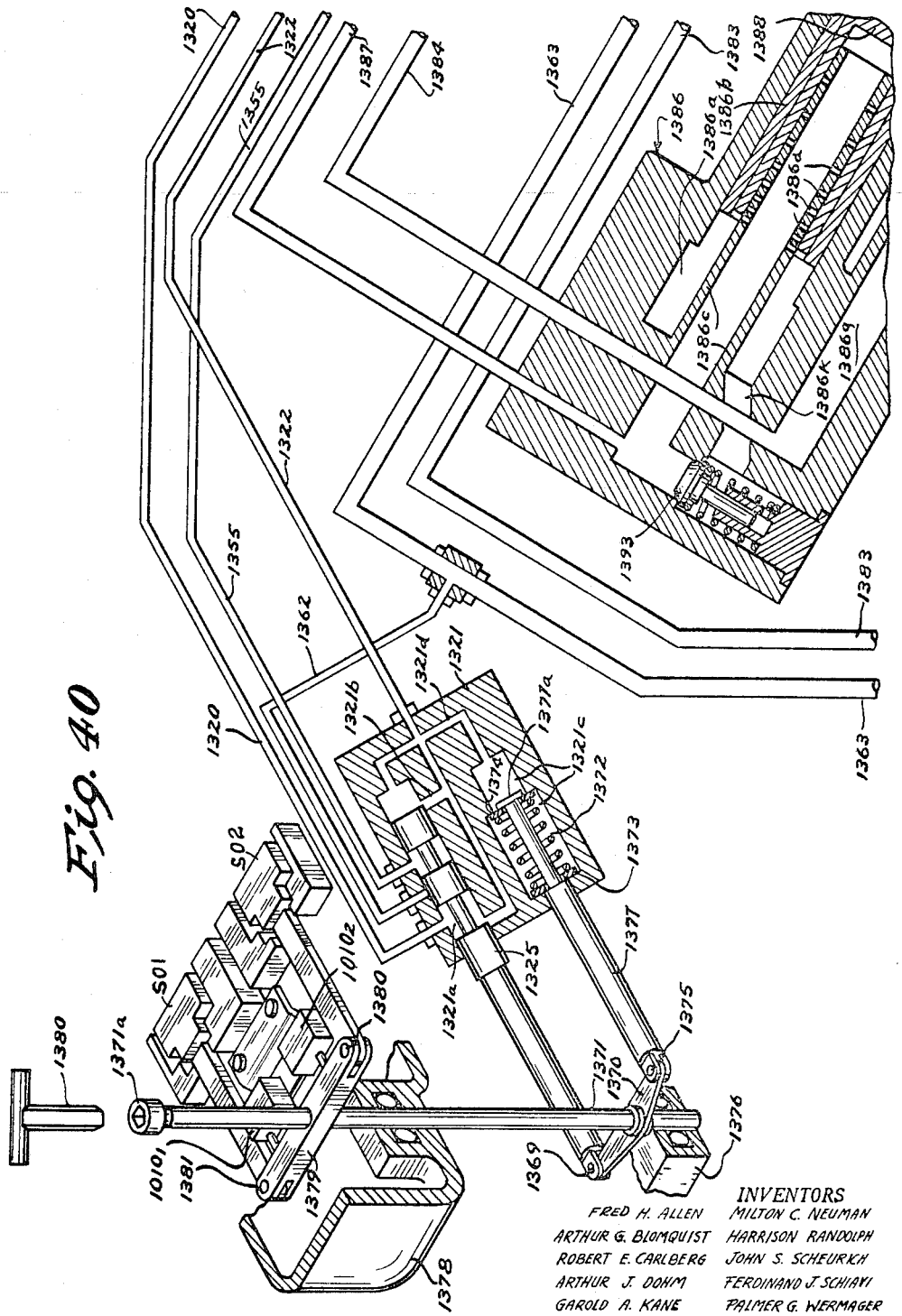

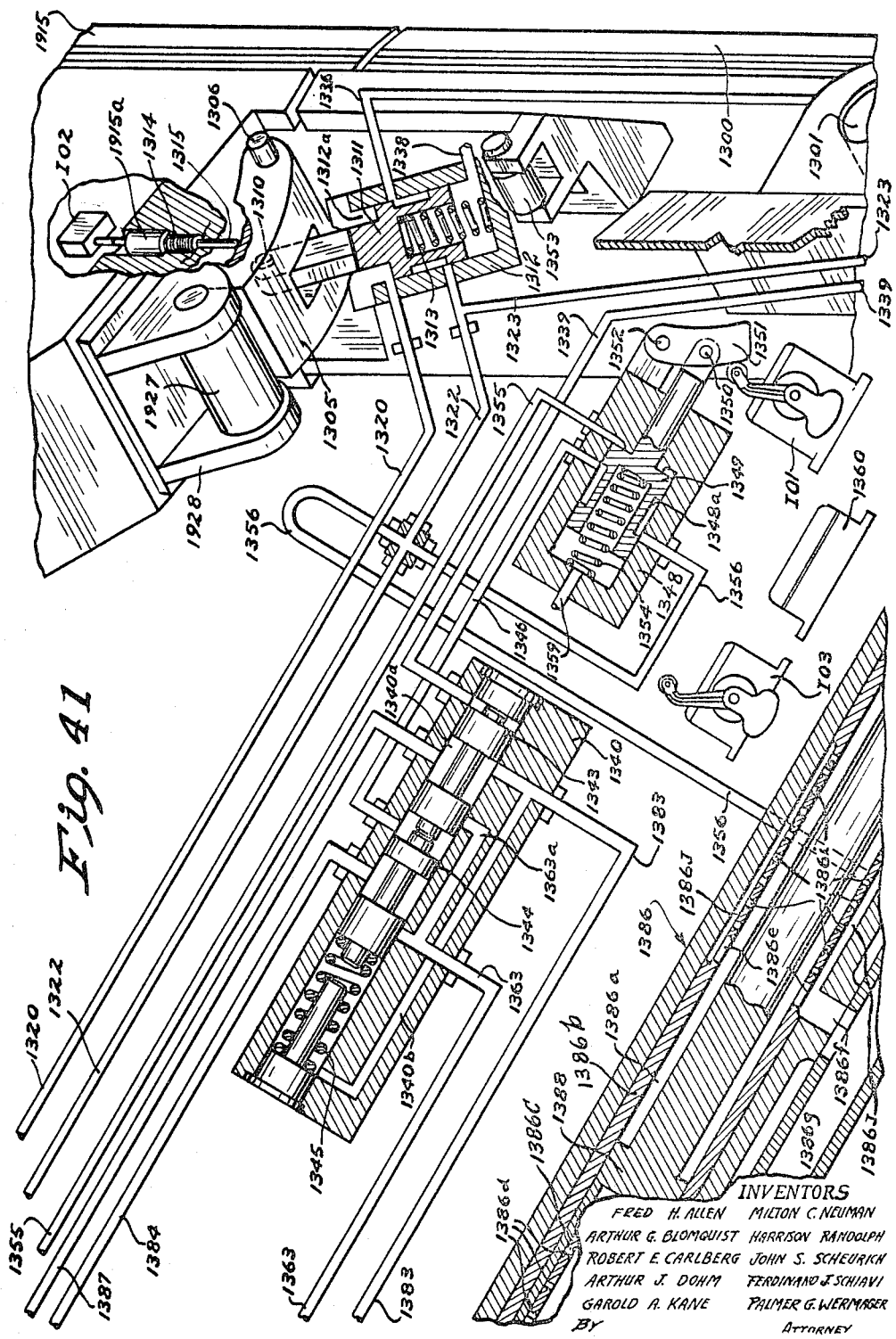

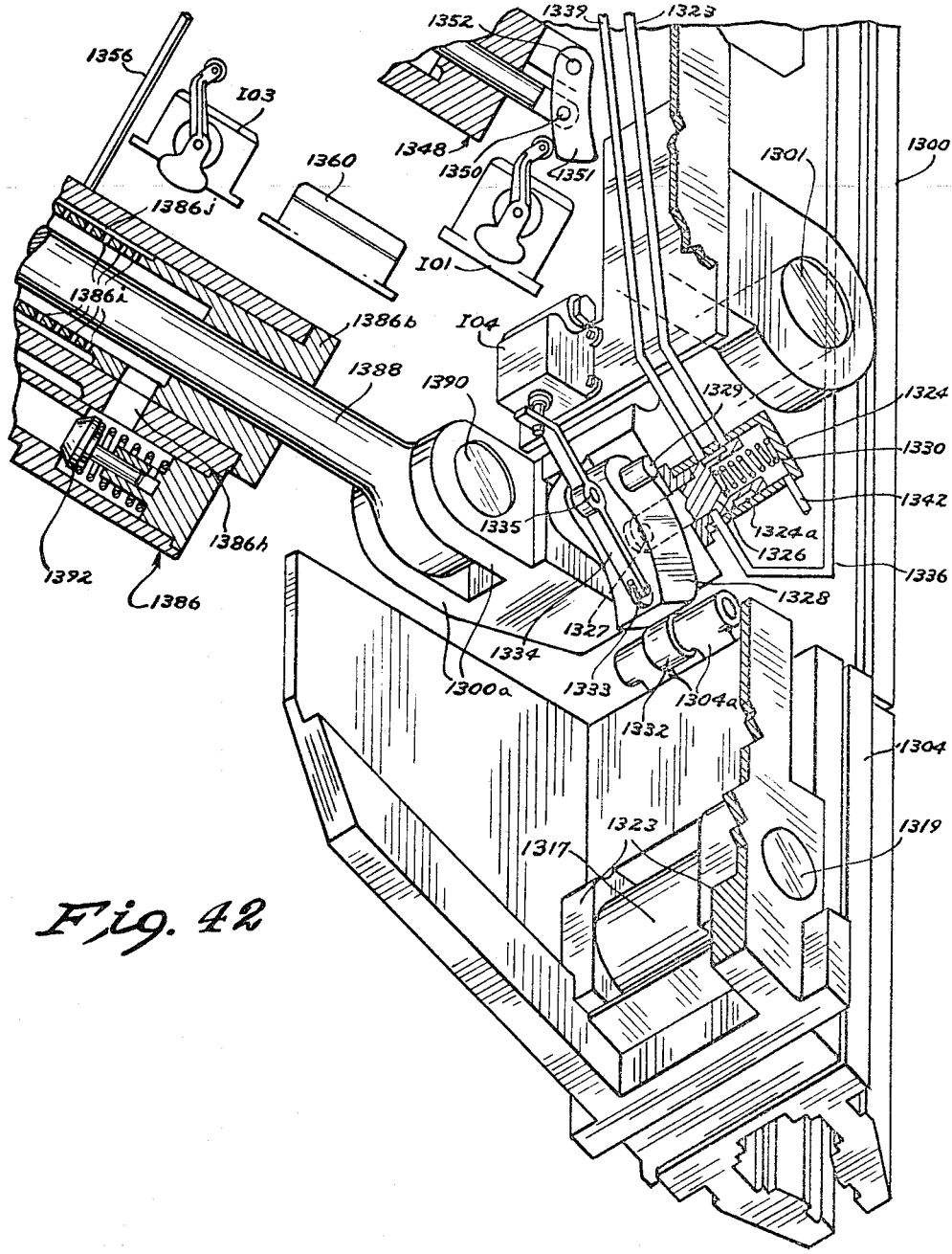

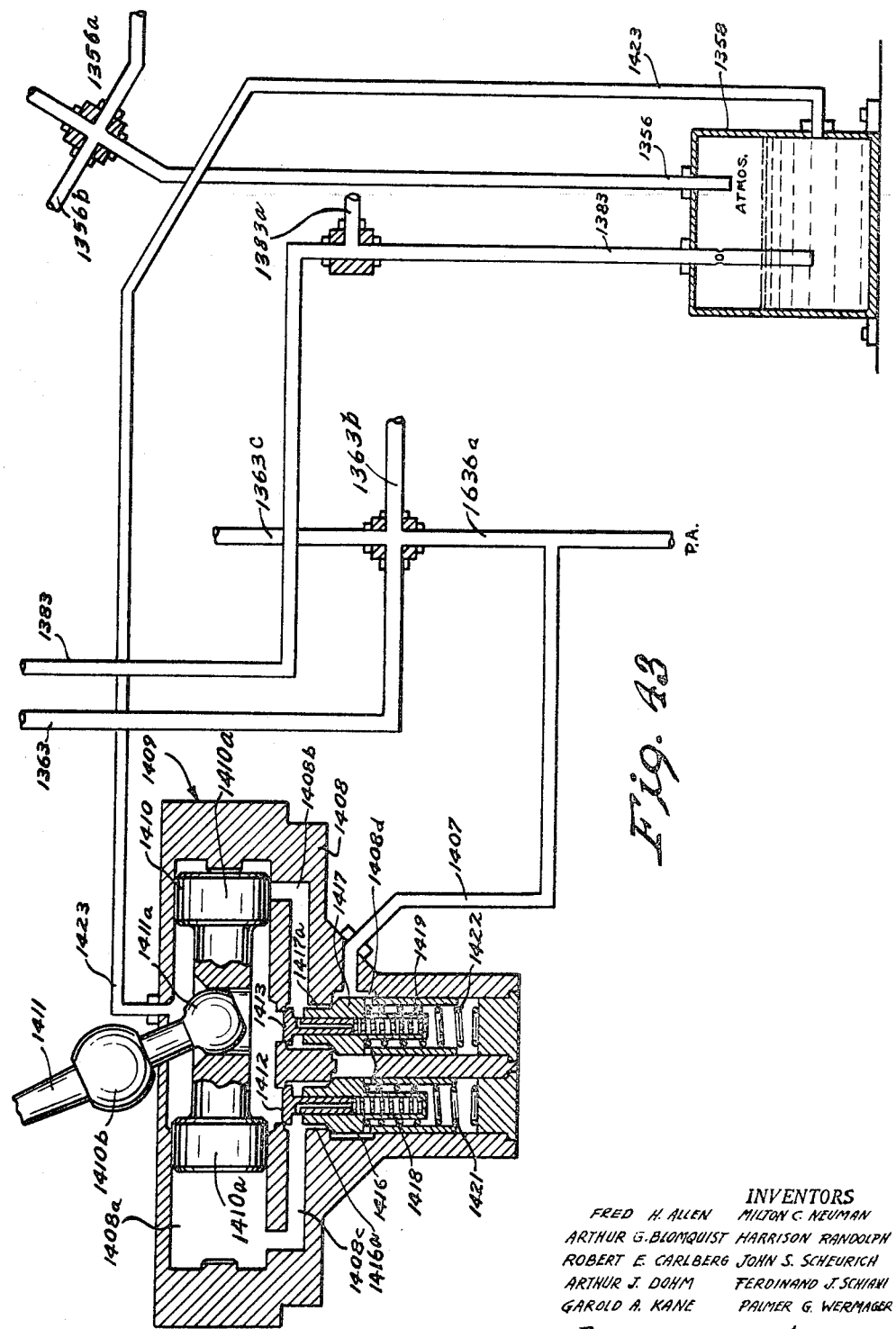

United States Patent Office 3,276,321
Patented Oct. 4, 1966

3,276,321
APPARATUS FOR HANDLING MISSILE
Garold A. Kane, Arthur G. Blomquist, Harrison Randolph, John S. Scheurich, and Palmer G. Wermager, Minneapolis, Minn., Fred H. Allen and Robert E. Carlberg, Washington, D.C., Ferdinand J. Schiavi, Falls Church, Va., and Arthur J. Dohm, Chisago City, and Milton C. Neuman, Champlin, Minn., assignors, by direct and mesne assignments, to the United States of America as represented by the Secretary of the Navy
Original application May 5, 1955, Ser. No. 506,392, now Patent No. 3,228,293, dated Jan. 11, 1966. Divided and this application Jan. 30, 1959, Ser. No. 796,720
16 Claims. (Cl. 89—46)

This application is a division of copending U.S. patent application Serial No. 506,392, filed May 5, 1955, now U.S. Patent No. 3,228,293, by the present applicants.

This invention relates to a method and apparatus for handling a guided missile used in warfare. The device handles and controls the missile from the time it is removed from a stock car which has transferred the missile from a ready service magazine until it is transferred to the launcher.

It is desirable to have a device which can handle the missiles positively and safely and move them successively at the desired rate to a launcher from which they are fired.

When the said device is mounted on a ship, all parts of the device of this invention are disposed below the main deck and are thus unexposed and protected.

It is desirable to have the various parts or components of such a missile-handling device automatically operated, the same being controllable from one station.

It is an object of this invention to provide an automatic missile-handling device for conveying a continuous supply of missiles to a launching mechanism at a desired rate.

It is another object of this invention to provide a missile-handling device comprising a hoist, and means for operating said hoist to move said missile to a launching device.

It is a further object of this invention to provide a missile-handling device which comprises a hoist, said hoist moving said missile while in vertical position from a car which moves the missile from a stowage mechanism to said hoist to a launcher device.

It is also an object of this invention to provide a missile-handling device comprising a hoist having a portion along which a missile is moved, a spanning rail between said hoist and a launching device also having a portion along which a missile is moved, said spanning rail being movable to a position in which said portions are in longitudinal alinement, and to a position forming an opening between said second mentioned portion and said mechanism.

It is another object of the invention to provide a missile-handling device comprising a hoist having a hoist rail along which a missile is moved, said rail having a portion movable from a hoist or delivery position alined with the remainder of said rail to a receiving position in which parts of the missile may be placed thereon, and means for so moving said portion.

It is a further object of the invention to provide a device as set forth in the preceding paragraph, with automatically operating means for controlling the acceleration and deceleration of said portion when moved to receiving and delivery positions.

It is also an object of this invention to provide such a device as set forth in the last paragraph save one, with means for latching said portion in delivery and receiving positions.

It is also an object of this invention to provide a missile-handling device for handling a missile comprising a bird part and a booster part, comprising a hoist having a rail along which a missile is moved, a portion of said rail being movable from a hoist position to a receiving position, means for moving said portion to said hoist and receiving positions, and means for placing one of said missile parts on said portion while in receiving position.

It is more specifically an object of this invention to provide a device as set forth in the preceding paragraph, together with means for latching said portion in either of said positions and for securing said bird and booster parts to said portion to hold the same securely while said portion is moved from said receiving position to said hoist position.

These and other objects and advantages of the invention will be fully set forth in the following description made in connection with the accompanying drawings in which like reference characters refer to similar parts throughout the several views and in which:

FIG. 2 is a perspective view of a portion of the Hoist and Strikedown Cradle shown on an enlarged scale;

FIG. 3 is a partial perspective view of a lower portion of the Hoist, and drive means therefor.

FIG. 4 is a view mainly in side elevation with some parts broken away and others shown in vertical section showing the spanning rail connecting the hoist rail and launcher arm;

FIG. 5 is a view in side elevation showing a portion of the Hoist and the location of the storage bins for wings and fins;

FIG. 6 is a view partly in side elevation but mostly in vertical section showing the Hoist Pawl and operating means therefor;

FIG. 7 is a view mostly in vertical section showing some of the operating mechanism for the Hoist Pawl;

FIG. 8 is a partial perspective view showing a portion of the Hoist Pawl mechanism;

FIG. 10a is a view in side elevation and partly in vertical section showing portions of the Hoist and Hoist Pawl Piston. In FIGS. 6 to 8 the parts are schematically shown;

FIG. 10b is a horizontal section taken on line 10b—10b of FIG. 10a, showing a portion of the Hoist Pawl Piston;

FIG. 11 is a view in side elevation of the Hoist housing and some of the operating mechanism for the Hoist chain;

FIG. 12 is a view in front elevation of the parts shown in FIG. 11;

FIG. 13 is for the most part a vertical section through the Hoist column showing the Hoist chain and other parts;

FIG. 14 is a horizontal section taken on line 14—14 of FIG. 13 as indicated by the arrows and shown on an enlarged scale;

FIG. 15 is a horizontal section taken on line 15—15 of FIG. 13 as indicated by the arrows and shown on an enlarged scale;

FIG. 16 is a vertical section taken on line 16—16 of FIG. 15, as indicated by the arrows and shown on an enlarged scale;

FIG. 17 is a vertical section taken on line 17—17 of FIG. 12 as indicated by the arrows and shown on an enlarged scale;

FIG. 18 is a diagrammatic plan view showing the control mechanism for the Hoist in moving a missile to the Launcher;

FIG. 19 is a view partly in plan and partly in horizontal section showing a portion of the control mechanism for the Hoist;

FIG. 20 is a view partly in plan and partly in horizontal section showing another portion of the Hoist Control Mechanism;

FIG. 21 is a vertical section of a valve used in the Hoist Control Mechanism;

FIG. 22 is a view mostly in horizontal section showing a valve block and other parts of the Hoist Control Mechanism;

FIG. 23 is a vertical section taken on line 23—23 of FIG. 22 as indicated by the arrows;

FIG. 24 is a view partly in plan and partly in vertical section showing a portion of the Hoist Control Mechanism;

FIG. 25 is a view partly in plan and partly in horizontal section showing a portion of the Hoist Control Mechanism, FIGS. 19 to 25 being shown on an enlarged scale. The parts in FIGS. 18 to 20 and 22 to 25 are schematically shown;

FIG. 26 is a view partly in side elevation and partly in vertical section showing a portion of the Strike Down Cradle;

FIG. 27 is a view partly in side elevation and partly in vertical section showing a portion of the Strike Down Cradle;

FIG. 28 is a diagrammatic view of a portion of the control mechanism for the Strike Down Cradle;

FIG. 29 is a view partly in vertical section and partly in side elevation showing a portion of the Strike Down Cradle;

FIG. 34 is a diagrammatic view showing some of the control mechanism for the Strike Down Cradle;

FIG. 35 is a view in vertical section showing a latch used on the Strike Down Cradle;

FIG. 36 is a view in vertical section of a portion of the Strike Down Cradle;

FIG. 37 is a perspective view partly in vertical section showing a clamp for the missile used on the Strike Down Cradle;

FIG. 38 is a horizontal section through some of the parts shown in FIG. 37;

FIG. 39 is a horizontal section through a portion of the mechanism shown in FIG. 37;

FIG. 39a is a view in front elevation of the clamp shown in FIG. 37. In FIGS. 26 to 34, 36, 37 and 39a the parts are schematically shown;

FIG. 40 is a diagrammatic view partly in perspective and partly in vertical section showing a part of the control mechanism for the Spanning Rail;

FIG. 41 is a diagrammatic view partly in perspective and mostly in vertical section showing a portion of the control mechanism for the Spanning Rail;

FIG. 42 is a diagrammatic view showing a portion of the Spanning Rail and the control mechanism therefor;

FIG. 43 is a diagrammatic view partly in vertical section showing some of the control mechanism for the Spanning Rail. The parts in FIGS. 40 to 43 are schematically shown.

PARTS AND GENERAL ARRANGEMENT

Figure 1:
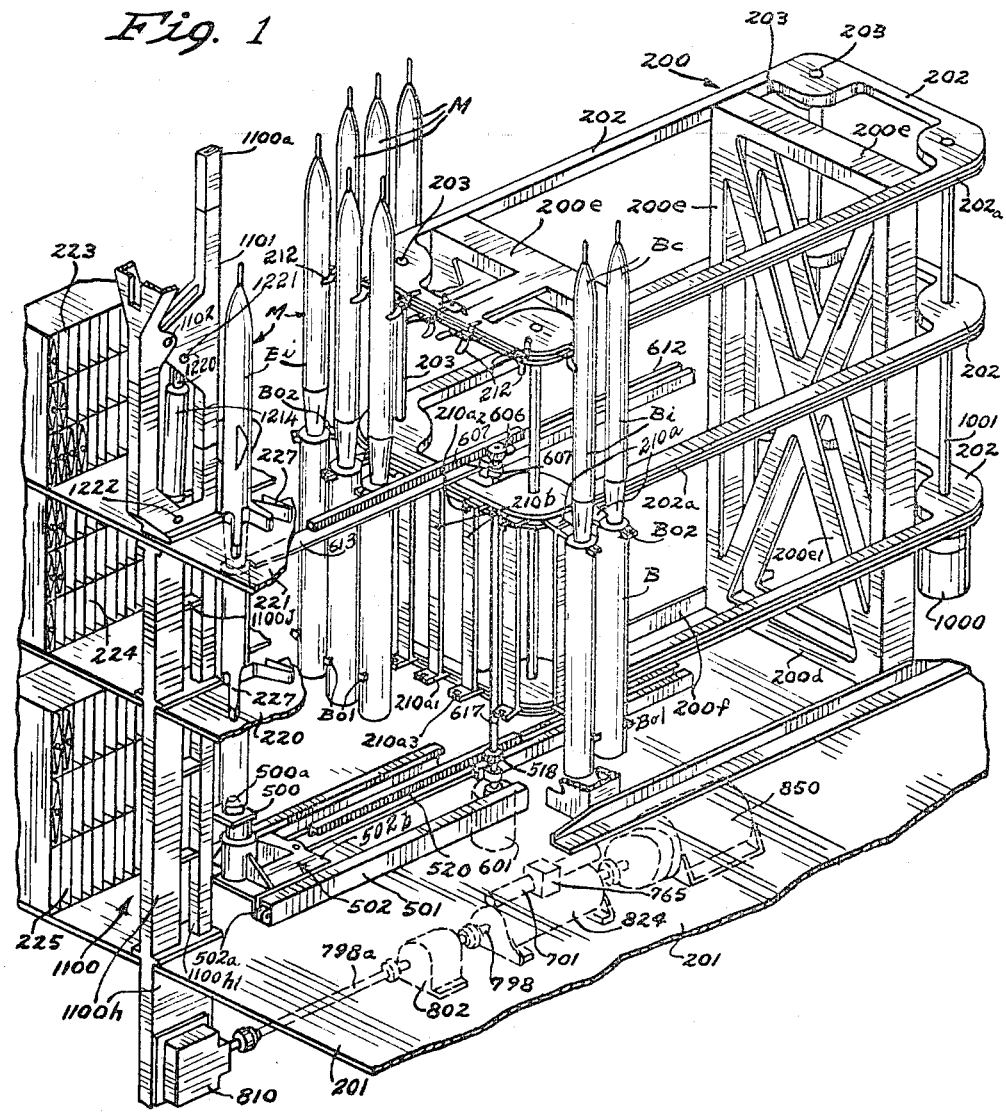
FIG. 1 is a perspective view of the device showing particularly the Hoist and its relationship to the Ready Service Ring and Transfer car.

The missile-handling device of this invention comprises as the principal elements thereof a frame, a pair of spaced hoists each having a rail along which missiles are moved, a pair of stowage mechanisms for missiles, called "Ready Service Rings," and two Transfer Mechanisms for moving missiles from said Ready Service Rings to and from said hoists respectively, as well as a Launcher comprising a member rotatable for training and carrying a pair of spaced launcher arms oscillatable for elevation, each of said arms having a rail along which a missile is moved, said rails cooperating respectively with said hoist rails for receiving a missile. The hoist moves the missile upwardly along the hoist rail and onto the rail of the launcher arm.

The missile M handled by the device of the present invention comprises upper and lower parts called the "bird" designated $Bi$, and the "booster" designated $Bo$ respectively. The booster $Bo$ is of general cylindrical form. The bird has a lower cylindrical portion and an upper portion which tapers upwardly substantially to a point. The booster has two aft lugs $Bo1$ at opposite sides thereof respectively adjacent its lower end. Each aft lug is T-shaped in plan. The booster also has two forward lugs $Bo2$ closely adjacent its upper end at opposite sides thereof respectively and longitudinally alined with the aft lugs. Each forward lug comprises a pair of spaced tapered arms projecting from the bird and having portions at their ends extending towards each other. (See FIGS. 2, 8, 33.) When the missile is moved along the hoist rail and launcher arm rail, one forward lug embraces said rails and said portions thereof move in slots in the sides of said rails. (See FIG. 14.) During such movement the aft lug travels in a T-shaped channel in front of each of said rails. As stated, booster $Bo$ has a frusto-conical portion $Bo8$, FIG. 27, at its upper end. Said portion $Bo8$ enters a recess in the bottom of the bird $Bi$. When the booster is moved upwardly to the bird, portion $Bo8$ enters the recess in the bottom of the bird and by appropriate and well known latch means, not shown, the booster is then latched to the bird. (See FIG. 26.) The bird has circumferentially spaced channel wing $Bi1$ thereon and similarly spaced tail fins $Bi2$. The booster has circumferentially spaced tail wings $Bo3$ at its lower end. (See FIGS. 3, 4 and 5.)

The booster portion of the missile adjacent its lower end has sets of contacts, not shown, in its periphery. There is one set of these contacts on one side of the missile and another set spaced one hundred and eighty degrees from said first mentioned set on the other side. Each set has four contacts therein. These contacts are used for warming up the missile. The missile also has an arming device, not shown, in the booster portion thereof adjacent the top of the latter.

Each hoist 1100 has a housing 1100h, the lower portion of which extends below the platform 201 of the handling room of a ship or the like. See FIGS. 1 and 3. Said hoist housing extends upwardly, and above said floor comprises two portions connected at intervals by members 1100j. One of said latter portions designated 1100h1 carries the hoist rail 1100a. See FIGS. 1, 2 and 14. Said hoist rail is specifically described under the heading "hoist Chain Drive." Each hoist 1100 comprises a chain 816 movable in housing 1100h. The hoist drive is disposed in a drive housing 810. See FIGS. 13 to 17. Some of the hoist drive and control parts 765, 798, 798a, 802, 824 and 850 are shown diagrammatically in FIGS. 1 and 3. These parts are specifically shown in FIGS. 18 to 25, and are described under the heading "Hoist Control in Moving Missile to Launcher."

A portion 1101 of each hoist is pivotally mounted to swing about a pivot 1102 extending transversely of the hoist, as shown in FIGS. 1 and 2. Said portion 1101 is called the "Strike Down Cradle." Said cradle 1101 is moved by a plunger 1220 connected thereto by a pivot 1221 and movable in a hydraulic cylinder 1214 pivoted to swing about a pivot 1222. Cradle 1101 is used to receive portions of the missile in the missile assembling operation. Its operation is fully described under the heading "Strike Down Cradle."

Two vertically spaced platforms 220 and 221 are provided above the handling room platform. A plurality of bins 223, 224 and 225 are supported on platforms 221, 220 and the handling room platform 201 respectively. Each of said bins comprises a multiplicity of compartments adapted to receive wings and fins for said missiles. These platforms are adjacent the hoist, so that the hoists can each bring a missile into position adjacent said platforms and the operators can take the wings and fins from said compartments and attach them to the missiles. A guard device 227 is located above platforms 220 and 221 to prevent injury to the operators in placing the fins or wings onto the missile.

A short portion 1300 of the hoist rail similar in cross section to the hoist and launcher arm rails is disposed adjacent the launcher arm rail and between the same and the upper end of the hoist rail. This is called the "Spanning Rail." It is swingable about a pivot 1330 and moved by power control means including a piston arm 1388 having a piston thereon movable in hydraulic cylinder 1386 pivotally mounted on a pivot 138a. Rail 1300 can be swung substantially to horizontal position. This leaves an opening between the launcher arm rail and the hoist rail. A plate-like member 1500 called the Blast Door is movable transversely of the hoist into said opening and is then directly below the bottom of the booster so that it will receive the impact of the gases discharged by the missile when the latter is fired. A small portion 1100a1 of the upper end of the hoist rail is pivoted on pivot 1319 and resiliently held in position for purposes of alinement.

A trolley 1922 has supporting arms extending upward therefrom to which are secured wheels 1922a movable in channels 1920. The trolley 1922 is used to load parts of the missile onto the strikedown cradle when the latter is in horizontal position.

HOIST PAWL PISTON

Figure 10:
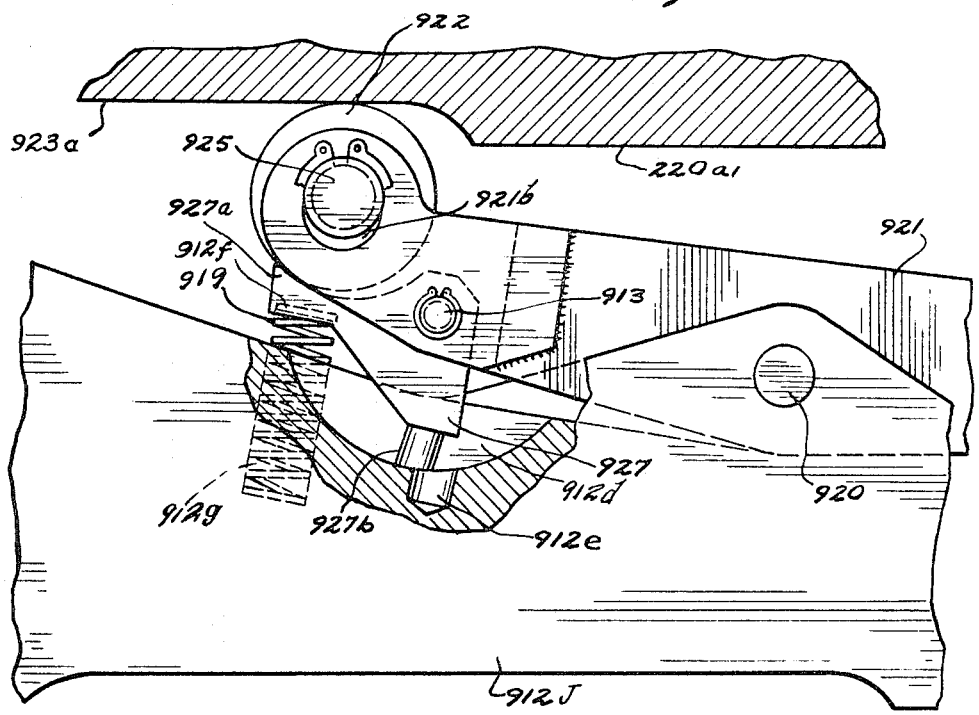
FIG. 10 is a partial view in side elevation and partly in vertical section of the parts shown in FIG. 9.

The hoist chain 816, FIG. 13, has connected thereto at one end a hoist pawl 912. Pawl 912 comprises a portion 912j, FIG. 10a, and a portion 912k. Portion 912k comprises a pair of elongated bars having spaced rollers 915 thereon. Upper roller 915 is rotatable on pivot 910, FIG. 6. Rollers 915 move in the channel 1100b, FIG. 14, of the hoist rail. Members 912k are thus held in vertical position. Pawl portion 912j has limited swinging movement about pivot 910. Each pawl portion 912k has a bore therein at its upper end in which a member 917, FIG. 6, is movable. A spring 916 urges member 917 upwardly. A pin 918 is secured in and extends between members 917, the same passing through an inclined slot 912c in pawl portion 912j. Pin 918 also moves in slots 912k1 in portions 912k. See FIG. 6.

Pawl portion 912j has a bore in its upper end in which is movable a plunger 912a. Said plunger is moved upwardly in said bore by a compression coiled spring 912a1 disposed in said bore beneath said plunger. Plunger 912a carries a number of resilient contact members 912b which make a contact with a contact pad on the booster for warming up a missile when said missile is transferred from the Ready Service Ring to the hoist. The warmup is continued on the missile by the hoist pawl contact members 912b until the missile is hoisted onto the launcher rail.

Figure 9:
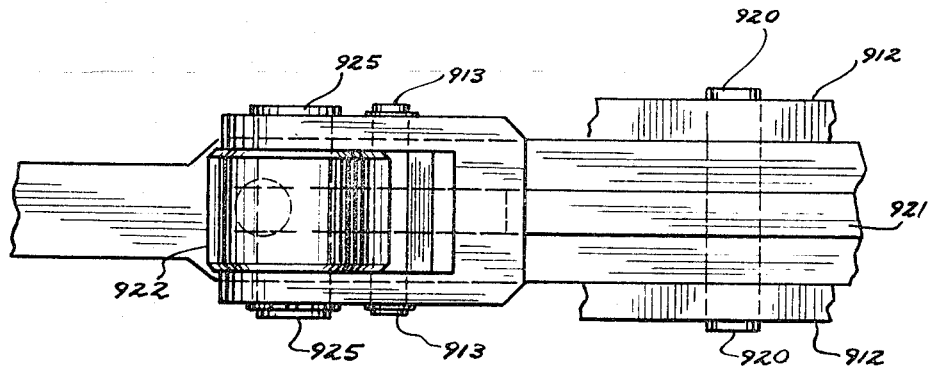
FIG. 9 is a partial plan view of some of the Hoist Pawl mechanism.

Pawl 912 is provided with a pair of rearwardly extending lugs in which is disposed a pin 920 on which is pivotally mounted a latch member 921. See FIG. 6. Latch 921 at its lower end below pivot 920 carries a roller 922. Roller 922 in the position shown engages the vertical surface of a member 923a secured to and forming part of a piston 923 for swinging pawl 912 into operative position. The upper part of portion 923a is disposed in a recess formed in the hoist frame or trunk. Latch 921 has a bill portion 921a adapted to engage or hook over the top of one aft lug Bo1 of the missile. Roller 922 is carried on a shaft 925 disposed in and movable in a slot 921b, FIG. 10, in the latch 921. Pawl portion 912j has a segmental recess 912d, FIG. 10, therein, the same having a hole 912e extending into its bottom. A latch 927 is provided for member 921 and is swingable about a pivot 913 carried in latch 921. Latch 927 has a projection 927b disposed in recess 912d and arranged to enter hole 912e in which it substantially fits. Latch 927 has an arm 927a with a concave surface which is disposed contiguous to the convex periphery of roller 922. Said arm 927a is engaged by one end of a coiled compression spring 919 having one end disposed in a recess 912g in pawl 912, portion 912j and its other end in a recess 912f in latch 927. Spring 919 thus holds arm 927a in the position shown in FIG. 9, and latch member 921 is then in locked position with its upper end hooked over aft lug Bo1. Roller 922 is then in position most remote from pawl 912. Pawl 912 is then in operative position.

Referring again to FIG. 6, piston 923 is movable in a chamber 924a in a block 924 carried on the hoist frame. Piston 923 has a block 923a at one end thereof. Block 923a has lugs 923a1 projecting at opposite sides thereof and rods 914, FIG. 8, are respectively pivoted to said lugs by vertical pivots 914a. Rods 914 extend toward the front of the hoist and are pivotally connected by pivots 914b to arms 919 to which are secured respectively vertically extending rods 925. Rods 925 have enlarged upper ends 925a of general cylindrical shape but having portions cut away to form channels 925b therein. Portions 925a are disposed to engage the bottom of the aft lug Bo1 of the missile when in the position shown. Members 925a are rotatable through ninety degrees however to bring channels 925b into position so that the aft lug Bo1 can move past the same in the channels 925b.

Piston 923 constitutes a valve movable in chamber 924a. Said piston has secured to its inner end a portion 923b. Portion 923b has its sides in a cylindrical surface aligned with the surface at the rear end of piston 923 but has recesses 923c and 923d formed therein at opposite sides. A conduit 924b extends from the front end of chamber 924a to a chamber 924c formed in block 924. Conduit 924b has a branch 924b1 which extends to a valve chamber 924e, FIG. 7, in block 924. A conduit 924f extends from adjacent the inner end of chamber 924a to a valve chamber 924g formed in block 924. Conduit 924f has a branch 924f1 which extends to valve chamber 924c. The chamber 924a has an enlarged portion 924a1 at its rear end and a conduit 924h extends from said enlarged portion to spaced points in chamber 924c. A conduit 924d extends from valve chamber 924g to valve chamber 924c. A conduit 924i extends from chamber 924e to chamber 924c. A conduit 924j extends from conduit 924h to tank and has therein an orifice 924j1. A conduit 924k extends from valve chamber 924c to a source of fluid under pressure of from 1200 to 1500 pounds per square inch.

A valve 926 is movable in chamber 924e and has a rear portion 926a at the end of which is journaled a roller 926r. It will be seen that with the movement of valve 926, roller 926r will move into and out of recess 923c. Valve 926 has a rod projecting to without block 924, the same having secured thereto an arm 928 adapted to engage a roller on the actuating arm 929 of a switch IH2. Valve 926 is urged to the inner end of chamber 924e by a coiled compression spring 930. A valve 931 is movable in chamber 924g, the same having an inner end portion 931a to the inner end of which is journaled a roller 932. When valve 923 is at the inner end of chamber 924a, roller 932 can move into and out of recess 923d. Valve 931 has a rod at its other end extending to without block 924 and to which is secured an arm 934, which arm is disposed to engage the actuating arm of a switch IH3. Valve 931 is urged to the inner end of chamber 924g by a coiled compression spring 936. A valve 937 is movable in chamber 924c, the same having a rod 937a at its inner end movable in an enlarged portion 924c1 of chamber 924c. Collars 938 are disposed at the ends of chamber 924c1 and engage the ends of said chamber. A compression coiled spring 939 urges collars 938 into position engaging the ends of chamber 924c1. Rod 937a has a head 937a1 at its inner end disposed to engage the side of inner collar 938 opposite that engaged by spring 939. The inner land on valve 937 is arranged to engage the similar side of the other collar 938. It will be seen that when valve 937 is free to move that spring 939 will move it to the position shown. The other end of valve 937 is pivotally connected to a link 940, the other end of which is in turn pivoted to the end of an arm 941 secured by pin 942 to the midpoint of a lever 943. Lever 943 has pivoted thereto at equal distances from pin 942 the cores of solenoids SH7 and SH6 respectively. Said solenoids are pull solenoids. Lever 943 is arranged to engage the actuating plunger of a switch IH107 when solenoid SH7 is energized and to engage the actuating plunger of a switch IH106 when solenoid SH6 is energized. A member 944 has a slot in its lower end and member 923a is adapted to enter said slot. Rotative movement of valve 923 is thus prevented.

A bar 946 has a collar 946a thereon which is slidable in a chamber 947a in a casing 947. Bar 946 is urged by a compression coiled spring 948 to move collar 946a and said bar to the right-hand end of chamber 947a. Bar 946 has a lug 946b projecting therefrom and disposed to engage a roller on the actuating arm of a switch IH1. One end of bar 946 is bevelled, as shown at 946c. Said end of bar 946 is disposed to be engaged by the missile as it moves onto the hoist rail. Bar 946 is moved to the left, as seen in FIG. 6 by the missile and will actuate switch IH1 which will indicate that there is a missile on the hoist.

When it is desired to extend the hoist pawl or move it into operative position, solenoid SH6 will be energized by the operator closing a switch. This will swing lever 943 counterclockwise and valve 937 will be moved to the right, as seen in FIG. 7. Fluid under pressure can now flow from conduit 924k into chamber 924c and through conduit 924d to chamber 924g. Valve 931 will be moved to the left, as seen in FIG. 7, and arm 934 will actuate switch IH3 indicating that the hoist is extended. Fluid will also pass through conduit 924f to chamber 924a and valve 923 will be moved to the right, as seen in FIG. 6. Member 923a will engage roller 922 and member 921 will be moved to the right, as seen in FIG. 6, and hoist pawl 912 will be swung to operative position, as indicated in FIG. 6. When valve and plunger 923 move to the right, as shown in FIG. 6, spring 930 in valve chamber 924e will move valve 926 and the latch including roller 927 into recess 923c. Valve and plunger 923 are thus locked in the extended position shown. It will be noted that fluid under pressure from conduit 924d passes through chamber 924g. This will move valve 931 to the left and withdraw the latch including roller 932. Valve 926 has a passage 926b extending from the spring side thereof into chamber 924a1. When valve 926 is moved to latch position, fluid can pass through passage 926b, through conduit 924b1, conduit 924b, around valve 937 in chamber 924c, through conduit 924h and conduit 924j to tank. When valve 926 is moved to latch position, arm 928 moves away from the roller on the actuating arm 929 of switch IH2. Said switch is a normally closed switch and is moved to open position by arm 928. When arm 928 moves away the switch will then close and indicate that the pawl is extended and latched in extended position.

When it is desired to retract pawl 912, solenoid SH7 will be energized. This will swing lever 943 so that valve 937 is moved to the left, as seen in FIG. 7. Pressure from conduit 924k will now pass between the two right-hand lands on valve 937, through chamber 924c and conFluid will pass through conduit 924b into the front portion duit 924i, thus moving valve 926 to the right. Latch 927 is thus withdrawn and arm 928 will open switch IH2. of chamber 924a and valve and plunger 923 will be moved to the left, as seen in FIG. 6. Member 923a thus moves to the left away from roller 922 and the pawl 912 will be swung to inoperative position. When valve and plunger 923 move to the left, as stated, spring 936 will move valve 931 and latch 932 will be moved into recess 923d, thus latching valve and plunger 923 in retracted position. Chamber 924a1 is ported through conduit 924d, around valve 937 in chamber 924c and through conduits 924h and 924j to tank. When valve 931 is moved by spring 936 and latch 923 moves to latch position, arm 934 will move away from the roller on the actuating arm of switch IH3 and said switch will close, indicating that the pawl is now in retracted or inoperative position and latched in said position. Latches 927 and 932 prevent any rotation of valve and plunger 923. The latter are also held from any rotation by member 923a moving into the slot in member 944.

DRIVE FOR HOIST CHAIN

The missile is moved along the hoist rail by the hoist and engaged by a hoist pawl 912. Pawl 912 is connected to one end link of the hoist chain 816. Said pawl and chain are moved upwardly and downwardly in a channel in the hoist rail. The chain substantially fits in said channel and is held in rectilinear form therein. Chain 816 comprises the links 816a connected by the pivot pins 816b. The pivot pin 816b has thereon a roller 809 disposed centrally thereof at each side of which are the links 816a. See FIG. 14. Rollers 806 are disposed on the pin 816b at the outer side of links 816a and held in place by washers 805. Pin 816b is swaged at its ends to retain washers 805 thereon. A block 816c is formed integrally with the link members at each side of roller 809, which block has a bore 816d extending longitudinally therethrough. A cable 803 extends through the bores 816d in blocks 816c.

The chain 816 runs over a drive sprocket 817 which has substantially semi-cylindrical recesses 817a in its periphery which receive rollers 809. See FIG. 17. Sprocket 817 is secured to a shaft 815 which is journaled in ball bearings 813 in an extension 810a of the gear casing 810. See FIG. 15. Sprocket 817 has a hub journaled at its ends in ball bearings 814 carried in the sprocket housing 810d. Housing 810d has side plates or portions 810d1 between which is disposed an arcuate portion 810d2. Circumferentially spaced headed and nutted bolts 821 pass through and connect said side portions 810d1 and portion 810d2. Plates 819 are secured to the inner sides of side portions 810d1 and have annular grooves therein in which are disposed sealing rings 823. A plate 834 is secured to the outer side of the central hub of portion 810d1 and has an annular groove therein in which is disposed a sealing ring 834a.

A drum 831 is journaled on an extension of shaft 815 and has secured to the outer side thereof a member 825 formed as a wormwheel gear. Worm gears 827 have shafts journaled in a casing 828 and mesh respectively with wormwheel member 825. Worm gears 827 have shafts journaled in casing 828 and in a member 819 secured to said casing and mesh respectively with wormwheel member 825. Worm gears 827 have projecting ends 827a of polygonal shape in cross section adapted to receive a crank handle. Member 828 is splined to shaft 815, as shown in FIG. 15. A cover plate 828a is secured to the end of member 828 by spaced bolts 830. The chain 816 is guided in the sprocket housing 810d by the sprocket 817. The rollers 806 engage surfaces on members 810d2 in the chain housing.

Shaft 815 has secured thereto a beveled gear 829 with which meshes a beveled pinion 812 secured to a portion 798a of a shaft 798. Gears 812 and 829 are enclosed in the housing 810. Shaft 798a is journaled at one end in ball bearings 851 carried in the end closure member of casing 810, and at its other end is journaled in ball bearings 853 carried in a bushing 854. Bushing 854 is disposed in the other end of casing 810 and together with an end plate 810g is secured to casing 810 by circumferentially spaced bolts 855. Shaft 798a extends to the control mechanism for the hoist drive.

The chain 816 moves upward adjacent the wall of the hoist housing 1100f and then over a movable sprocket 835 carried in a block-like member 838. See FIG. 13. Sprocket 835 has cylindrical recesses in its periphery similar to those in sprocket 817 for receiving the rollers 809. Sprocket 835 is carried on a shaft 839 journaled in ball bearings 843 carried in a member 838. Member 838 has a top plate 838a secured thereto having an upward central projection in which is secured a cable 845. Cable 845 runs over a sheave 847 mounted in a bracket 826 secured to the top of a portion 1100m of the hoist housing. Cable 845 extends downwardly from sheave 847 at the outer side of housing portion 1100 and runs along one side of a sheave 849 journaled on a shaft 849a secured in the side of hoist housing 1100h, see FIGS. 11 and 12. From sheave 849, cable 845 extends to and is wound on the drum 831 and has its end passing through the outer side of drum 831 and secured thereto, as shown in FIG. 15. Chain 816 after running over sprocket 835 moves downwardly along the wall of housing 1100h to housing 810d and has its end secured to a lug 810f secured to one side of housing 810d. As shown in FIG. 14, the rollers 806 engage surfaces on members 810d2 in the chain housing. A pin 857, shown in FIG. 13, extends across housing 810d adjacent sprocket 817 and forms a stop for the downward movement of member 838.

The chain sprocket housing 810d, as shown in FIG. 17, is much wider than the diameter of the drive sprocket 817 and the chain 816 moves upwardly in the hoist rail 1100a in which the hoist pawl 912 is movable. The hoist rail 1100a is shown in plan in FIG. 14, and the chain 816 is shown in section therein. Said rail has a passage or channel 1100b extending throughout the length thereof, said passage having lateral portions as shown in which the rollers 806 move and in which they substantially fit. Said channel 1100b has converging side portions 1100c which extend to the portion 1100d of said passage which opens at the front of the rail. Said channel has grooves 1100e at each side of the portion 1100d. The aft lug on the missile has side portions moving in grooves 1100e. It will be seen that the rail has a flat front surface at either side of portion 1100d and has side surfaces 1100n which converge forwardly. Said rail also has the slots 1100m at each side thereof in which portions of the forward lug on the missile are received. (See FIG. 14.)

In operation, the chain sprocket 817 is driven by shaft 815 in turn driven by gears 829 and 812. Gear or pinion 812 is driven from shaft 798. The drive and control for the shaft 798 and the chain sprocket is shown and described in the drawings and description of "Hoist Control in Moving Missile to Launcher." When the hoist is to be raised, sprocket 817 will be driven in a counterclockwise direction, as seen in FIG. 13. The chain 816 will then be moved upwardly in the hoist rail and guided therein, as shown in FIG. 14. As the chain moves upwardly in the hoist rail, it moves over movable sprocket 835 and downwardly along the wall of housing 1100f. Since the end of the chain is fixed to lug 810f on the drive sprocket housing, the chain is pulled down and block 838 moves downwardly. When block 838 moves downwardly, the cable 845 is moved downwardly and the same moves over sheave 847, along sheave 849 and unwinds from drum 831. When the hoist pawl 912 is at the upper limit of its movement, block 838 engages the stop shaft 857. Block 838 is quite heavy and moves downwardly easily by gravity as cable 845 is unwound from drum 831.

When the hoist is lowered, sprocket 817 will be rotated in a clockwise direction, as seen in FIG. 13, and the chain 816 will be moved downwardly in the hoist rail and will move up adjacent housing wall 1100f and over the sprocket 835. When sprocket 817 is rotating to lower the hoist, the drum 831 is rotated in a direction to wind up cable 845 thereon. Cable 845 is thus pulled downwardly from sheave 847 and along sheave 849 to drum 831 on which it is wound. Block 838 is moved upwardly by cable 845 as the chain moves up along wall 1100f. The cable 803 carries conductors for supplying current to the contacts 912b projecting from hoist pawl 912. These contacts engage a portion of the missile to apply warmup to the missile when on the hoist.

HOIST CONTROL IN MOVING MISSILE TO LAUNCHER

A hoist is provided which moves a missile vertically. The hoist is moved vertically in assembling the booster and bird portions of the missile, and in moving the missiles to the launcher. The means for moving and controlling the hoist in the latter operation will be described in connection with schematic shown in FIGS. 18 to 25.

The hoist is elevated through a drive mechanism having a control mechanism including a pilot rack 700. (See FIG. 19.) Rack 700 has a piston 700a at one end which fits in and is movable in a chamber 701a in a cylinder 701. The inner end of piston 700a engages a shoulder at the inner end of chamber 701a. Rack 700 has recesses 700b and 700c therein adjacent its ends which are entered at times by a detent 702 urged to enter said recesses by a compression coiled spring 703. Rack 700 extends through one end of cylinder 701 and meshes with a pinion 704. Pinion 704 is carried on a sleeve 705 having at one end a beveled gear 706. Gear 706 meshes with a beveled pinion 708 carried on a shaft 709. A shaft 707, axially alined with shaft 709, has secured to one end a beveled gear 710 meshing with another beveled gear 712. See FIG. 20. Gears 710 and 712 are shown as disposed in a casing 711 into which shafts 707 and 713 extend. Gear 712 is carried on a shaft 713 at the other end of which is secured a beveled gear 714. See FIG. 18. Gear 714 meshes with a beveled gear 716 carried on a shaft 717. Gears 714 and 716 are enclosed in a casing 715. Another gear 719 secured to shaft 717 meshes with a gear 723 secured to a shaft 724a. Gears 719 and 723 are enclosed in a casing 724. Shaft 724a is constructed to receive a hand crank 718 by which it can be rotated. Crank 718 has a portion 718a arranged to engage and operate a switch IG15 when said crank is connected to shaft 724a.

A clutch block 720 is slidable on shaft 709, see FIG. 20, the same having an annular groove therein in which is disposed a pin 721 carried on a lever 722, which lever is pivoted at one end to a stationary bracket 725. Shaft 707 has secured to one end a casing 707a having therein a cylindrical chamber in which are disposed a plurality of disks 707b surrounding shaft 709 and secured to said casing. Other disks 707c are disposed between disks 707b and secured to shaft 709. Said plates or disks 707b and 707c constitute a clutch which operates to connect shafts 709 and 707 when member 720 is moved toward casing 707a and which is released to disconnect said shafts when member 720 is moved away from casing 707a. Lever 722 has secured therein another pin 726. A tensile coiled spring 727 has one end secured to pin 726 and its other end secured to a stationary bracket 728. Another tensile coiled spring 730 has one end secured to pin 726 and has its other end secured to the core of a solenoid SG5. Lever 722 adjacent its free end is adapted to engage an electrical switch IG105.

A lever 732 has a hub through which shaft 707 passes, said hub being split and having spaced extensions through which pass a headed and nutted bolt 733. A compression coiled spring 734 surrounds bolt 733, the same engaging the head of said bolt at one end and one of the said extensions at its other end. Said hub of lever 732 is thus resiliently clamped to shaft 707. Lever 732 has one end portion disposed between electrical switches IG8 and IG9.

Cylinder 701 has formed at one end thereof a valve block 738 having therein a chamber 738a. A valve 739 is disposed and movable longitudinally in chamber 738a, the same having a reduced portion adjacent one end on which are carried washers 739a and 739b, said washers being respectively engaged at their adjacent sides by the ends of a compression coiled spring 740 disposed therebetween. Washers 739a and 739b at their remote sides engage shoulders formed by an enlarged portion of chamber 738a. Spring 740 thus acts to keep valve 739 in a centered position able to move either direction, as shown in FIG. 19. Valve 739 has a bore 739c extending therethrough, the same having a partition extending thereacross containing an orifice 739d. Valve 739 has transversely alined openings 739e therethrough intermediate its ends. Valve casing 738 has an annular chamber 738b therein adjacent opening 739e and a passage 738c extends from chamber 738b to the outer side of said casing with which connects a conduit 742. Chamber 738a has an enlarged portion 738f therein. Said block also has a chamber 738g spaced from chamber 738a. Block 738 has a projection 739f extending into chamber 738g. A passage 739g extends transversely through projection 739f from which a passage 739h extends to enlarged portion 738f. Piston 700a has an annular sleeve portion 700e which moves over projection 739f when said piston is at the inner portion of its movement. A conduit 748 extends from adjacent the closed end of cylinder 701 to a chamber 894a to be later described.

Sleeve 705 has secured to its end opposite gear 706 a beveled gear 750. Beveled gear 750 meshes with a pair of oppositely disposed beveled gears 752 respectively carried on shafts 753 carried in the sides of a cylindrical cam 754 and connected to a center sleeve 756. Gears 752 are rotatable on shafts 753. Cam 753 has a helical groove 754a in its periphery in which is disposed a cam pin 757 carried at one end of a lever 758, the other end of which is pivotally secured by a pivot 759 to a crank disk cam 760. Cam 760 has a recess 760a in its periphery adapted to be entered by the plunger of a switch IG11. Cam 760 is carried on a shaft 761 which also carries the tilting or stroke adjusting plate 763 of the pump or A-end of the drive. A stationary stop member 755 is provided secured to a casting 824 to be later described and is disposed to be engaged by a stop member 754b on cam 754. A vernier adjustment 760b is provided for cam 760 for adjusting the position of said cam on shaft 761. The periphery of cam 754 is also formed to act as a cam and operate a switch IG10. A link 762 is pivotally connected intermediate the ends of lever 758 and is pivotally connected at its other end to a valve 764 in a valve block 765 to be later described.

Beveled gears 752 mesh with a beveled gear 766. A shaft 767 is secured to beveled gear 766 and extends therefrom through sleeves 756 and 705, the same having secured thereto a pair of switch-operating cams 768 and 770, see FIG. 21. The peripheries of cams 768 and 770 respectively engage and operate the plungers of switches IG16 and IG17. Shaft 767 carries a pinion 772 meshing with a gear 773 secured to a shaft 774. A series of switch operating cams 776, 777, 778, 780, 782 and 785 are connected to shaft 774 and the peripheries thereof respectively engage and operate switches IG4, IG5, IG6, IG7, IG12 and IG21. Casing 824 surrounds parts of cylinder 701 and rack 700 as well as the gears connected to said rack and parts of the drive, said casing extending to and engaging valve block 765. Casing 824 has an extension 824a adapted to receive rack 700 when extended. A stop screw 826 is threaded into the end of extension 824a. Casing 824 has a conduit 828 leading therefrom at one lower corner which extends to tank.

Beveled gear 766 has secured to it at its other end a shaft 783 to which is secured a beveled gear 784, see FIG. 24, meshing with a beveled pinion 786 secured to a shaft 787. Shaft 787 is coupled by a vernier coupling 788 to a shaft 790 to the end of which is secured a beveled gear 791 meshing with a beveled gear 792. Gear 792 is secured to one end of a shaft 794 to the other end of which is secured a beveled gear 796 meshing with a beveled gear 797 secured to a shaft 798. Shaft 798 extends to the angle box of a fluid-operated motor 799 forming the B-end of the drive for shaft 798 and thus of the hoist. Shaft 798 comprises several sections connected by couplings 798c. Shaft 798 has an enlarged portion 798a carrying spaced disks 800a of a brake member 800. Disks 800a are disposed between disks 800b secured to a casing 800c. A ring 800d surrounds shaft 798 and engages the end one of disks 800b. A series of circumferentially spaced pins 800e extend through one end of casing 800c and are connected to one race 800g of a ball bearing, the other race of which is shown as 800h. Balls 800i are disposed between the races 800g and 800h. Compression coiled springs 800j surround pins 800e and keep race 800g in position. A casing 802 surrounds gears 791, 792, 796, 797 and casing 800c and other parts connected with the shaft 798 and brake 800. Shells 800k are slidable in a portion of the end of casing 802 and have flanges at their ends fitting in chambers 802a. Compression coiled springs 800m are disposed in shells 800k, the same engaging the closed end of said shells at one end and engaging the end of chambers 802a at their other ends. The inner ends of shells 800k engage the race 800h and may be secured thereto. A conduit 804 extends into the end of casing 802 and communicates with chambers 802a, the same having therein an orifice 804b, and extending to a valve chamber 884a in valve block 765. Casing 800c is connected to a worm wheel 805 with which meshes a worm gear 806 secured to a shaft 807 extending to without casing 802 and to which is connected a hand crank 808.

Shaft 798 has a portion 798b, see FIG. 25, journaled in the ends of a casing 810 and to which is secured a beveled pinion 812. Beveled pinion 812 meshes with a beveled gear 829 secured to a shaft 815 journaled in an extension 810a of casing 810 and which connects with the hoist housing 1100h. Sprocket 817 is secured to shaft 815. The missile M is shown in dotted lines at the hoist rail.

The tilting plate 763, see FIG. 19, is engaged at opposite sides by rods 832 and 833 respectively which are connected to pistons 836 and 837 respectively movable respectively in cylinders 840 and 841 secured to the casing 824 of the A-end drive. Conduits 844 and 846 are connected respectively to the chambers in cylinders 840 and 841 and extend to points spaced substantially equidistant from the center of a valve chamber 764a in valve block 765.

The A-end drive shaft 848 which drives the pump of the A-end is driven through a reduction gearing by an electric motor 850. Said electric motor 850 also drives a supercharge pump 852 from which a conduit 854 extends to a valve chamber 862a in valve block 765. Said motor 850 also drives a servo pump 856 from the discharge passage of which a conduit 858 extends to a valve chamber 902a in valve block 765. A conduit 860 connected to pumps 852 and 856 extends to tank.

The valve 764, see FIG. 22, fits in and is movable in a chamber 764a in valve block 765 and said valve has a land 764b disposed centrally thereof. Said valve also has pistons or lands 764c and 764d at its opposite ends. An annular groove 764e extends about chamber 764a substantially at the center thereof and a passage 765a extends from said groove to and communicates with conduit 858. Conduit 854 extends to and communicates with a passage 765b which in turn extends to and communicates with a valve chamber 862a in which a valve 862 is movable. Valve 862 is urged to one end of chamber 862a by a compression coiled spring 864 disposed in one end of chamber 862a. Valve 862 has a land 862b at one end thereof and a passage 862c extends through said land from one end to the other end thereof. A passage and conduit 765c extends from passage 765b to a valve block 866 to be later described. A passage 862d extends from one end of chamber 862a to tank. A passage 862e extends from chamber 862a opposite passage 765b and to a chamber 868a in which is disposed a piston 868. Piston 868 has a rod extending therefrom provided with a collar 868b with which engages a compression coiled spring 870 the other end of which is disposed in a recess in a stationary member 872. Said rod is adapted to be moved by piston 868 to engage and operate a switch IG14. Spring 870 acts to move said rod away from switch IG14. A passage 862f extends from chamber 862a to a chamber 874a in which is movable a valve 874. Valve 874 is urged to one end of a chamber 874a by a compression coiled spring 876 disposed in the other end of chamber 874a. Valve 874 has a land 874b adjacent one end through which a passage 874c extends from one end of said land to the other. Valve 874 has a rod extending from one end adapted to engage a switch IG13. A passage 874d extends from valve chamber 874a to annular groove 764e. An annular groove extends about chamber 874a and a passage 874f extends from said groove and communicates with a valve chamber 902a and a conduit 878 which forms part of the circulation line of the B-end of the drive and extends to the bottom of the B-end casing. A passage 874g extends from one end of chamber 874a to tank. A passage 874h extends from passage 874f to a valve chamber 880a in which is movable a valve 880. Valve 880 is urged to one end of chamber 880a by a compression coiled spring 882 engaging said valve and disposed in the other end of chamber 880a. Valve 880 has a land 880b and a small passage 880c extends through land 880b from one end to the other thereof. A passage 880d extends from passage 874f to chamber 880a, the same having therein a restricted orifice 880e. A passage 880f leads from one end of chamber 880a to valve chamber 764a. A passage 764f extends from passage 880f to adjacent one end of chamber 764a. A passage 880g extends between passage 764f and chamber 880a and has therein a restricted orifice 880h.

A valve 884 is movable in a valve chamber 884a and is urged to one end of said chamber by a compression coiled spring 886 engaging said valve and disposed in the other end of said chamber. An annular groove 884b extends about valve chamber 884a with which conduit 765a communicates. A passage 884c extends to tank and has spaced branches communicating with chamber 884a. A passage 884d extends from chamber 884a and communicates with a conduit 888 which extends to a chamber in valve block 866 to be later described. A passage 804a extends from chamber 884a to one end of valve block 765 and communicates with conduit 804. Valve 884 has a rod extending therefrom at one end pivotally connected to one end of a lever 890, the other end of said lever being pivotally connected to the core of a solenoid SG4. Lever 890 is pivotally carried by a stationary bracket 892. Lever 890 has a portion adapted to engage and operate a switch IG104 when solenoid SG4 is energized.

A valve 894 is movable in a valve chamber 894a and is urged to one end of said chamber by a compression coiled spring 896 engaging said valve and disposed in the other end of said chamber. Valve 894 has a rod projecting therefrom at one end and pivotally connected to one end of a lever 898 which is pivotally carried on a stationary bracket 900. The other end of lever 898 is pivotally connected to the core of a solenoid SG3. Lever 898 has a portion adapted to engage and operate a switch IG103 when solenoid SG3 is energized. A passage 894b extends from chamber 894a and communicates with conduit 742, which, as stated, extends to chamber 738a in valve block 738. A passage 894c extends from chamber 894a and communicates with conduit 748 which extends to one end of cylinder 701 and chamber 701a therein. A passage 894d extends from valve chamber 894a to a valve chamber 902a in which is movable a valve 902. Another passage 894e extend from chamber 894a to chamber 902a. Valve 902 is urged to one end of chamber 902a by a coiled compression spring 904 engaging at one end a washer which is in engagement with said valve, and said spring at its other end engaging a washer engaging the other end of chamber 902a. Valve 902 has a rod extending from one end thereof which is pivotally connected to one end of a lever 906 pivotally carried on a stationary bracket 908. Lever 906 is pivotally connected at its other end to the core of a solenoid SG1. Lever 906 is also pivoted adjacent said first mentioned end to the core of a solenoid SG2. Lever 906 has projections adjacent each end thereof adapted respectively to engage and actuate switches IG101 and IG102. An annular groove 902b surrounds chamber 902a with which communicates a passage and conduit 878. A passage 902c extends from passage 894d to chamber 902a. A passage 902d extend from chamber 902a to passage 765a. An annular groove 902e surrounds valve chamber 902a, the same being spaced from groove 902b and communicating with passage 765a.

Valve block 866 referred to (see FIG. 22) has conduits 866a and 866b leading therefrom which are connected respectively to the two main transmission lines of the A-end drive. Passage 866b extends to a passage 866c having a reduced portion adapted to be closed by a valve 910 urged to its seat and to its closed position by a compression coiled spring 912 disposed in one end of a chamber 866c in which valve 910 is movable. Passage 866a extends to passage 866c below said valve. Passages 866a and 866b are respectively closed by spring pressed check valves 914 and 916 respectively. Beyond valves 914 and 916 passages 866a and 866b are connected and communicate with conduit 864. Valve 910 (see FIG. 21) has a passage 866e extending through the lower end thereof and connecting passages or chambers 866c and 866d. Passage 866e is provided with check valves 866f and 866g between which and engaging the same is a compression coiled spring 866h so that said check valves prevent flow of fluid in opposite directions respectively. A passage 866i extends from passage 866e between valves 866f and 866g to a chamber 866j in valve 910. A valve 918 is movable in chamber 866j and urged to one end thereof by a compression coiled spring 920 disposed in the other end of said chamber. Valve 918 has a land at one end thereof through which a passage 918a extends from one end of thereof to the other. A passage 866k extending from chamber 866c to tank has branches communicating with chamber 866j. An annular groove 866m with which passage 866k communicates extends about the chamber in which valve 910 moves. A passage 866n extend from chamber 866j to a chamber 866p extending about the upper portion of and above valve 910.

*Operation of hoist*

In effecting an automatic operation of the hoist, certain parts of the control must be brought to neutral position and the hoist must be at its uppermost or lowermost position. To effect a starting sequence, switch IG15 will be closed when crank 718 is connected to shaft 724. This will energize solenoid SG5 and the core SG5a thereof will pull upon spring 730 and swing lever 722 to move member 720 and engage the clutch in member 707a. The circuit including solenoid SG5 also includes solenoid SG3 which will thus be energized and move valve 894. Hand control crank 718 is now turned to bring cam 754 to neutral. The B-end of the drive is stationary so that gear 766 cannot turn. With control cam 754 in neutral, which position is indicated by switch IG10, the motor 850 is started which by operating pumps 852 and 856 will provide servo and supercharge pressure. Servo pressure brings the A-end tilting box to neutral position, since the control cam 754 is adjusted to its neutral position. The servo pressure fluid at either side of the central land of valve 764 in chamber 764a will pass through conduits 844 and 846 into the chambers in cylinders 840 and 841 respectively so that pistons 836 and 837 will be moved to the position shown in FIG. 22, thus moving tilting plate 763 to neutral. While valve 764 is shown closing groove 764e and passage 765a, fluid leaks into chamber 764a and will be under servo pressure. Servo pressure fluid will pass from conduit 858 and through passage 765a to valve chamber 874a thus moving valve 874 downwardly and actuating switch IG13. Supercharge pressure liquid will pass through conduit 854 and passage 765b to chamber 862a and move valve 862 so that said supercharge pressure liquid from chamber 862a can pass into chamber 868a and move valve 868 to actuate switch IG14. When cam 760 is in neutral position, as shown, switch IG11 is closed. Solenoid SG4 is in circuit with switches IG11, IG13 and IG14 and is now energized, thus moving valve 884 downwardly. Servo pressure can now pass through conduit 858 into groove 902e, around valve 884 which has now been shifted by solenoid SG4, through passage 804a and then through conduit 804 and orifice 804b to chambers 802a and this fluid will engage the shells 800k and move the same to the right, as shown in FIG. 24, thus compressing springs 800m and releasing the brake 800. When solenoid SG4 is energized, a holding circuit is also closed which by-passes the tilting box cam switch IG11.

The operator now engages hand crank 718 with shaft 724 and rotates the same thus rotating shaft 724 through gears 714 and 716, rotating shafts 707 and 709 through gears 710 and 712 and rotating sleeve 705 through gears 706 and 708. Sleeve 705 will rotate cam 754, thus swinging lever 758 and moving valve 764. This will move tilting plate 763 thus stroking the A-end pump. The B-end of the drive will now rotate shafts 798, 798a and 798b, which through gears 812 and 829 rotates shaft 815 and hoist drive sprocket 817. The hoist will now be brought to its down position. As stated, the hoist can only be operated automatically, or in other words by the power of the fluid actuated means provided, when in either its extreme up or extreme down position. The up position with the hoist chain extended in the hoist rail is indicated by switch IG5 actuated by cam 777 moved by shaft 767. The down position is indicated by switch IG4 which is actuated by cam 776 also rotated through shaft 767.

The automatic hoist cycle is specifically initiated by energizing solenoid SG1. Solenoid SG1 is in circuit with switch IG4. When solenoid SG1 is energized, lever 906 actuates switch IG101. Switch IG101 also closes a circuit through solenoid SG1 which is parallel to the circuit of said solenoid through switch IG4. This latter parallel circuit maintains solenoid SG1 energized since the circuit through switch IG4 is broken the instant the hoist starts up and moves away from its down position. Energization of solenoid SG1 moves valve 902 and liquid under servo pressure can now pass from conduit 858 through passage 902d and chamber 902a, around valve 894, now shifted, and through passage 894b and conduit 742 to valve chamber 738a in valve block 738. This pressure fluid can now pass through chamber 738a, openings 739e, into bore 739c of valve 739, through orifice 739d, through passage 739h and passage 739g to chamber 738g and to the inner end of piston 700a. Valve 739 is moved toward piston 700a and will restrict passage 739h as it moves into chamber 738f. The flow is also restricted by portion 700e being positioned over projection 739f. Piston 700a thus is moved quite slowly in its initial movement. Valve 739 will be moved a short distance to the right, as seen in FIG. 19. Movement of piston 700a is retarded until the hoist pawl has picked up the missile load. As piston 700a moves, portion 700e moves away from projection 739f, thus porting fluid freely to piston 700a which subsequently reaches it full velocity of motion. Pressure will build up in chamber 738g and valve 739 will be moved away from chamber 738f. Valve 739 acts as a metering valve and will regulate the flow of fluid according to the pressure drop from chamber 738a and chamber 738g in both outer and inner movements of piston 700a.

Movement of rack 700 with piston 700a rotates gear 704 and rotates the lower gear 750 of the differential. The spider or center element of the differential as described is connected to the control or stroking cam 754. The opposite element of the differential, namely, gear 766, represents a response connection to the B-end of the drive and indicates the true position of the hoist chain. Since the B-end is now stationary, initial rack motion rotates control cam 754. Rotation of cam 754 moves roller 757 in groove 754a thus moving lever 758 and link 762 which in turn moves valve 764. Tilting plate 763 will now be moved from neutral position by the fluid in chamber 764a below the land 764b, as shown in FIG. 22. When tilting plate 763 is moved from its neutral position, motor 799 is started. Its speed is controlled in accordance with the movement of piston 700a and cam 754. Cam 754 will be rotated until it engages stop 754b. When cam 754 engages stop 754b the stroke changing plate 763 is at full stroke. Once the control cam 754 has engaged its stop 755, further motion of the pilot rack 700 is regulated by response input from the rotating B-end through shaft 783. When the rack 700 reaches its limit of travel and engages stop screw 826, the B-end response winds control cam 754 back to its neutral position as shown.

When the hoist has reached its limit of travel, switch IG5 will be actuated and this breaks the circuit through solenoid SG1. Valve 902 will then be centered by spring 904. Deenergizing solenoid SG1 deenergizes solenoid SG3 since switch IG101 is now open and valve 894 is centered by spring 896. The hoist has now been moved to its "up" position.

The down or retract cycle operates in the same manner as the up cycle except that piston 700a is not retarded in its initial movement. Said down cycle is initiated by energizing solenoid SG2 which closes a holding circuit through switch IG102 and also actuates solenoid SG3. Servo fluid can now pass from conduit 848 around valve 902, now up, through passage 894d and through valve chamber 894a, valve 894 now being down, through passage 894c and through conduit 748 to the right-hand end of chamber 701a. Piston 700a will thus be moved to the left, as shown in FIG. 19. Rack 700 will be engaged by the spring actuated detent 702 when in its extreme positions. Fluid from the left-hand end of piston 700a will pass through chamber 738g, passage 739h, and the bore of valve 739 to chamber 738a, through conduit 742, through passage 984b, around valve 894, now down, as shown in FIG. 22, through passage 894e, around valve 902 and through conduit 878 to tank. Should the pressure in chamber 738g be greater than that in chamber 738a, valve 739 will be moved away from piston 700a and the flow of fluid will increase. If pressure in chamber 738g is lower than in chamber 738a, spring 740 will move valve 739 and restrict the flow of fluid. When the hoist reaches its down position, switch IG4 will be actuated. This will break the circuit through solenoid SG2 and valve 902 will be moved to the position shown by spring 904. Switch IG102 is opened and this will break the circuit through solenoid SG3. The hoist is now in position for another upward cycle. The piston 700a therefore through cam 754 regulates the movement of the hoist and missile. The hoist is driven by the B-end and not by piston 700a or sleeve 705. Cam 754 by stroking the pump controls the hoist.

STRIKEDOWN CRADLE

In handling the missiles a structure called the Strikedown Cradle is used. Said cradle constitutes a frame pivoted intermediate its ends to the hoist frame. The strikedown cradle has a rail at its front identical in horizontal cross section with the hoist rail. Said cradle swings through an arc of substantially 90 degrees from the horizontal position which is its loading position, to a vertical delivery position in which it is latched to the hoist rail at its upper and lower ends. When in vertical position the rail of the cradle is in vertical alignment with and forms part of the hoist rail.

With the cradle in loading position a bird portion of a missile carried in a frame is carried by an overhead trolley and placed on the cradle. Said frame has forward and aft lugs which engage the cradle rail. The frame and bird are moved along the cradle rail until the aft lug engages a stop or latch. A latch is then moved to engage the forward lug so that said lugs are then locked between said latches. The bird is additionally secured to the cradle. The cradle carrying the bird is then swung to the vertical position and latched to the hoist at its top and bottom. The hoist pawl is moved up to engage the aft lug and the cradle stop engaged by the aft lug is retracted. The hoist next raises the bird along said hoist rail to a point where it is clear of the cradle. The cradle is then unlatched and swung back to its horizontal loading position where a booster portion of the missile is placed on the cradle rail by said trolley. Said booster has forward and aft lugs thereon. Said booster is moved along the cradle rail just as was said frame, until the aft lug of said booster engages said stop or latch. A latch is then moved to engage the forward lug and the booster locked in position by said latches. The cradle is again swung to vertical position and latched to the hoist rail. The hoist moves the booster up to engage the bird and they are fastened together. The bird portion is then unclamped. The missile comprising the booster and bird combination is then lowered to a stop at the wing and fin assembly level of the hoist. The cradle is again swung to loading position and said frame is removed from the cradle. The transfer mechanism described in copending U.S. application Serial Number 506,392, filed May 5, 1955, moves to a position at the hoist and upper and lower hangers on said transfer mechanism engage the forward and aft lugs on the missile, which latter lugs are located at the opposite side of the missile from the lugs engaged by the hoist and by said cradle latches. The transfer mechanism lifts the missile. The hoist pawl is withdrawn and the missile lowered by the transfer mechanism to transfer level. The assembled missile is then transferred from adjacent the hoist rail to the Ready Service Ring also described in said copending application. The cradle is now in position to receive another missile.

In FIGS. 26 to 39, the hydraulic schematic for the cradle control mechanism is shown. In FIG. 26, a portion of the hoist rail 1100 is shown above the cradle and in FIG. 27 another portion 1100a of the hoist rail is shown below the cradle. The strikedown cradle itself is shown as 1101. The cradle is provided with lugs 1101a which are pivoted on a shaft 1102 carried in the hoist frame. The cradle 1101 has a bracket 1105a secured thereto carrying a latching roller 1105. A latch or latching pawl 1106 is pivoted to a pivot 1107 carried in the hoist frame. Latch 1106 is connected by a pivot 1108 to a valve rod 1110 connected to a piston valve 1109 fitting in and movable in a chamber 1112a formed in a block 1112 carried on the hoist frame. A plunger 1111 movable in the cradle has a head portion 1111a adapted to engage the actuating plunger of a switch IJ1. Plunger 1111 is moved by latch 1106 when the latter is in latching position. Head 1111a is movable in a recess and engages one end of said recess so as to limit the movement thereof. A compression coiled spring 1113 disposed in chamber 1112a urges valve 1109 toward the latch end of chamber 1112a. A conduit 1110b extends from one end of chamber 1112a above valve 1109 to the atmosphere.

A conduit 1112b extends from an intermediate point in chamber 1112a to tank.

A conduit 1112c extends from chamber 1112a to a valve chamber 1114a formed in a block 1114 at the bottom end of the cradle carried on the hoist frame. (FIG. 27.) A conduit 1112d extends from chamber 1112a to a chamber 1129a in a valve block 1129. A piston valve 1115 fits in and is movable in chamber 1114a (see FIG. 27), the same having a rod 1115a secured thereto which is connected by a pivot 1116 to a latch or latching pawl 1118. Latch 1118 is pivoted on a pivot 1118a carried by the hoist frame. The cradle 1101 has a bracket secured thereto which carries a latching roller 1122 adapted to be engaged by latch 1118. A plunger 1123 is arranged to be engaged by latch 1118 and moved thereby to move the actuating plunger of a switch IJ2 when latch 1118 moves to latching position. Plunger 1123 has a head portion 1123a movable in a recess and adapted to engage the bottom of said recess to limit the movement thereof. A conduit 1114b extends from the lower end of chamber 1114a to the atmosphere. A compression coiled spring 1124 engages one end of chamber 1114a at one end and urges valve 1115 toward the end of said chamber opposite conduit 1114b and urges latch 1118 toward latching position. Latch 1106 is commonly referred to as the "upper latch" and latch 1118 is referred to as the "lower latch." A conduit 1114c extends from chamber 1114a to tank. A conduit and passage 1114d extends from chamber 1114a to a valve chamber 1128a in a valve block 1128. (See Fig. 28.)

The cradle has secured to its rear portion an arm 1119 which carries a latching roller 1103. When the cradle swings to horizontal position, roller 1103 moves to position beneath the end of a latch 1104 swingable about a fixed pivot 1117 carried in a lug on a valve block 1125. Latch 1104 is pivoted by pivot 1120 to a rod 1121a secured to a piston valve 1121 movable in a valve chamber 1125a in valve block 1125. Latch 1104 when in latching position is adapted to engage the actuating plunger of a switch IJ8. A compression coiled spring 1127 disposed in one end of chamber 1125a urges valve 1121 to move to position to place latch 1104 in latching position. A conduit 1125b extends from one end of chamber 1125a to the atmosphere. A conduit 1125c extends from an intermediate point in chamber 1125a to conduit 1112b and thence to tank. A conduit 1125e extends from an intermediate point in chamber 1125a to one end of a valve chamber 1128b in valve block 1128. A conduit 1125f extends from one end of valve chamber 1125a to valve chamber 1129a in block 1129. A conduit 1125g extends from one end of valve chamber 1129a to conduit 1112b and thence to tank. A conduit 1129b extends from an intermediate point in chamber 1129a to PA. A passage 1125h in block 1129 extends from passage 1125g to one end of chamber 1129a and a short passage 1125i extends from conduit 1125g to chamber 1129a. A valve 1150 is movable in chamber 1129a having a rod extending to without block 1129 and being pivoted at its end to a lever 1151 which is fulcrumed on a shaft 1152. A rod 1154 is pivoted to the other end of lever 1151 and shaft 1152 is disposed midway between the pivots of said rods in said lever. Rod 1154 has connected thereto at its other end a piston 1154a movable in a chamber 1129d and a passage 1129f extends from one end of chamber 1129d to conduit 1125g. Rod 1154 passes through a washer 1154c at one end of an enlarged portion of chamber 1129d and a compression coiled spring 1155 surrounds rod 1154, the same being disposed in said enlarged portion and engaging washer 1154c at one end, and a washer 1153 abutting the other end of said enlarged portion.

Shaft 1152 extends to and is secured to a lever 1156, said lever having pivoted thereto at one end the core of a solenoid SJ2. Lever 1156 has pivoted to its other end the core of a solenoid SJ1. Shaft 1152 is disposed midway between the pivots connecting said cores to lever 1156. Stop members 1158 limit the movement of the cores of said solenoids. Shaft 1152 is journaled in bearings 1159 in a casing 1160, and extends beyond lever 1156, the same being provided with a socket at its end having a recess therein of polygonal form in cross section and adapted to receive a socket wrench 1161. Lever 1156 is located so as to operate a switch IJ102 when solenoid SJ1 is actuated and to operate a switch IJ101 when solenoid SJ2 is actuated. Solenoids SJ1 and SJ2 are pull solenoids.

In FIG. 29 the frame to which the bird portion of the missile is secured so as to be transferred by the cradle is shown as 1130. The said bird portion is shown as B$i$. This frame, as above stated, is secured to the cradle 1101 when the bird portion of the missile is to be transferred to the hoist. Frame 1130 has a lug 1130$a$ thereon known as the aft lug and it has another lug 1130$b$ thereon which is called the forward lug. When frame 1130 is in position on the cradle, the aft lug 1130$a$ engages a stop or latch 1132. Latch 1132 is swingable on a pivot 1133 carried by the cradle. A bracket 1132$a$ is secured to latch 1132 to which a link 1134 is pivotally connected, said link being pivoted at its other end to an intermediate point in a lever 1135 oscillatable about a pivot 1136 secured in the cradle. A coiled compression spring 1137 seats at one end in a recess in lever 1135 and seats at its other end in a recess in a block 1132$b$ pivoted to bracket 1132$a$. It will be seen that latch 1132 and lever 1135 form a toggle between pivots 1133 and 1136. Lever 1135 extends beyond link 1134 for some distance and is adapted to be engaged by a plunger 1139 secured to a piston 1140 movable in a chamber 1141$a$ formed in a block 1141. (See FIG. 27.) Latch 1132 has secured thereto a lug 1132$c$ having a projection adapted to engage the actuating plunger of a switch IJ4A when the latch 1132 is in the latching position shown. Latch 1132 is shown as provided with stepped surfaces 1132$d$ adapted to be engaged by roller 922 on lever 921 fulcrumed on pivot 920 carried on the hoist pawl 912. (See FIGS. 27 and 29.) Lever 921 has a bill or hook latch at its other end arranged to engage over the top of aft frame lug 1130$a$ to hold it on pawl 912. A switch IJ7 is disposed adjacent latch 1162 and is adapted to be operated by a plunger 1144 which is moved by a roller 1145 adapted to be engaged by the forward lug 1130$b$. Roller 1145 is moved toward frame 1130 by a spring 1146 disposed in a casing 1147 in which plunger 1144 slides. (See FIGS. 30 to 33.)

A conduit 1141$b$ extends from chamber 1141$a$ to a source of liquid under accumulator pressure referred to as PA, see FIGS. 27 and 34. Another conduit 1143$d$ extends from chamber 1141$a$ to a chamber 1143$a$ formed in a block 1143 carried on the hoist frame. A valve 1144 fits in and is movable in chamber 1143$a$, the same having a rod extending therefrom connected at its end to an arm 1142 secured to a shaft 1142$a$ to which an arm 1142$b$ is secured. Arm 1142$b$ is pivoted to the core of a solenoid SJ3. A switch IJ103 is disposed to be engaged by arm 1142$b$ when solenoid SJ3 is actuated. A compression coiled spring 1145 in one end of chamber 1143$a$ surrounds said rod, the same urging valve 1144 toward shaft 1142$a$. A conduit 1143$b$ leads from adjacent one end of chamber 1143$a$ to tank. Another conduit 1143$c$ leads from said chamber to conduit 1141$b$ and thus to PA.

Figure 31:
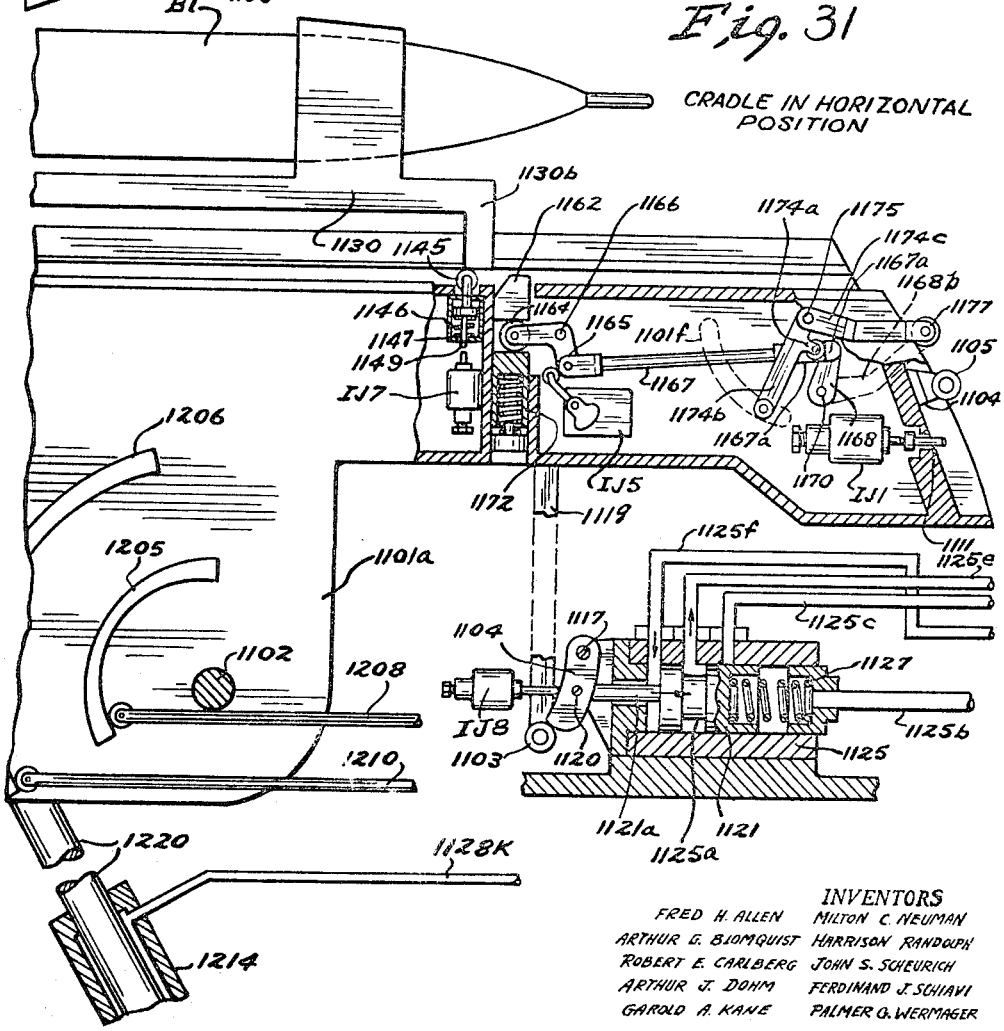
FIG. 31 is a view similar to FIG. 30 showing a portion of the Strike Down Cradle.
Figure 32:
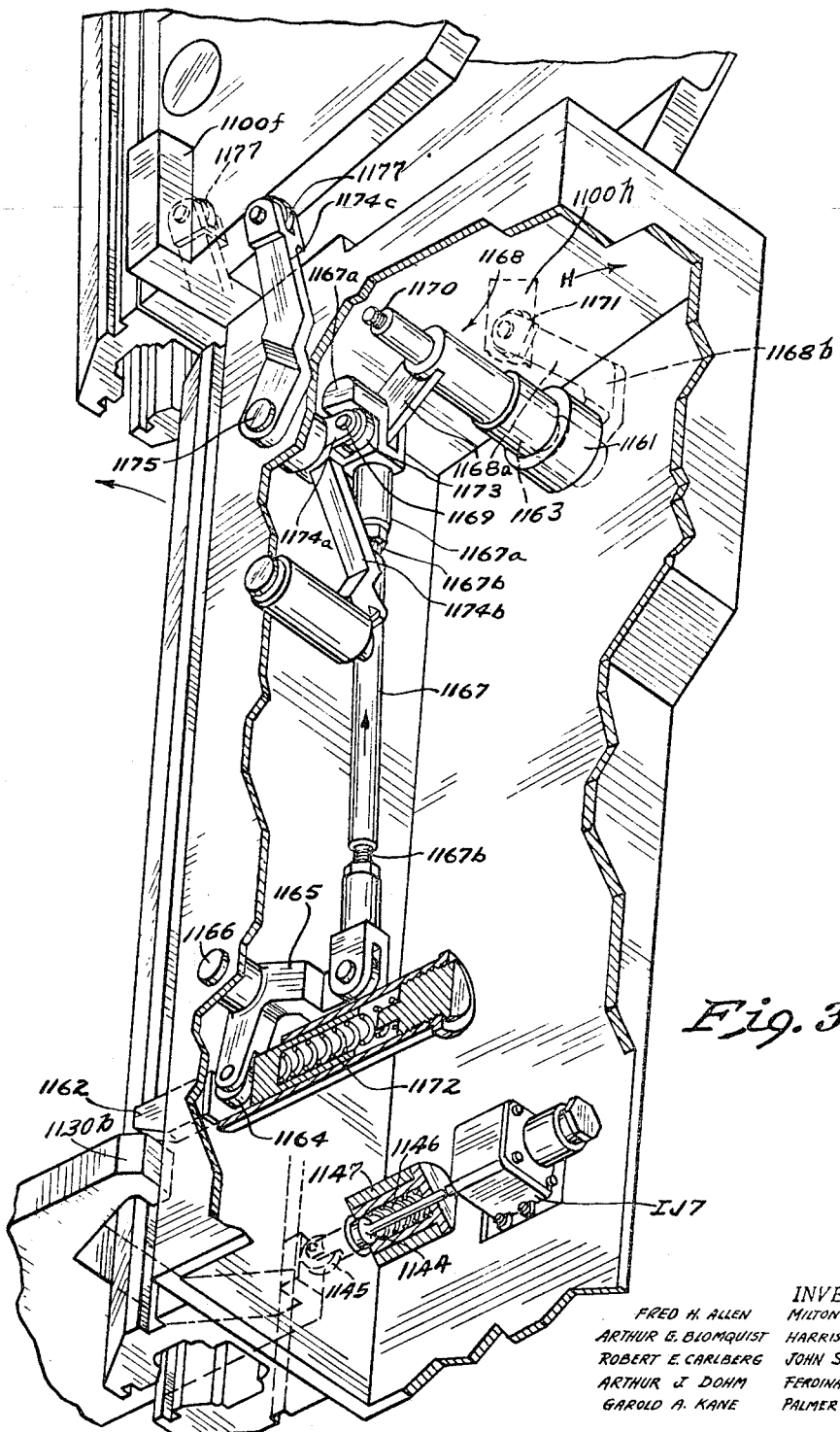
FIG. 32 is a perspective view partly in vertical section showing parts of the Strike Down Cradle.
Figure 33:
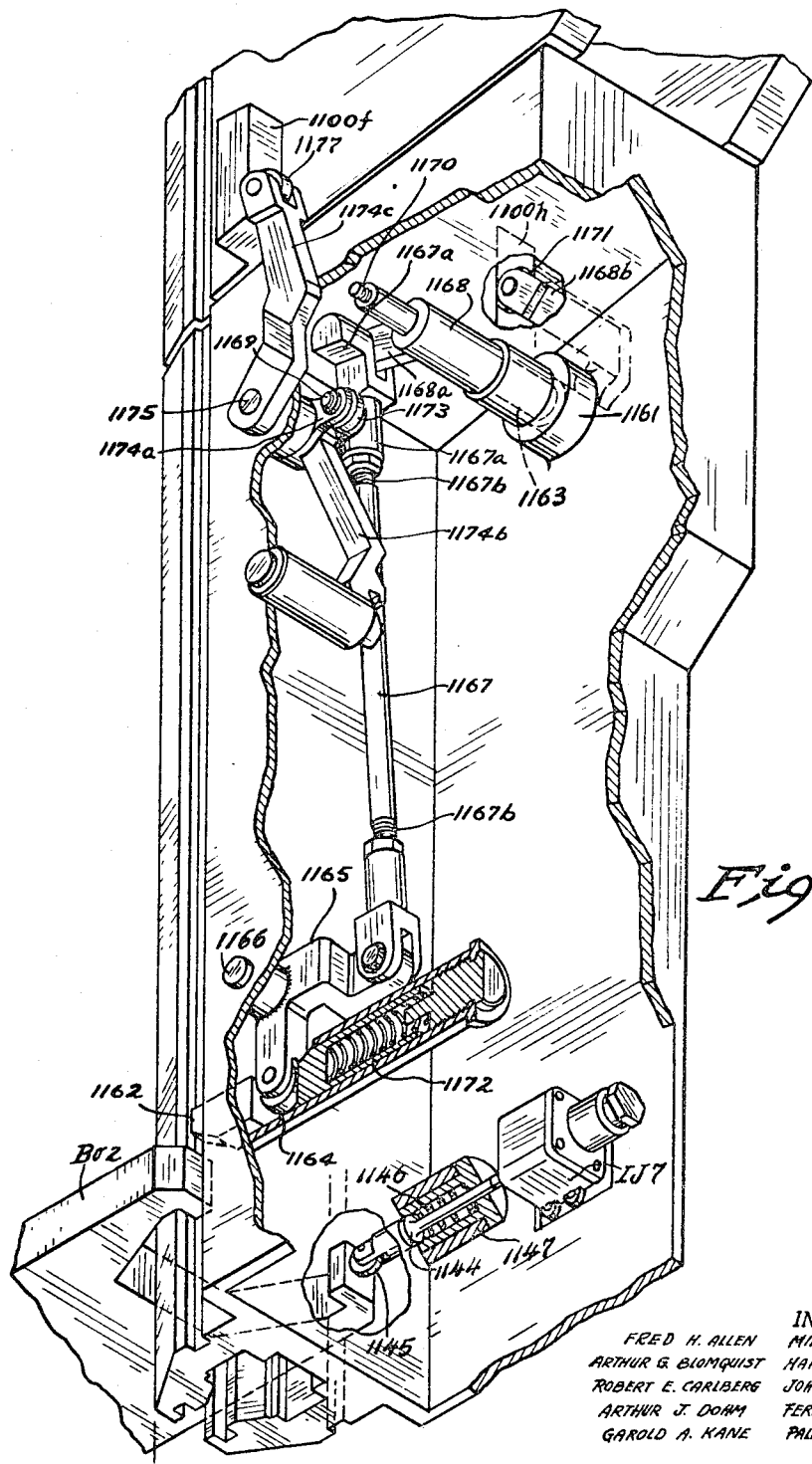
FIG. 33 is a view similar to FIG. 32 also showing parts of the Strike Down Cradle.

A latch 1162 is provided for the frame 1130, said latch being movable in a passage adjacent one end of the cradle and having a slot therein in which is disposed a roller 1164 carried at one end of a bell crank lever 1165 swingable about a fixed pivot 1166, see FIGS. 31–33. The other arm of lever 1165 has pivoted thereto one end of a link 1167 which at its other end is pivoted to the shorter arm 1168$a$ of a bell crank lever 1168 which is oscillatable about a fixed pivot 1170. (See FIG. 33.) Link 1167 has portions 1167$b$ threaded into its forked end portions and can thus be lengthened or shortened. Lever 1168 has secured thereto a shaft 1163 journaled in a stationary bearing 1161 on the hoist frame. The longer arm 1168$b$ of lever 1168 is of angular form and has a roller 1171 journaled in its forked end. Roller 1171 when the cradle nears vertical position, is adapted to engage a portion 1100$h$ of the hoist frame and swing lever 1168 clockwise and cause latch 1162 to move inwardly to released position. Latch 1162 is moved to latching position by a compression coiled spring 1172. Spring 1172 will move latch 1162 to latched position except when roller 1171 on arm 1168$b$ is in engagement with the hoist frame or when lever arm 1174$b$ (to be later described) is moved to release position. When latch 1162 is moved to latching position the end of link 1167 engages a roller on the actuating arm of a switch IJ5, which switch is then closed. (See FIG. 26.) A bell crank lever 1174 is fulcrumed on a fixed pivot 1175 and has a short arm 1174$a$ carrying a roller 1173. Lever 1174 has another arm 1174$b$ forming a crank handle for lever 1174 and having a portion movable in an arcuate slot 1101$f$ in the cradle. (See FIG. 26.) Roller 1173 is arranged to be engaged by a lug 1167$a$ on link 1167 when spring 1172 moves latch 1162 to latch position. Lug 1167$a$ is moved toward latch 1162, thus moving link 1167 downwardly to cause lug 1167$a$ to engage roller 1173. An arm 1174$c$ is also secured to lever 1174 and has mounted thereon at its other end a roller 1177 which is arranged to engage a lug 1100$f$ on the hoist rail when the cradle approaches vertical position.

The frame 1130 has therein a fixed pivot 1180 about which swings a member 1181, see FIG. 29, having a recess in which is disposed a shaft 1182 having a threaded terminal end. A hand wheel 1183 is connected to shaft 1182 and said shaft has thereon a piston movable in a recess in member 1181, said piston having a conical side adapted to engage a beveled wall at one end of said recess. A compression coiled spring 1184 acts to normally move shaft 1182 outwardly away from the missile. Member 1181 has an arm at the side opposite pivot 1180 which is pivoted to one end of a link 1185, which link is pivoted at its other end to a lug on a member 1186. Member 1186 has a recess therein in which moves a piston or guide member 1187. Piston 1187 has a projecting arm which is pivoted at its end to a lever 1188 movable about a fixed pivot 1190 in frame 1130. Lever 1188 has an arm projecting toward the missile which carries a roller 1191. Lever 1188 at one end has a recess therein in which is disposed one end of a coiled compression spring 1192, the other end of which is disposed in a recess formed in a lug projecting from a portion of frame 1130. A compression coiled spring 1194 is disposed in member 1187 and engages member 1187 at one end so as to normally move member 1187 and hence roller 1191 toward the missile. Member 1186 has an arm projecting therefrom which is pivoted at its end to one end of a lever 1195 movable about a pivot 1196 disposed in a bracket 1197 secured to member 1130. Lever 1195 at its other end carries a roller 1198 disposed to engage the actuating plunger of a switch IJ9.

A member 1200 having a rail portion similar to the cradle rail is movable in an opening in the cradle and has at its inner end a flange 1200$a$. Flange 1200$a$ is arranged to be engaged by one end of a compression coiled spring 1201 disposed in a recess in the cradle, said spring at its other end engaging one end wall of said recess. Spring 1201 acts to move member 1200 to bring its rail portion out of alignment with the cradle rail. Flange 1200$a$ is movable in a recess 1200$g$ formed in the cradle. When the cradle approaches vertical position or near the same, flange 1200a comes into position to engage a roller 1202 (see FIG. 27) carried on bracket 1203 mounted on a portion of the hoist frame. This moves member 1200 to a position where its forward end which constitutes part of the cradle rail is in vertical alignment with the other portions of said rail. When the cradle moves away from vertical position, spring 1201 moves member 1200 to the position shown in FIG. 27 and the aft lug 1130a on frame 1130 can then enter the space left by member 1200 and then be moved longitudinally to engage the cradle rail. (See FIG. 27.)

One of the lugs 1101a has secured thereto spaced cams 1205 and 1206, see FIGS. 26 and 28. A valve 1207 is movable in chamber 1128b and has a rod projecting to without block 1128, the same carrying a roller 1208 at its outer end adapted to engage cam 1206. Valve 1207 is pivotally connected to one end of a lever 1209 swingable about a fixed pivot midway between its end in block 1128. Lever 1209 at its other end is pivoted to a valve 1210 movable in chamber 1128a and having a rod at its end extending to without block 1128 and having a roller 1211 at its outer end adapted to engage cam 1205. As shown, valve 1207 has three lands A, B and C thereon, land C being provided with a recess at its inner end. Valve 1210 has three lands D, E and F. A rod 1207a extends from valve 1207 through said recess and has a head 1207b at its end movable in a chamber 1128c formed in block 1128. A similar rod 1210a extends from land F of valve 1210 through the recess therein, and has a head 1210b movable in a chamber 1128e in block 1128. Chambers 1128c and 1128e are connected to a passage 1128g by passages 1128f. Passage 1128g extends from the lower side of chamber 1128a to conduit 1128h adjacent chamber 1128b. A conduit 1128i extends from conduit 1112b to a chamber 1128v disposed between the inner ends of chamber 1128a and 1128b and is connected by a passage 1128w to a chamber 1128x extending between chambers 1128a and 1128b. Valves 1207 and 1210 are thus identical in structure. Said passage 1128h communicates with conduit 1129b and extends to a source of liquid under accumulator pressure (PA). (See FIG. 28.) A passage 1128y extends from chamber 1128b to a chamber 1128j in block 1128 and has a branch 1128y1 extending to one of chambers 1128J.

A conduit 1128k extends from chamber 1128b to one end of piston chamber 1214a in a cylinder 1214, see FIG. 34. A passage 1128m in block 1128 extends from conduit 1128k to one end of valve chamber 1128j. A conduit 1128o extends from an intermediate point in chamber 1128j to tank. A valve 1215 is disposed and movable in chamber 1128j and is moved to one end of said chamber by a compression coiled spring 1216. A conduit 1128p extends from an intermediate point in chamber 1128a to the other end of chamber 1214a in piston cylinder 1214. (See FIG. 27.) A passage 1128q extends from an intermediate point in chamber 1128a and has branches communicating with spaced points in a chamber 1128r in block 1128. A passage 1128s extends from conduit 1128p to adjacent one end of chamber 1128r. A conduit 1128t extends from chamber 1128r to conduit 1128o and thus to tank. A valve 1217 is movable in chamber 1128r and is moved toward one end of said chamber by a compression coiled spring 1218. A piston 1220 is movable in chamber 1214a and is pivotally connected by a pivot 1221 to one of the lugs 1101a. Cylinder 1214 is swingable about a fixed pivot 1222 mounted in the hoist frame.

*Moving cradle to horizontal position*

In FIGS. 26 and 27, the cradle is shown in vertical position, at which time its rail portion as shown is in alignment with and forms a part of the hoist rail. At this time the upper latch 1106 has its end engaging roller 1105 and the lower latch 1118 has its end engaging roller 1122. The cradle is thus latched at both ends to the hoist in vertical position. Switches IJ1 and IJ2 indicate that the cradle is latched in vertical position. When the cradle is to be moved to horizontal position to receive the booster portion of the missile or bird portion of the missile, solenoid SJ3 will be energized by the operator closing a switch (not shown). Solenoid SJ3 is a push solenoid. This will move valve 1144 to the right, as seen in FIG. 27, and PA will be supplied to valve chamber 1143a through conduits 1141b and 1143c. PA will pass through chamber 1143a and through conduit 1143d to the end of chamber 1141a at the end of piston 1140 and said piston will be moved to the left, as shown in FIG. 27. Plunger 1139 will engage the lower end of lever 1135 and the toggle formed by stop 1132 and lever 1135 will be moved over center and stop or latch 1132 will be moved to and held in broken position. Switch IJ103 will be actuated and will indicate that latch 1132 is in unlatched position.

The operator now closes a switch (not shown) and energizes solenoid SJ1. Solenoids SJ1 and SJ2 are pull solenoids. This swings lever 1156 and oscillates shaft 1152 which in turn swings the lever 1151. Valve 1150 is moved to the left, as shown in FIG. 28, and PA passes from conduit 1129b, around valve 1150 in chamber 1129a, and through conduit 1112d to chamber 1112a at one end of piston valve 1109. Piston valve 1109 is moved and swings upper latch 1106 away from roller 1105 thus unlatching the cradle at its upper end. Switch IJ1 is operated and will now indicate that the cradle is so unlatched. When valve 1109 is moved upwardly, PA can pass through conduit 1112c to chamber 1114a at the top of piston valve 1115 and the latter is moved downwardly. This pulls lower latch 1118 downwardly away from latching roller 1122 and the cradle is thus unlatched at its lower end. Switch IJ2 will operate and indicate that the cradle is so unlatched. PA is also ported from chamber 1114a through conduit 1114d to chamber 1128a at the end of valve 1210 and said valve is moved to the right, as shown in FIGS 28 and 31, thus swinging lever 1209 and moving valve 1207 until roller 1208 engages cam 1206. PA can now pass from conduits 1129b and 1128h, through passage 1128g, around valve 1210 in chamber 1128a, and through conduit 1128p to one end of piston chamber 1214a, and piston 1220 is moved as indicated by the arrow in FIG. 27, to move and swing the cradle 1101 to horizontal position. The liquid above piston 1220 is ported to tank through conduit 1128k, through chamber 1128b, through passage 1128y, around valve 1215 in chamber 1128j and through conduit 1128o. Cam 1205 will move roller 1208 and valve 1207 so that the end of passage 1128y at valve chamber 1128b will be gradually opened and then gradually closed which will control the acceleration, full speed and deceleration phases of the cradle movement. The valve 1215 will regulate the discharge to tank through chamber 1128j and thus the movement of the cradle. Spring 1216 will be set for a certain pressure and if the pressure in conduit 1128i drops below this, spring 1216 will move valve 1215 to partially close the end of passage 1128y at valve chamber 1128j. When the end of passage 1128y at chamber 1128b is partially closed by land A of valve 1207, this may cause a rise in pressure in chamber 1128b between lands A and B of valve 1207 and thus in passage 1128m. This will act on the end of valve 1215 and move said valve to diminish the opening into conduit 1128o. If said pressure rises to a certain point, valve 1215 will be moved against the pressure of spring 1216 and open the end of passage 1128x.

Figure 30:
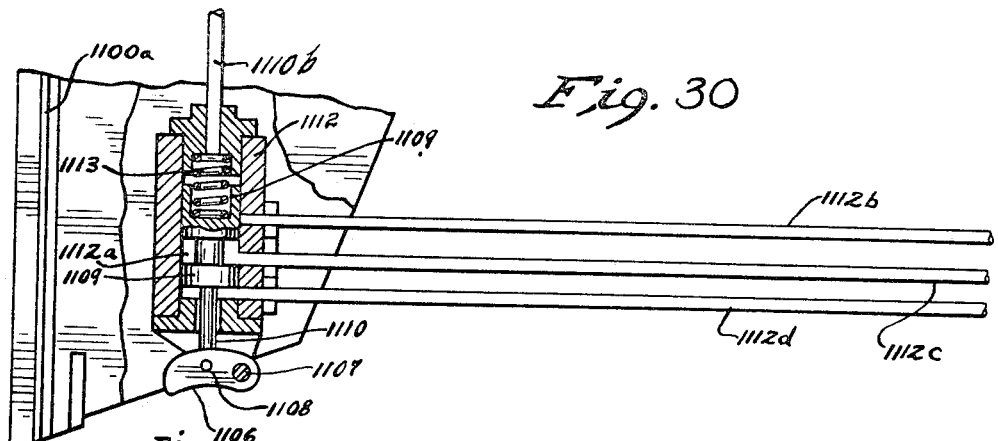
FIG. 30 is a view partly in side elevation and partly in vertical section also showing a portion of the control mechanism for the Strike Down Cradle.

When the cradle comes to horizontal position, roller 1103 will move to position below latch 1104, as shown in dotted lines in FIG. 26 and in full lines in FIG. 30 and the cradle will be thus latched in horizontal position. Only one latch is used to hold the cradle in horizontal position. A booster portion of the missile, or one of the frames 1130, is now brought over the cradle by trolley 1922 and placed thereon. (See FIG. 4). A bird portion of the missile is clamped to frame 1130. Handle arm 1174b of lever 1174 will now be swung counter-clockwise from latch position to release position, which release position is shown in FIG. 31. When this is done, roller 1173 engages and lifts lug 1167a and link 1167, thus swinging lever 1165 to move latch 1162 downwardly to the release position shown in FIG. 30. Member 1200 has now been moved inwardly or away from the cradle rail by spring 1201 to the position shown in FIG. 29, and the aft lug 1130a can be disposed in the space left by the inward movement of member 1200. Forward lug 1130b will be at the end of the cradle and can thus move to embrace said rail. Frame 1130 is moved on the rail of the cradle until the aft lug 1130a engages stop or latch 1132. The forward lug moves slightly past latch 1162. Lever 1174 is now moved to latch position by swinging handle arm 1174b clockwise and the latch 1162 is moved upwardly by spring 1172 to latching position so as to engage the forward lug 1130b will engage roller 1145 and switch the stop or latch 1132 and the latch 1162. As the frame 1130 or the booster moves along the rail of the cradle, forward lug 1130 b will engage roller 1145 and switch IJ7 will be operated and will give an indication that a frame 1130 or booster Bo is in position on the cradle.

As the bird portion is clamped to frame 1130 the bird engages roller 1191 and moves the same down to the position shown in FIGS. 26 and 29. This moves lever 1188 and member 1187 and lever 1195 is swung through spring 1194 to actuate switch IJ9. When switch IJ9 is thus actuated, solenoid IJ2 cannot be energized and the cradle cannot be swung to vertical position. When stop 1132 moves to stop position, lug 1132c operates switch IJ4A, which switch will indicate said position of stop 1132. The operator now rotates hand wheel 1183, thus rotating shaft 1182 and the threaded end of the latter is screwed into the side of the Bird. This operation moves member 1186 through link 1185 and member 1181 since the latter member is moved by the conical enlargement of shaft 1182. Lever 1195 is then swung to move roller 1198 away from switch IJ9. The solenoid SJ2 can now be energized and the cradle could thus now be swung to its vertical position. The engagement of threaded shaft 1182 with the Bird prevents the dropping of the Bird as the cradle is swung to vertical position. The cradle is now loaded with either the booster or the missile frame and the Bird portion of the missile, and can now be swung to vertical position. PA acts on members 1207b and 1210b and thus acts to move valves 1207 and 1210 to the neutral positions shown.

When the booster portion of the missile is to be loaded on the cradle, frame 1130 is not needed. The booster has forward and aft lugs thereon and these will take the same positions on the cradle rail as the forward and aft lugs 1130b and 1130a on the frame 1130. The threaded shaft 1182 is thus not needed or used when the booster is transferred. The operation of moving the cradle to horizontal position to receive a booster is thus identical with moving it to horizontal position to receive the Bird and the frame 1130.

*Moving cradle to vertical position*

To move the cradle to vertical position, solenoid SJ2 is energized by the operator closing a switch (not shown). This swings lever 1156, shaft 1152 and lever 1151 so that valve 1150 is moved to the right, as shown in FIG. 28. PA can now pass from conduit 1129b to valve chamber 1129a and through conduit 1125f to valve chamber 1125a at one end of valve 1121. Valve 1121 is moved to the right, as shown in FIGS. 26 and 31, and this swings latch 1104 away from roller 1103 so that the cradle is now unlatched. Switch IJ8 will operate and indicate that latch 1104 is in unlatched position. When valve 1121 moves to the right, PA can pass through conduit 1125e to valve chamber 1128b and valve 1207 will be moved to the right, as shown in FIGS. 26 and 28. This will swing lever 1209 and valve 1210 will be moved to the left until roller 1211 engages cam 1205. This movement of valves 1207 and 1210 opens the ends of conduit 1128h and passage 1128q. PA can now pass from conduit 1129b to conduit 1128h into valve chamber 1128b and through conduit 1128k to the upper end of chamber 1214a in in cylinder 1214. Piston 1220 which is now at said upper end is thus moved downwardly as indicated by the arrow in FIG. 32, and the cradle is swung about shaft 1102 to the vertical position shown in FIGS. 26 and 27. The discharge from chamber 1214a passes out through conduit 1128p and through passage 1128q, conduit 1128t and conduit 1128o to tank. The valve 1210 will control passage 1128q as it is moved by cam 1206 and this will control the acceleration, full speed and deceleration phases of the cradle movement. The passage of fluid to tank will also be controlled by valve 1217. The fluid from chamber 1214a, as stated, passes through passage 1128q. Valve 1210 gradually cuts off the passage of fluid into passage 1128q. This may cause a rise of pressure around valve 1210 between lands D and E thereof at the left, as shown in FIG. 28 and this fluid under this additional pressure passes through passage 1128s to the right end of valve 1217. This valve is thus moved to the left, as shown in FIG. 27, and the opening into conduit 1128t will be diminished. This will act to decelerate the movement of the cradle. When the pressure in passage 1128s diminishes, spring 1218 which is set for a certain pressure, will move valve 1217 to the right, thus increasing the opening into passage 1128t. As the cradle comes to vertical position, roller 1105 will move to latching position at the end of latch 1106 and roller 1122 will move into latching position at the end of latch 1118. The cradle is thus now latched to the hoist at its top and bottom and in vertical position. Said latches and plungers 1111 and 1123 will respectively operate switches IJ1 and IJ2. Said switches will now indicate that the cradle is latched in vertical position.

As the cradle approaches vertical position, the latch release arm 1168a will be moved by roller 1171 engaging portion 1100h of the hoist frame and lever 1168 will be oscillated and move link 1167 upwardly, see FIG. 32, thus swinging lever 1165 counter-clockwise and moving latch 1162 away from lug 1130b. Also as the cradle approaches this vertical position, roller 1177 on arm 1174c of lever 1176 will engage the lug 1100f on the hoist frame and this will swing handle arm 1174b to latch position. This however does not move the latch 1162. Roller 1173 merely moves away from lug 1167a. The handle 1174b is thus moved and held in latch position to prevent anyone moving said handle until the cradle is in horizontal position. Latch 1162 must be held in unlatched position when the cradle is in its vertical position so that the forward lug can move along the rail.

As the cradle approaches and comes to vertical position, flange 1200a engages roller 1202 and member 1200 is moved so that its rail portion is in vertical alinement with the rest of the cradle rail. The cradle is now in vertical position and the necessary movement of the hoist to raise or lower the missile can be made. When a booster has been placed on the cradle and the cradle moved to vertical position, the hoist will be moved upwardly. Roller 922 engages latch 1132 and swings the same about pivot 1133. The toggle comprising latch 1132 and member 1135 is then broken or pushed over center and stop or latch 1132 is moved to retracted position. If a booster is on the cradle it can now be lowered below the cradle. When a Bird has been placed on the cradle and the cradle moves to vertical position, the hoist will be moved upwardly to bring the booster into engagement with the Bird. The booster has a projection B3 at its upper end having a frusto-conical upper end which enters a socket in the bottom of the Bird. The shaft 1182 will now be retracted by hand wheel 1183 to disengage the Bird. Stop or latch 1132 will be moved to retracted position when the hoist moves upwardly as above described. The booster and Bird can now be lowered to transfer position and will be moved by the transfer mechanism to the Ready Service Ring.

As above stated, the booster portion of the missile can be transferred to the hoist just the same as the Bird portion of the missile except that the booster does not require the use of frame 1130. The booster, as stated, has fore and aft lugs secured thereto.

When the electrical power is off, a cycle of movement of the cradle to horizontal or vertical position can be initiated manually by turning shaft 1152 manually with the handle 1161 to move valve 1150.

In FIGS. 36 to 39, a modified structure of the Strikedown Cradle parts is shown. In FIG. 36 the frame 1130 to which the Bird of the missile is attached is shown. The Bird is held on the frame 1130 by a swinging clamping member designated generally as 1240. Said member 1240 swings about the axis of a stationary shaft 1242 having reduced portions adjacent its ends forming shoulders against which members 1243 having flanges 1243a engage and having further threaded reduced portions 1242a. Members 1243 are held in place by washers 1245 and by nuts 1244 threaded onto reduced portions 1242a. Coiled torsion springs 1246 surround shaft 1242 and are secured to member 1240 at their ends which are adjacent said member. The other ends of springs 1246 are secured to the members 1243. Springs 1246 tend to move the clamping member 1240 to open or unclamping position. Member 1240 has a handle 1240a which can be grasped to swing said member about the axis of shaft 1242 to clamping position. The member 1240 at its forward side has a portion adjacent handle 1240 which has a flat lower surface 1240b which rests upon the flat surface 1247a of a portion 1247b of a stationary member 1247 secured to frame 1130. Member 1240 has slidable therein adjacent one end thereof a member 1248. Member 1248 is moved by a screw 1250 threaded therein to which is secured a hand wheel 1251 having a projecting handle 1251a. Member 1248 has a depending arm or lug 1248a which is adapted to enter a recess in the Bird Bi. Member 1248 can be moved by turning wheel 1251 to bring portion 1248a in alignment with the said recess in the Bird. When the clamping member 1240 is in clamping position it is locked in such position by a latch 1252. Latch 1252 has a movable cylindrical portion 1252a rotatable in a member 1253 secured to member 1247, FIG. 37, and which has secured thereto a pin or portion 1252b which extends at right angles to portion 1252a. When member 1240 is in clamping position, latch 1252 and particularly its portion 1252b is adjacent a pair of spaced horizontal surfaces 1240c and 1240d, as seen in FIG. 39a. When in this position said latch can be rotated through 90 degrees by the handle 1254 secured to the lower end of latch 1252 and held thereon by a nut 1254a threaded onto the lower end of said latch. When so turned through 90 degrees, portion 1252b is positioned between the surfaces 1240c and 1240d so that the member 1240 cannot now be swung about shaft 1242. See FIGS. 37 and 39a. Latch 1252 is locked in said latching position and for this purpose has a slot 1252c in one side thereof. A locking member 1255 is slidable in a bore in member 1247 and the same has an opening 1255a therein in which is disposed the head 1256a of a hand lever 1256 which is pivoted on a pivot 1258 carried in member 1247. Member 1255 is urged to locking position by a compression spring 1259. A switch IJ9 is secured to a member 1260 having a flange secured to one end of member 1247 by spaced bolts 1262. Member 1260 has a flange at its other end to which switch IJ9 is secured by the bolts 1263. The operating plunger of switch IJ9 is axially aligned with the reduced portion 1255b of member 1255 which is surrounded by spring 1259. Member 1255 has a recess 1255c therein at one side thereof and a member 1264 is movable in a bore in member 1247, said member having a cylindrical portion 1264a and another cylindrical portion of smaller diameter 1264b. Member 1264 is urged upwardly, as seen in FIG. 37 by a coiled compression spring 1266. When clamping member 1240 is swung to open position, spring 1266 will move member 1264 upwardly to the position shown in FIG. 37. When the member 1240 is brought to clamping position the bottom surface 1240b strikes the top of member 1264 and the latter is moved downward against the pressure of spring 1266. When member 1255 is in locking position, as shown in FIG. 37, the reduced portion 1264b engages one side of member 1255. When the member 1255 is moved to unlocking position, the portion 1264a of larger diameter is moved upwardly by spring 1266 and moves into the recess 1255c. This holds locking member 1255 in unlocked position. See FIGS. 37 and 39.

Member 1255 is moved to unlocking position by swinging member 1256 about member 1258. This moves member 1255 against the pressure of spring 1259 and the end of portion 1255a engages the actuating plunger of switch IJ9 so that said switch is operated. When said switch is operated, the strikedown cradle cannot be swung to align with the hoist rail. This is to insure that the strikedown cradle will not be swung until the Bird is securely clamped to frame 1130. Member 1240 has a plate 1240k upstanding therefrom having holes 1240m therein. Holes 1240m receive lifting means on trolley 1922 when the frame 1130 and the Bird Bi are placed on the strikedown cradle.

Frame 1130 comprises a shell 1130d which surrounds the Bird Bi. Said shell has a flange 1130e at one end which is rotatable in ball bearings 1130f. At its other end shell 1130d has secured thereto a roller 1130g which moves in a semi-annular passage in frame 1130. Shell 1130d has a lug 1130h secured thereto and a handle 1130i is pivoted to lug 1130h.

When the strikedown cradle moves to position in alignment with the hoist rail and carries the Bird portion of the missile, the handle 1130i can be lifted and shell 1130d rotated to bring the engaging parts of the booster and Bird into the desired alignment.

A lever 1267 is swingable about a pivot 1268 in frame 1130 and is urged to the position shown in FIG. 36 by a coiled compression spring 1268 having one end seated in a recess in lever 1267 and its other end seated in a recess in a member 1269 secured to frame 1130. Lever 1267 has a depending arm 1267a in which is disposed a screw 1270. Screw 1270 can be adjusted to different positions and held in position by a lock nut 1271. Screw 1270 is in substantial axial alignment with the operating plunger IJ11a of a switch IJ11. When the Bird Bi is placed in the frame 1130 it will engage lever 1267 and force the same downwardly, thus swinging arm 1267a and operating switch IJ11. Said switch will then indicate that there is a Bird in frame 1130.

A roller 1272 is carried on a member 1273 disposed in a recess in a depending lug 1130j of frame 1130. Member 1273 is urged downwardly by a coiled compression spring 1274. Roller 1272 is arranged to engage a plunger 1275 having a collar 1275a thereon movable in a bore in a depending lug forming part of the strikedown cradle. Collar 1275a and plunger 1275 are urged upwardly by a coiled compression spring 1276 disposed in said lug. Plunger 1275 is arranged to engage the operating arm of a switch IJ17. Switch IJ17 indicates that there is now a Bird frame on the strikedown cradle.

THE SPANNING RAIL CONTROL

The launcher bedplate houses blast doors which are moved out to a closed position when the missile is to be discharged. These blast doors move into a position over the hoist rail and into position to receive the hot gases discharged by the missile. To make this possible a short section of the hoist rail called the spanning rail is mounted to swing from its normal vertical position in which it forms part of the hoist rail to a horizontal position to provide an opening or space in said rail to permit the blast door to move to closed position through said opening or space.

Referring to FIGS. 40 to 43, the swinging portion of the hoist rail, which is called the spanning rail, is shown, together with the controls therefor. Referring to FIGS. 41 and 42, the spanning rail is designated as 1300, the same being mounted to swing about a pivot 1301. Said spanning rail in its vertical position as shown is disposed between the lower end of a launcher arm 1915 and the upper end of a section 1304 of the hoist rail, which section is called the aliner track. Section 1304 is yieldingly held in position and swingable slightly about a pivot shaft 1319 disposed in lugs 1323 on rail portion 1304. Shaft 1319 is supported in a lug 1317 on the hoist frame.

The spanning rail 1300 is latched at its upper end to launcher arm 1915 by the latch 1305 which swings about a pivot 1306 carried in the rail 1300. Latch 1305 engages a roller 1927 carried on a small bracket 1928 secured to launcher arm 1915. Latch 1305 is connected by pivot 1310 to a rod secured to a valve 1311 movable in a valve chamber 1312a formed in a block 1312 carried by rail 1300. Valve 1311 is moved toward one end of chamber 1312a by a compression coiled spring 1313 disposed in the other end of chamber 1312a. A switch IO2 is carried on the launcher arm and its actuating plunger will be engaged by a plunger 1315 slidable in a lug 1915a on the launcher arm. Plunger 1315 is held in its lower position by a compression coiled spring 1314 and said plunger will be engaged by latch 1305 to operate switch IO2 when latch 1305 moves to latch position. A conduit 1320 extends from the upper end of valve chamber 1312a to adjacent one end of a valve chamber 1321a in a valve block 1321. Another conduit 1322 extends from an intermediate point in valve chamber 1312a to one end of valve chamber 1321a, the same having a branch 1321b extending to adjacent the other end of valve chamber 1321a. A conduit 1323 extends from conduit 1322 to a valve chamber 1324a in a valve block 1324 carried on the spanning rail 1300. A valve 1326 is movable in chamber 1324a and has a rod projecting therefrom pivoted by a pivot 1327 to a latch 1328, which latch is mounted to swing on a pivot 1329 carried in lugs on the spanning rail 1300. A compression coiled spring 1330 disposed in chamber 1324a acts to move valve 1326 toward the open end of block 1324. Latch 1328 is arranged to have its end engage a roller 1332 mounted in lugs 1304a carried on the rail portion or aliner track 1304. When latch 1329 moves to such latching position it engages a roller 1333 carried at one end of a lever 1334 fulcrumed on a pivot 1335 carried in the spanning rail. Lever 1334 adjacent its other end has thereon a pin adapted to engage the actuating plunger of a switch IO4 which will be mounted on the hoist frame. Switches IO2 and IO4 will indicate that latches 1305 and 1329 are in latched position and thus that the spanning rail is latched in vertical position. A conduit 1336 extends from valve chamber 1312a to the lower end of valve chamber 1324a. A conduit 1338 extends from the lower end of valve chamber 1312a to the atmosphere. A conduit 1339 extends from valve chamber 1324a to one end of a valve chamber 1340a in a valve block 1340. A conduit 1342 extends from one end of valve chamber 1324a to the atmosphere.

A valve 1343 is disposed in one end of valve chamber 1340a and another valve 1344 is disposed in valve chamber 1340a adjacent valve 1343. Valves 1343 and 1344 have engaging reduced portions at their adjacent ends and both valves are urged toward the end of chamber 1340a in which valve 1343 is disposed by a compression coiled spring 1345 disposed in the other end of chamber 1340a. A conduit 1346 extends from an intermediate point in chamber 1340a, located substantially between valves 1343 and 1344 when in the position shown in FIG. 41, and said conduit extends to a valve chamber 1348a in a stationary valve block 1348 which will be mounted on the hoist frame. A valve 1349 is movable in chamber 1348a, the same having a rod projecting to without said chamber and pivoted by a pivot 1350 to a latch 1351 pivoted by a pivot 1352 to a lug projecting from block 1348. The free end of latch 1351 will be engaged by a roller 1353 mounted in lugs on the spanning rail when said rail is in unspanned or horizontal position. Spanning rail 1300 will thus be locked in horizontal position by latch 1351 and roller 1353. When latch 1351 is moved to unlatching position by valve 1349, it engages the operating arm of a switch IO1. A positive stop 1360 is provided for the spanning rail when it reaches horizontal position.

When the spanning rail comes to horizontal position it engages the actuating arm of a switch IO3 which will thus be operated and will indicate that the spanning rail is in unspanned or horizontal position. Valve 1349 is urged in a direction to project its valve rod outwardly by a coiled compression spring 1354. A conduit 1355 extends from one end of valve chamber 1348a to an intermediate point in valve chamber 1321a. A conduit 1356 extends from an intermediate point in valve chamber 1348a upwardly quite a distance and is then reversely bent to extend downwardly to a point above the level of fluid in a tank 1358. Conduits 1356a and 1356b extend from conduit 1356 to the Strike Down Cradle control and the Blast Door control respectively. A conduit 1359 extends from the end of valve chamber 1348a opposite the valve rod end to the atmosphere.

A conduit 1362 extends from an intermediate point in valve chamber 1321a to a conduit 1363 which extends to a conduit 1363a extending to a source of fluid under pressure designated as PA. A conduit 1363b extends from conduit 1363a to the control mechanism for the Strike Down Cradle and will deliver PA thereto. Another conduit 1363c extends from conduit 1363a to the control for the Blast Door and will deliver PA thereto. Conduit 1363 extends beyond conduit 1362 and communicates with chamber 1340a in valve block 1340. Conduit 1363 has a branch 1363a extending to another point in valve chamber 1340a.

A valve 1325 is movable in valve chamber 1321a and has a valve rod projecting therefrom without said block and pivoted by a pivot 1369 to a lever 1370 secured to a shaft 1371. Valve block 1321 has a chamber 1321c therein and a rod 1377 extends into said chamber, the same having a reduced portion having a head 1377a at its end disposed in a reduced portion of chamber 1321c. A compression coiled spring 1372 disposed in chamber 1321c surrounds rod 1371, the same engaging a washer 1373 disposed at one end of chamber 1321c. Rod 1377 engages the outer side of washer 1373 and a reduced portion of said rod passes through washer 1373 and spring 1372. The other end of spring 1372 engages a washer 1374, which washer engages one end of the enlarged portion of chamber 1321 and can also be engaged by the head 1371a. Rod 1377 at its outer end is connected by a pivot 1375 to lever 1370. Shaft 1371 is disposed midway between pivots 1369 and 1375. A passage 1321d connects the reduced portion of chamber 1321c to the inner end of chamber 1321a. Said passage 1321d also communicates with conduit 1322.

Shaft 1371 is journaled in bearings in casings 1376 and 1378 and said shaft has connected thereto a lever 1379. Lever 1379 is connected by a pivot 1380 to the core of a solenoid SO2 and is connected at its other end by a pivot 1381 to the core of a solenoid CO1. Shaft 1371 is secured lever 1379 at the midpoint between pivots 1380 and 1381. Said shaft has at its upper end a socket 1371a having a recess therein of polygonal form in cross section adapted to receive the stem of a handle-equipped tool or wrench 1380, said stem being polygonal in cross section. Lever 1379 is disposed so that when solenoid SO2 is energized it will engage the operating plunger of a switch IO101, and then solenoid SO1 is energized it will engage the operating plunger of a switch IO102.

A conduit 1383 extends from adjacent one end of valve chamber 1340a to tank 1358. A conduit 1383a extends from conduit 1383 to the control for the Strike Down Cradle. A conduit 1384 extends from an intermediate point in chamber 1340a to a passage 1386g in a block 1386. A conduit 1387 extends from adjacent one end of chamber 1340a to a bore in a portion of block 1386. A passage 1340b extends from one end of chamber 1340a to conduit 1383. A piston 1388 is disposed in chamber 1386a, the same having a portion extending to without block 1386 and carrying a head pivoted by a pivot 1390 to a pair of lugs 1300a on the spinning rail 1300. Piston 1388 moves in the bore of a sleeve 1386b disposed principally in chamber 1386a. Block 1386 has a projecting stem 1386c at one end which projects into a bore in the free end of piston 1388. The inner end of piston 1388 moves between sleeve 1386b aand the outer surface of stem 1386c. The inner portion of stem 1386c has quite a number of small passages 1386d extending radially therethrough, said passages being spaced closer together adjacent the fixed end of stem 1386c. The sleeve 1386b has a plurality of ports 1386e which are alined with a port 1386f extending through a portion of block 1386, which passage communicates with a passage 1386g extending longitudinally adjacent one side of block 1386. Conduit 1384 communicates with one end of passage 1386g. A port or passage 1386h extends from the outer end of chamber 1386a to passage 1386g. A spring pressed check valve 1392 is disposed at the outer end of passage 1386g and normally prevents communication between the same and passage 1386h. The sleeve 1386b also has adjacent its outer end a plurality of small openings or passages 1386i extending therethrough, the same being spaced closer together adjacent the outer end of said sleeve. Said passages 1386i communicate with an annular passage 1386j between the wall of chamber 1386a and a reduced portion of sleeve 1386b. Ports 1386f communicate with the annular passage 1386j. Conduit 1387 communicates with the bore of stem 1386c and a passage 1386k extends from the inner end of chamber 1386a to said bore. Communication between passage 1386k and the bore of stem 1386c is normally closed by a spring pressed check valve 1393.

A conduit 1407 extends from an auxiliary accumulator (not shown) to a hand pump 1409 comprising a casing 1408. Casing 1408 has a chamber 1408a therein and a member 1410 having spaced pistons 1410a at its ends is movable in chamber 1408a. Member 1410 has a passage at its central portion in which is disposed the ball-shaped end 1411a of a hand lever 1411 having another ball-shaped portion 1410b intermediate its ends adapted to be disposed in a suitable socket. A pair of spaced valves 1416 and 1417 respectively control ports 1408a and 1417a leading respectively from passages 1408c and 1408b, which passages communicate respectively with the ends of chamber 1408a. Ports 1416a and 1417a communicate with conduit 1407. Valves 1412 and 1413 are disposed and movable in central bores in valves 1416 and 1417 and engage valve seats in ports leading from chamber 1408a between pistons 1410a. Compression coiled springs 1418 and 1419 are disposed in bores in a downwardly projecting portion of valves 1416 and 1417 respectively and act to urge valves 1412 and 1413 upwardly to closed position. Compression coiled springs 1421 and 1422 are disposed in chambers in the lower portion of block 1408 and engage the bottoms of valves 1416 and 1417 and thus urge said valves upwardly to closed position. Valves 1412 and 1413 are shown as having central passages which open at the sides of said valves below their upper ends and are arranged to communicate with passages 1408b and 1408c respectively when valves 1412 and 1413 are in closed position. A conduit 1423 extends from a central part of chamber 1408a to tank 1358.

*Operation of spanning rail*

When the spanning rail is in normal vertical position alined with and forming part of the hoist rail and it is to be moved to unspanned or horizontal position, solenoid SO2 will be energized by the operator closing a switch (not shown). Solenoids SO1 and SO2 are push solenoids. When solenoid SO2 is energized it will swing lever 1379, oscillate shaft 1371 and oscillate lever 1370 and move valve 1325 to the right, as shown in FIG. 40. PA will now pass from conduit 1363, through conduit 1362, into chamber 1321a, through conduit 1320 to the upper end of piston valve chamber 1312a above piston valve 1311. Valve 1311 will be moved downwardly against the pressure of spring 1313 and will pull latch 1305 away from roller 1327, thus unlatching the spanning rail at its upper end. As valve 1311 moves downwardly, PA can pass through conduit 1336 to the lower end of chamber 1324a and valve 1326 will be moved upwardly or to the right and will pull latch 1328 away from roller 1332 thus unlatching the spanning rail at its lower end. As valve 1326 is moved, PA can pass from chamber 1324a through conduit 1339 to the right-hand end of valve chamber 1340a in block 1340. This will move valves 1343 and 1344 to the left, as shown in FIG. 41, against the pressure of spring 1345. PA can now pass from conduit 1363 through passage 1363a into chamber 1340a and through conduit 1387 to the bore in stem 1386c and to the inner end of piston 1388. PA can also pass from conduit 1363, around valve 1344 in chamber 1340a, and through conduit 1384 and passage 1386f to the outer end of piston 1388. PA is now applied to both ends of piston 1388 and as the area ratio of the inner end to the outer end is about two to one, piston 1388 will be moved outwardly from block 1386 and will swing the spanning rail about its pivot shaft 1301 to horizontal position. When latches 1305 and 1328 are moved to unlatched position, switches IO2 and IO4 will be permitted to open and thus indicate the position of said latches. As the spanning rail reaches horizontal position, roller 1353 will move under the end of latch 1351 and said rail will then be latched in horizontal position. Only one latch is used to latch the spanning rail in horizontal position. The spanning rail engages the stop 1360 and as it approaches horizontal position it engages and operates switch IO3 which will indicate that the spanning rail is now latched in unspanned position. The blast door can now be moved through the space formed in the hoist rail by the unspanned position of rail 1300. The fluid at the outer end of piston 1388 is merely forced through the accumlator lines. The acceleration of the piston 1388 in moving the rail 1300 is uncontrolled but the deceleration is controlled by the small passages 1386i. As piston 1388 moves outwardly it will cover the passages 1386e. The fluid thereafter must pass successively through the small passages 1386i which are gradually covered by the piston. After passing through the passages 1386i the fluid will pass through passage 1386f and again to the PA line through passages 1386g and conduit 1384. When solenoid SO2 is energized, lever 1379 operates switch IO101 which will indicate the position of the parts moved by said solenoid.

*Movement of spanning rail to vertical position*

When the spanning rail is to be moved to its normal vertical position, solenoid SO1 will be energized by the operator closing a switch (not shown). This will swing lever 1379 and shaft 1371 will be moved in a counterclockwise direction and oscillate lever 1370 to move valve 1325 to the left, as shown in FIG. 40. PA can now move from conduit 1363, through conduit 1362, through chamber 1321a around valve 1325 and through conduit 1355 to one end of valve chamber 1348a. Valve 1349 will be moved to the left against the pressure of spring 1354 and will pull latch 1351 away from roller 1353, thus unlatching the spanning rail. As valve 1349 is moved, PA can pass from chamber 1348a, through conduit 1346 to chamber 1340a, between valves 1343 and 1344. Valve 1344 is moved to the left against the pressure of spring 1345. PA can now pass from conduit 1363 around valve 1344 in chamber 1340a and through conduit 1384, chamber 1386g, ports 1386f and chamber 1386a to the outer end of piston 1388. Said piston will now be moved inwardly and this will swing rail 1300 about its pivot shaft 1301 to vertical position. The acceleration of the piston 1388 in this movement is not controlled but the deceleration is controlled by the piston successively closing the small passages 1386d. The fluid at the inner end of piston 1388 will pass out through conduit 1387 and through chamber 1340a, around valve 1343 and to tank through conduit 1383. As the spanning rail moves from horizontal position, swith IO3 will be permitted to operate which will indicate that the spanning rail has moved from its unspanned position. As the spanning rail reaches vertical position, latch 1305 will move under roller 1327 so that its end comes to position engaging said roller thus latching the spanning rail at its upper end. Similarly as rail 1300 comes to vertical position, latch 1328 will move into latched position with its end engaging roller 1332. The rail is now latched at its upper and lower ends. As the latches 1305 and 1328 come to latched position they respectively operate switches IO2 and IO4 which will now indicate that the rail is latched in vertical position. As stated, when the spanning rail is in vertical position it forms a part of the hoist rail.

Should the electric power be off, a cycle of movement of the spanning rail could be had by turning shaft 1371 with the hand wrench 1380. Should there be no PA in the main accumulator, one cycle of the spanning rail may be performed from the auxiliary accumulator (not shown). The said auxiliary accumulator can be charged by hand by operating the hand pump carried in block 1408. By oscillating the handle 1411 the pistons 1410a will alternately move liquid through passages 1408b and 1408c. This liquid will force open the valves 1417 and 1416 and pass to the accumulator through conduit 1407. The liquid for the pump and accumlator will be drawn from tank 1358 through conduit 1423. Valves 1412 and 1413 are relief valves for the portion of chamber 1408a between pistons 1410a.

The 180 degree bend shown in conduit 1356 will be located at the highest possible point to assure a tankhead.

What is claimed is:

1. A missile-handling apparatus adapted to move a missile comprising a missile member and a booster having in combination, a cradle movable to a receiving position for separatively and alternately receiving said missile member and said booster, said cradle being movable to a delivery position, a fluid actuated means for moving said cradle to said positions, a pair of cams on said cradle, a pair of fluid controlling valves, said valves having rods with means thereon adapted to engage said cams, said cams thus moving said valves for controlling said fluid actuated means and the movement of said cradle in moving to said positions respectively.

2. A missile-handling apparatus having in combination, a hoist comprising a chain having pivotally connected links, a vertically extending channel in which said chain is disposed for guiding said links in a predetermined alinement, a first sprocket adjacent the lower end of said channel about which said chain runs for moving said chain upwardly and downwardly in said channel, a movable sprocket above said first sprocket over which said chain runs, a stationary support to which one end of said chain is secured after running over said movable sprocket, a flexible member supporting said movable sprocket, a second stationary support above said movable sprocket, a pulley carried by said second support, said flexible member running over said pulley, and a drum rotatable about the axis of said first sprocket, said flexible member extending to and being wound on said drum.

3. The structure set forth in claim 2, a shaft for rotating said first mentioned sprocket, said drum being secured to and driven by said shaft.

4. A missile-handling apparatus having in combination, a hoist comprising a chain having pivotally connected links, a vertically extending channel in which said chain is disposed for guiding said links in a rectilinear alinement, a first sprocket adjacent the lower end of said channel around which said chain runs, a movable sprocket above said first sprocket over which said chain runs, a stationary support to which one end of said chain is secured after running over said movable sprocket, a shaft for driving said first sprocket, and means driven by said shaft for moving said movable sprocket upwardly to take up said chain as said chain is moved downwardly in said channel.

5. The structure set forth in claim 4, said movable sprocket being weighted to be moved downwardly by gravity as said chain is moved.

6. A missile-handling apparatus adapted to move a missile comprising a missile member and a booster to and from a stowage mechanism having in combination, a hoist having a rail along which a missile is adapted to be moved, a strikedown mechanism including a cradle, said cradle being operable to separately and alternatively handle said missile member and said booster, said cradle having a rail similar to said hoist rail along which said missile is adapted to be moved, said cradle being movable from a delivery position in which said cradle rail is in longitudinal alignment with said hoist rail to a loading position in which said cradle rail is disposed transversely of said hoist rail, a frame carrying said missile member, means for placing said frame on said cradle when in loading position, a first lever pivotally connected to said frame, a screw guided in said first lever, a threaded opening in said missile member adapted to receive said screw and upon threaded engagement therewith to pivot said first lever, a second lever pivotally connected to said frame and adapted to contact said missile member when positioned on said frame, an intermediate member pivotally connected to said first lever and resiliently engaging said second lever, a switch on said frame, said switch adapted to be actuated by said intermediate member, means for moving said cradle to a delivery position, said cradle moving means being rendered inoperative by said switch when a missile member contacts said second lever, and said cradle moving means being rendered operative by turning said screw into threaded engagement with said opening.

7. A missile-handling apparatus adapted to move a missile comprising a missile member and a booster to and from a stowage mechanism having in combination, a hoist comprising a hoist frame and a rail along which said missile is adapted to be moved, a cradle having a rail operably mounted thereon, said cradle being rotatable to a delivery position in which said cradle rail is in longitudinal alignment with said hoist rail and said cradle being rotatable to a loading position in which said cradle rail is transverse to said hoist rail, latches for holding said cradle in said positions respectively, means acting to move said latches into latching engagement with said cradle, piston valves respectively connected to said latches, valve cylinders in which said piston valves respectively move, means for supplying fluid under pressure to said valve cylinders respectively for respectively moving said piston valves to move said latches to unlatched position, a cylinder with a piston movable therein pivotally interposed between said hoist frame and said cradle, a second valve for controlling the supply of fluid to said cylinder, a pair of solenoids, a third valve responsive to energization of said solenoids respectively, said third valve controlling the supply of fluid to said valve cylinders respectively for moving said piston valves, said piston valves controlling the supply of fluid to said second valve whereby when one of the solenoids is energized the latches holding said cradle in one of said positions will release said cradle for rotation to the other of said positions.

8. A missile-handling apparatus adapted to move a missile comprising a missile member and a booster having in combination, a strikedown mechanism including a cradle being operable to separately and alternatively handle said missile member and said booster, said cradle being movable to loading and delivery positions and having a rail portion adapted to have a frame carrying said missile member moved along the same, said frame having a first lug thereon, a latch movable to and from a position to be engaged by said first lug, resilient means urging said latch to said position, a first lever for moving said latch away from said position, a link connected to said first lever, a second lever having a first arm equipped with a handle movable to a latch position, said second lever having a second arm, said link having a second lug thereon engageable with said second arm whereby when said second lever is moved to latch position said second arm will move away from said second lug on said link and said resilient means will move said latch to latch position to be engaged by said second lug.

9. The structure set forth in claim 8, wherein said second lever is movable to a release position whereby said second arm will engage said second lug on said link and move said link and said first lever to move said latch away from said first lug and to unlatched position.

10. The structure set forth in claim 8, wherein said second lever has a third arm, said apparatus having a portion disposed to be engaged by said third arm when said cradle moves to delivery position for moving said second lever to latch position.

11. A missile-handling apparatus adapted to move a missile having in combination, a hoist for moving said missile, said hoist having a first shaft for driving the same, a second shaft geared to said first shaft, a third shaft, first means operated by fluid under pressure for rotating said third shaft, a pump for supplying said fluid, a differential gearing between said second and third shafts, a cylindrical cam encircling said differential gearing and operably connected thereto, said differential gearing comprising first and second bevel gears on said second and third shafts respectively and a third bevel gear rotatably mounted on the inside of said cam and meshing with said first and second bevel gears, a motor driven by said fluid under pressure connected to said first shaft, second means for regulating the flow of fluid from said pump to said motor, said cam being operably connected to and controlling said second means whereby the fluid flow from said pump is regulated to control the speed of said motor, the rotation of said first shaft, and the movement of said hoist.

12. The structure set forth in claim 11, in which said cam has neutral and open positions and is provided with a first stop for holding said cam in said open position whereby said cam controls said second means to allow free flow of said fluid from said pump to said motor.

13. The structure set forth in claim 11, in which said first means comprises a cylinder to which fluid under pressure is supplied, a piston in said cylinder geared to said third shaft, and a second stop for said piston so that when said piston reaches said second stop, said third shaft will cease to rotate and the action of said differential gearing will rotate said cam back to neutral position stopping the flow of fluid to said motor and the movement of said hoist.

14. The structure set forth in claim 11, in which said cam has neutral and open positions and is provided with a first stop for holding said cam in said open position, and said first means comprises a cylinder to which fluid under pressure is supplied from said pump, a piston in said cylinder, a rack attached to said piston, a spur gear on said third shaft meshing with said rack, a second stop on said cylinder engaging said rack, whereby as fluid enters said cylinder, said piston and rack are moved, rotating said spur gear and said third shaft and said cam is rotated to open position through the action of said differential gearing causing said second means to provide fluid to said motor to rotate said hoist and said second shaft and when said rack engages said stop, rotation of said spur gear ceases and the rotation of said second shaft causes the differential gearing to rotate the cam back to neutral position and stop the movement of the hoist.

15. An apparatus for handling a missile having upper and lower portions having in combination a strikedown mechanism including a cradle, said strikedown mechanism being operable to separately and alternatively handle said upper and said lower portions, said cradle being movable to loading and delivery positions respectively, means for placing a frame on said cradle while in loading position, said frame being adapted to carry said upper portion, means for securing said upper portion to hold it in place on said frame and for releasing the same, means for moving said cradle to delivery position, a switch for controlling said cradle moving means and operated by said upper portion when said upper portion is not secured by said securing means to render inoperative said cradle moving means.

16. The structure set forth in claim 15, in which said securing means operates said switch when said securing means has been actuated to secure said upper portion to said frame for rendering said cradle moving means operative.

References Cited by the Examiner
UNITED STATES PATENTS

| | | | |
|---|---|---|---|
| 1,465,990 | 8/1923 | Lee et al. | 89—46 |
| 2,407,692 | 9/1946 | Vickers | 89—46 X |
| 2,745,317 | 5/1956 | Stanton et al. | 89—46 |
| 2,833,431 | 5/1958 | Bole | 89—46 |
| 2,855,828 | 10/1958 | Girouard et al. | 89—45 |

BENJAMIN A. BORCHELT, *Primary Examiner.*

ARTHUR N. HORTEN, SAMUEL BOYD, *Examiners.*

W. F. COLLINS, C. C. WELLS, W. E. STEWART, S. W. ENGLE, *Assistant Examiners.*